(12) United States Patent
Gass

(10) Patent No.: US 9,969,014 B2
(45) Date of Patent: *May 15, 2018

(54) POWER EQUIPMENT WITH DETECTION AND REACTION SYSTEMS

(71) Applicant: SD3, LLC, Tualatin, OR (US)

(72) Inventor: Stephen F. Gass, West Linn, OR (US)

(73) Assignee: SawStop Holding LLC, Tualatin, OR (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/357,928

(22) Filed: Nov. 21, 2016

(65) Prior Publication Data

US 2017/0072582 A1    Mar. 16, 2017

Related U.S. Application Data

(60) Continuation of application No. 12/806,829, filed on Aug. 20, 2010, now Pat. No. 9,522,476, which is a
(Continued)

(51) Int. Cl.
*B26D 7/24* (2006.01)
*B23D 59/00* (2006.01)
(Continued)

(52) U.S. Cl.
CPC .......... *B23D 47/025* (2013.01); *B23D 47/08* (2013.01); *B23D 59/001* (2013.01); *B26D 7/24* (2013.01); *B27B 5/38* (2013.01); *B27B 13/14* (2013.01); *B27G 19/00* (2013.01); *B27G 19/02* (2013.01); *B27G 19/06* (2013.01); *F16P 3/12* (2013.01);
(Continued)

(58) Field of Classification Search
CPC .............. B23D 45/067; Y10T 83/7697; Y10T 83/7726; Y10T 83/8773; Y10T 83/081; Y10T 83/704; Y10T 83/7793; Y10T 83/773; Y10T 83/141; Y10T 83/7688;
(Continued)

(56) References Cited

U.S. PATENT DOCUMENTS 146,886 A    1/1874  Doane et al.
162,814 A    5/1875  Graves et al.
(Continued)

FOREIGN PATENT DOCUMENTS

CA    2140991    1/1995
CH     297525    6/1954
(Continued)

OTHER PUBLICATIONS

Sink Drain Plug Lifter, circa 1974.
(Continued)

*Primary Examiner* — Ghassem Alie

(57) ABSTRACT

Woodworking machines and safety methods for use with those machines are disclosed. The machines include a detection system adapted to detect one or more dangerous conditions and a reaction system associated with the detection system. The reaction system can include an explosive to trigger the system, and also can be configured to retract a cutting tool at least partially away from a cutting region upon detection of a dangerous condition by the detection system.

1 Claim, 44 Drawing Sheets

Related U.S. Application Data continuation of application No. 11/796,819, filed on Apr. 30, 2007, now Pat. No. 8,079,292, which is a division of application No. 09/929,426, filed on Aug. 13, 2001, now Pat. No. 7,210,383, said application No. 12/806,829 is a continuation of application No. 12/655,695, filed on Jan. 4, 2010, now Pat. No. 8,006,595, which is a continuation of application No. 11/975,985, filed on Oct. 22, 2007, now Pat. No. 7,640,835, which is a continuation of application No. 09/929,221, filed on Aug. 13, 2001, now Pat. No. 7,284,467, said application No. 12/806,829 is a continuation of application No. 12/002,388, filed on Dec. 17, 2007, now Pat. No. 8,011,279, which is a continuation of application No. 09/929,227, filed on Aug. 13, 2001, now Pat. No. 7,308,843, said application No. 12/806,829 is a continuation of application No. 11/401,050, filed on Apr. 10, 2006, now Pat. No. 7,788,999, which is a continuation of application No. 09/929,240, filed on Aug. 13, 2001, now Pat. No. 7,100,483, said application No. 11/401,050 is a continuation of application No. 09/929,241, filed on Aug. 13, 2001, now Pat. No. 7,024,975, said application No. 11/401,050 is a continuation of application No. 09/929,425, filed on Aug. 13, 2001, now Pat. No. 7,137,326, said application No. 11/401,050 is a continuation of application No. 10/172,553, filed on Jun. 13, 2002, now Pat. No. 7,231,856, said application No. 11/401,050 is a continuation of application No. 10/189,027, filed on Jul. 2, 2002, now Pat. No. 7,712,403, said application No. 11/401,050 is a continuation of application No. 10/243,042, filed on Sep. 13, 2002, now Pat. No. 7,197,969, said application No. 11/401,050 is a continuation of application No. 10/643,296, filed on Aug. 18, 2003, now abandoned, said application No. 11/401,050 is a continuation of application No. 10/794,161, filed on Mar. 4, 2004, now Pat. No. 7,098,800, said application No. 12/806,829 is a continuation of application No. 12/800,607, filed on May 19, 2010, now Pat. No. 7,895,927, which is a continuation of application No. 11/542,938, filed on Oct. 2, 2006, now abandoned, which is a continuation of application No. 10/984,643, filed on Nov. 8, 2004, now Pat. No. 8,061,245, which is a continuation of application No. 09/929,226, filed on Aug. 13, 2001, now Pat. No. 6,920,814, said application No. 10/984,643 is a continuation of application No. 09/929,240, filed on Aug. 13, 2001, now Pat. No. 7,100,483, said application No. 10/984,643 is a continuation of application No. 09/929,242, filed on Aug. 13, 2001, now Pat. No. 7,509,899, said application No. 10/984,643 is a continuation of application No. 10/051,782, filed on Jan. 15, 2002, now Pat. No. 6,877,410, said application No. 10/984,643 is a continuation of application No. 10/052,806, filed on Jan. 16, 2002, now Pat. No. 6,880,440, said application No. 10/984,643 is a continuation of application No. 10/205,164, filed on Jul. 25, 2002, now Pat. No. 6,945,149, said application No. 10/984,643 is a continuation of application No. 10/202,928, filed on Jul. 25, 2002, now Pat. No. 7,000,514, said application No. 10/984,643 is a continuation of application No. 10/785,361, filed on Feb. 23, 2004, now Pat. No. 6,997,090, which is a continuation of application No. 10/215,929, filed on Aug. 9, 2002, now abandoned, said application No. 12/806,829 is a continuation of application No. 11/542,938, filed on Oct. 2, 2006, now abandoned, which is a continuation of application No. 09/929,242, filed on Aug. 13, 2001, now Pat. No. 7,509,899, said application No. 11/542,938 is a continuation of application No. 11/401,774, filed on Apr. 11, 2006, now Pat. No. 7,525,055, which is a continuation of application No. 11/027,322, filed on Dec. 31, 2004, now abandoned, said application No. 11/542,938 is a continuation of application No. 11/445,548, filed on Jun. 2, 2006, now Pat. No. 7,347,131, and a continuation of application No. 11/506,260, filed on Aug. 18, 2006, now Pat. No. 7,359,174, which is a continuation of application No. 10/923,282, filed on Aug. 20, 2004, now abandoned, said application No. 12/806,829 is a continuation of application No. 12/590,094, filed on Nov. 2, 2009, now Pat. No. 7,958,806, which is a continuation of application No. 09/929,236, filed on Aug. 13, 2001, now Pat. No. 7,610,836, said application No. 12/806,829 is a continuation of application No. 11/811,719, filed on Jun. 11, 2007, now Pat. No. 7,832,314, which is a continuation of application No. 11/061,162, filed on Feb. 18, 2005, now Pat. No. 7,228,772, which is a continuation of application No. 09/929,244, filed on Aug. 13, 2001, now Pat. No. 6,857,345, said application No. 12/806,829 is a continuation of application No. 12/587,695, filed on Oct. 9, 2009, now Pat. No. 7,921,754, which is a continuation of application No. 09/929,237, filed on Aug. 13, 2001, now Pat. No. 7,600,455, said application No. 12/806,829 is a continuation of application No. 12/661,766, filed on Mar. 22, 2010, now Pat. No. 8,051,759, which is a continuation of application No. 11/810,196, filed on Jun. 4, 2007, now Pat. No. 7,681,479, which is a continuation of application No. 09/929,234, filed on Aug. 13, 2001, now Pat. No. 7,225,712, said application No. 12/806,829 is a continuation of application No. 12/655,694, filed on Jan. 4, 2010, now Pat. No. 7,908,950, which is a continuation of application No. 12/079,836, filed on Mar. 27, 2008, now Pat. No. 7,640,837, which is a division of application No. 09/929,235, filed on Aug. 13, 2001, now Pat. No. 7,350,444, said application No. 12/806,829 is a continuation of application No. 12/799,211, filed on Apr. 19, 2010, now Pat. No. 8,100,039, which is a continuation of application No. 12/220,946, filed on Jul. 29, 2008, now Pat. No. 7,698,976, which is a continuation of application No. 09/929,238, filed on Aug. 13, 2001, now abandoned, said application No. 12/806,829 is a continuation of application No. 12/590,924, filed on Nov. 16, 2009, now Pat. No. 8,186,255, which is a division of application No. 12/154,675, filed on May 23, 2008, now Pat. No. 7,617,752, which is a division of application No. 10/053,390, filed on Jan. 16, 2002, now Pat. No. 7,377,199, which is a continuation-in-part of application No. 09/676,190, filed on Sep. 29, 2000, now Pat. No. 7,055,417, said application No. 12/806,829 is a continuation of application No. 12/313,162, filed on Nov. 17, 2008, now Pat. No. 7,789,002, which is a continuation of application No. 11/348,580, filed on Feb. 6, 2006, now abandoned, which is a continuation of application No. 10/052,705, filed on Jan. 16, 2002, now Pat. No. 6,994,004, said application No. 12/313, 162 is a continuation of application No. 11/098,984, filed on Apr. 4, 2005, now Pat. No. 7,353,737, which is a continuation of application No. 09/929,238, filed on Aug. 13, 2001, now abandoned, and a continuation of application No. 10/047,066, filed on Jan. 14, 2002, now Pat. No. 6,945,148, and a continuation of application No. 10/051,782, filed on Jan. 15, 2002, now Pat. No. 6,877,410, said application No. 12/806,829 is a continuation of application No. 12/661,993, filed on Mar. 26, 2010, now Pat. No. 8,061,246, which is a continuation of application No. 11/982,972, filed on Nov. 5, 2007, now Pat. No. 7,685,912, which is a continuation of application No. 10/932,339, filed on Sep. 1, 2004, now Pat. No. 7,290,472, which is a continuation of application No. 10/047,066, filed on Jan. 14, 2002, now Pat. No. 6,945,148, said application No. 10/932,339 is a continuation of application No. 10/050,085, filed on Jan. 14, 2002, now abandoned, said application No. 12/806,829 is a continuation of application No. 10/100,211, filed on Mar. 13, 2002, now Pat. No. 9,724,840, said application No. 12/806,829 is a continuation of application No. 11/256,757, filed on Oct. 24, 2005, now Pat. No. 8,065,943, which is a continuation of application No. 09/955,418, filed on Sep. 17, 2001, now Pat. No. 6,957,601, said application No. 12/806,829 is a continuation of application No. 10/146,527, filed on May 15, 2002, said application No. 12/806,829 is a continuation of application No. 12/586,469, filed on Sep. 21, 2009, now abandoned, which is a division of application No. 11/702,330, filed on Feb. 5, 2007, now Pat. No. 7,591,210, which is a continuation of application No. 10/189,031, filed on Jul. 2, 2002, now Pat. No. 7,171,879, said application No. 12/806,829 is a continuation of application No. 11/208,214, filed on Aug. 19, 2005, now Pat. No. 7,784,507, which is a continuation of application No. 10/251,576, filed on Sep. 20, 2002, now abandoned, which is a continuation-in-part of application No. 10/197,975, filed on Jul. 18, 2002, now abandoned, said application No. 11/208,214 is a continuation-in-part of application No. 09/676,190, filed on Sep. 29, 2000, now Pat. No. 7,055,417, said application No. 12/806,829 is a continuation of application No. 12/231,080, filed on Aug. 29, 2008, now Pat. No. 7,900,541, which is a continuation of application No. 11/487,717, filed on Jul. 17, 2006, now Pat. No. 7,421,315, which is a continuation of application No. 10/292,607, filed on Nov. 12, 2002, now Pat. No. 7,077,039, said application No. 12/806,829 is a continuation of application No. 12/655,962, filed on Jan. 11, 2010, now abandoned, which is a continuation of application No. 12/313,277, filed on Nov. 17, 2008, now Pat. No. 7,644,645, which is a continuation of application No. 10/345,630, filed on Jan. 15, 2003, now abandoned, said application No. 12/806,829 is a continuation of application No. 12/658,759, filed on Feb. 12, 2010, now abandoned, which is a continuation of application No. 11/787,471, filed on Apr. 17, 2007, now Pat. No. 7,661,343, which is a continuation of application No. 10/341,260, filed on Jan. 13, 2003, now abandoned, said application No. 12/806,829 is a continuation of application No. 11/647,676, filed on Dec. 29, 2006, now Pat. No. 7,836,804, which is a continuation-in-part of application No. 10/923,290, filed on Aug. 20, 2004, now Pat. No. 7,472,634, said application No. 12/806,829 is a continuation of application No. 12/079,820, filed on Mar. 27, 2008, now Pat. No. 7,845,258, which is a division of application No. 10/923,273, filed on Aug. 20, 2004, now Pat. No. 7,350,445, said application No. 12/806,829 is a continuation of application No. 12/454,569, filed on May 18, 2009, now Pat. No. 7,991,503, which is a continuation of application No. 11/027,600, filed on Dec. 31, 2004, now Pat. No. 7,536,238, said application No. 12/806,829 is a continuation of application No. 12/799,915, filed on May 3, 2010, now Pat. No. 8,087,438, which is a continuation of application No. 12/322,069, filed on Jan. 26, 2009, now Pat. No. 7,707,918, which is a continuation of application No. 11/107,499, filed on Apr. 15, 2005, now Pat. No. 7,481,140, said application No. 12/806,829 is a continuation of application No. 12/077,576, filed on Mar. 19, 2008, now abandoned, which is a continuation of application No. 11/027,254, filed on Dec. 31, 2004, now abandoned, said application No. 12/806,829 is a continuation of application No. 12/799,920, filed on May 3, 2010, now Pat. No. 8,122,807, which is a continuation of application No. 11/026,114, filed on Dec. 31, 2004, now Pat. No. 7,707,920, said application No. 12/806,829 is a continuation of application No. 11/026,006, filed on Dec. 31, 2004, now Pat. No. 8,459,157, said application No. 12/806,829 is a continuation of application No. 11/045,972, filed on Jan. 28, 2005, now Pat. No. 7,827,890, said application No. 12/806,829 is a continuation of application No. 12/454,730, filed on May 20, 2009, now Pat. No. 7,997,176, which is a continuation of application No. 11/395,502, filed on Mar. 31, 2006, now abandoned.

(60) Provisional application No. 60/667,485, filed on Mar. 31, 2005, provisional application No. 60/540,377, filed on Jan. 29, 2004, provisional application No. 60/533,575, filed on Dec. 31, 2003, provisional application No. 60/533,811, filed on Dec. 31, 2003, provisional application No. 60/533,852, filed on Dec. 31, 2003, provisional application No. 60/533,791, filed on Dec. 31, 2003, provisional application No. 60/496,574, filed on Aug. 20, 2003, provisional application No. 60/496,550, filed on Aug. 20, 2003, provisional application No. 60/351,797, filed on Jan. 25, 2002, provisional application No. 60/349,989, filed on Jan. 16, 2002, provisional application No. 60/335,970, filed on Nov. 13, 2001, provisional application No. 60/182,866, filed on Feb. 16, 2000, provisional application No. 60/157,340, filed on Oct. 1, 1999, provisional application No. 60/306,202, filed on Jul. 18, 2001, provisional application No. 60/323,975, filed on Sep. 21, 2001, provisional application No. 60/302,937, filed on Jul. 2, 2001, provisional application No. 60/292,010, filed on May 17, 2001, provisional application No. 60/312,141, filed on Aug. 13, 2001, provisional application No. 60/308,492, filed on Jul. 27, 2001, provisional application No. 60/307,756, filed on Jul. 25, 2001, provisional application No. 60/306,202, filed on Jul. 18, 2001, provisional application No. 60/302,916, filed on Jul. 3, 2001, provisional application No. 60/302,937, filed on Jul. 2, 2001, provisional application No. 60/298,207, filed on Jun. 13, 2001, provisional application No. 60/292,100, filed on May 17, 2001, provisional application No. 60/292,081, filed on May 17, 2001, provisional application No. 60/279,313, filed on Mar. 27, 2001, provisional application No. 60/275,595, filed on Mar. 13, 2001, provisional application No. 60/275,594, filed on Mar. 13, 2001, provisional application No. 60/273,902, filed on Mar. 6, 2001, provisional application No. 60/273,178, filed on Mar. 2, 2001, provisional application No. 60/273,177, filed on Mar. 2, 2001, provisional application No. 60/270,942, filed on Feb. 22, 2001, provisional application No. 60/270,941, filed on Feb. 22, 2001, provisional application No. 60/270,011, filed on Feb. 20, 2001, provisional application No. 60/233,459, filed on Sep. 18, 2000, provisional application No. 60/275,583, filed on Mar. 13, 2001, provisional application No. 60/667,485, filed on Mar. 31, 2005, provisional application No. 60/225,057, filed on Aug. 14, 2000, provisional application No. 60/225,058, filed on Aug. 14, 2000, provisional application No. 60/225,094, filed on Aug. 14, 2000, provisional application No. 60/225,059, filed on Aug. 14, 2000, provisional application No. 60/225,212, filed on Aug. 14, 2000, provisional application No. 60/225,201, filed on Aug. 14, 2000, provisional application No. 60/496,568, filed on Aug. 20, 2003, provisional application No. 60/533,598, filed on Dec. 31, 2003, provisional application No. 60/225,089, filed on Aug. 14, 2000, provisional application No. 60/312,141, filed on Aug. 13, 2001, provisional application No. 60/308,492, filed on Jul. 27, 2001, provisional application No. 60/270,942, filed on Feb. 22, 2001, provisional application No. 60/279,313, filed on Mar. 27, 2001, provisional application No. 60/225,056, filed on Aug. 14, 2000, provisional application No. 60/225,206, filed on Aug. 14, 2000, provisional application No. 60/452,159, filed on Mar. 5, 2003, provisional application No. 60/406,138, filed on Aug. 27, 2002, provisional application No. 60/324,729, filed on Sep. 24, 2001, provisional application No. 60/302,916, filed on Jul. 3, 2001, provisional application No. 60/225,210, filed on Aug. 14, 2000, provisional application No. 60/225,169, filed on Aug. 14, 2000, provisional application No. 60/225,056, filed on Aug. 14, 2000, provisional application No. 60/225,170, filed on Aug. 14, 2000, provisional application No. 60/225,211, filed on Aug. 14, 2000, provisional application No. 60/225,200, filed on Aug. 14, 2000.

(51) Int. Cl.
| | | |
|---|---|---|
| *F16P 3/12* | (2006.01) | |
| *B23D 47/02* | (2006.01) | |
| *B23D 47/08* | (2006.01) | |
| *B27B 5/38* | (2006.01) | |
| *B27B 13/14* | (2006.01) | |
| *B27G 19/00* | (2006.01) | |
| *B27G 19/02* | (2006.01) | |
| *F16P 3/14* | (2006.01) | |
| *B27G 19/06* | (2006.01) | |

(52) U.S. Cl.
CPC .............. *F16P 3/14* (2013.01); *F16P 3/148* (2013.01); *Y10S 83/01* (2013.01); *Y10T 83/04* (2015.04); *Y10T 83/081* (2015.04); *Y10T 83/088* (2015.04); *Y10T 83/089* (2015.04); *Y10T 83/091* (2015.04); *Y10T 83/141* (2015.04); *Y10T 83/162* (2015.04); *Y10T 83/175* (2015.04); *Y10T 83/178* (2015.04); *Y10T 83/541* (2015.04); *Y10T 83/613* (2015.04); *Y10T 83/7693* (2015.04); *Y10T 83/7697* (2015.04); *Y10T 83/7726* (2015.04); *Y10T 83/7734* (2015.04); *Y10T 83/7788* (2015.04); *Y10T 83/85* (2015.04); *Y10T 83/8773* (2015.04)

(58) Field of Classification Search
CPC .... Y10T 83/089; Y10T 83/7693; Y10S 83/01; B27G 19/08
USPC ...... 83/581, 62.1, 781, DIG. 1, 477.2, 477.1, 83/473, 471.1, 468.3, 485, 489, 698.11, 83/491, 609, 508.2, 102.1, 471.3, 471.2, 83/860, 58, 580; 144/3.1, 130, 286.5, 144/287; 451/454, 455; 409/134
See application file for complete search history.

(56) References Cited

U.S. PATENT DOCUMENTS

| | | |
|---|---|---|
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 15,262 A | 1/1922 | Gurgel |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,492,145 A | 4/1924 | Talley |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,584,086 A | 5/1926 | Fonda |
| 1,590,988 A | 6/1926 | Campbell |
| 1,600,604 A | 6/1926 | Sorlien |
| 1,616,478 A | 2/1927 | Watson |
| 1,640,517 A | 8/1927 | Procknow |
| 1,662,372 A | 3/1928 | Ward |
| 1,668,061 A | 5/1928 | Falkins |
| 1,701,948 A | 2/1929 | Crowe |

(56) References Cited

U.S. PATENT DOCUMENTS

| | | |
|---|---|---|
| 1,711,490 A | 5/1929 | Dummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Dummond |
| 2,020,222 A | 11/1935 | Tautz |
| 2,038,810 A | 4/1936 | Tautz |
| 2,044,481 A | 6/1936 | Manley et al. |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Wooward |
| 2,501,134 A | 3/1950 | Meckoski et al. |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,719,547 A | 10/1955 | Gjerde |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr. |
| 2,786,496 A | 3/1957 | Eschenburg |
| 2,804,890 A | 9/1957 | Fink |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,937,672 A | 5/1960 | Gjerde |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,007,501 A | 11/1961 | Mundell et al. |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,213,731 A | 10/1965 | Renard |
| 3,224,474 A | 12/1965 | Bloom |
| 3,232,326 A | 2/1966 | Speer et al. |
| 3,246,205 A | 4/1966 | Miller |
| 3,249,134 A | 5/1966 | Vogl et al. |
| 3,274,876 A | 9/1966 | Debus |
| 3,276,497 A | 10/1966 | Heer |
| 3,280,861 A | 10/1966 | Gjerde |
| 3,306,149 A | 2/1967 | John |
| 3,313,185 A | 4/1967 | Drake et al. |
| 3,315,715 A | 4/1967 | Mytinger |
| 3,323,814 A | 6/1967 | Phillips |
| 3,337,008 A | 8/1967 | Trachte |
| 3,356,111 A | 12/1967 | Mitchell |
| 3,368,596 A | 2/1968 | Comer |
| 3,386,322 A | 6/1968 | Stone et al. |
| 3,439,183 A | 4/1969 | Hurst, Jr. |
| 3,445,835 A | 5/1969 | Fudaley |
| 3,454,286 A | 7/1969 | Anderson et al. |
| 3,456,696 A | 7/1969 | Gregory et al. |
| 3,512,440 A | 5/1970 | Frydmann |
| 3,538,964 A | 11/1970 | Warrick et al. |
| 3,540,338 A | 11/1970 | McEwan et al. |
| 3,547,232 A * | 12/1970 | Fergle ............... F16D 49/00 188/110 |
| 3,554,067 A | 1/1971 | Scutella |
| 3,566,934 A | 3/1971 | Thrasher |
| 3,566,996 A | 3/1971 | Crossman |
| 3,580,376 A | 5/1971 | Loshbough |
| 3,581,784 A | 6/1971 | Warrick |
| 3,593,266 A | 7/1971 | Van Sickle |
| 3,613,748 A | 10/1971 | De Pue |
| 3,621,894 A | 11/1971 | Niksich |
| 3,648,126 A | 3/1972 | Boos et al. |
| 3,670,788 A | 6/1972 | Pollak et al. |
| 3,675,444 A | 7/1972 | Whipple |
| 3,680,609 A | 8/1972 | Menge |
| 3,688,815 A | 9/1972 | Ridenour |
| 3,695,116 A | 10/1972 | Baur |
| 3,696,844 A | 10/1972 | Bernatschek |
| 3,716,113 A | 2/1973 | Kobayashi et al. |
| 3,719,103 A | 3/1973 | Streander |
| 3,740,000 A | 6/1973 | Takada |
| 3,745,546 A | 7/1973 | Struger et al. |

(56) References Cited

U.S. PATENT DOCUMENTS

| | | |
|---|---|---|
| 3,749,933 A | 7/1973 | Davidson |
| 3,754,493 A | 8/1973 | Niehaus et al. |
| 3,772,590 A | 11/1973 | Mikulecky et al. |
| 3,785,230 A * | 1/1974 | Lokey ............... B23Q 11/0092 192/129 A |
| 3,793,915 A | 2/1974 | Huier |
| 3,805,639 A | 4/1974 | Peter |
| 3,805,658 A | 4/1974 | Scott et al. |
| 3,808,932 A | 5/1974 | Russell |
| 3,829,850 A | 8/1974 | Guetersloh |
| 3,829,970 A | 8/1974 | Anderson |
| 3,858,095 A * | 12/1974 | Friemann ............... G01V 3/088 192/129 A |
| 3,861,016 A | 1/1975 | Johnson et al. |
| 3,863,208 A | 1/1975 | Balban |
| 3,874,747 A | 4/1975 | Case et al. |
| 3,880,032 A | 4/1975 | Green |
| 3,882,744 A | 5/1975 | McCarroll |
| 3,886,413 A | 5/1975 | Dow et al. |
| 3,889,567 A | 6/1975 | Sato et al. |
| 3,905,263 A | 9/1975 | Smith |
| 3,922,785 A | 12/1975 | Fushiya |
| 3,924,688 A | 12/1975 | Cooper et al. |
| 3,931,727 A | 1/1976 | Luenser |
| 3,935,777 A | 2/1976 | Bassett |
| 3,942,607 A | 3/1976 | Sobat |
| 3,945,286 A | 3/1976 | Smith |
| 3,946,631 A | 3/1976 | Malm |
| 3,947,734 A | 3/1976 | Flyer |
| 3,949,636 A | 4/1976 | Ball et al. |
| 3,953,770 A | 4/1976 | Hayashi |
| 3,960,310 A | 6/1976 | Nussbaum |
| 3,967,161 A | 6/1976 | Lichtblau |
| 3,974,565 A | 8/1976 | Ellis |
| 3,975,600 A | 8/1976 | Marston |
| 3,978,624 A | 9/1976 | Merkel et al. |
| 3,994,192 A | 11/1976 | Faig |
| 4,007,679 A | 2/1977 | Edwards |
| 4,016,490 A | 4/1977 | Weckenmann et al. |
| 4,026,174 A | 5/1977 | Fierro |
| 4,026,177 A | 5/1977 | Lokey |
| 4,029,159 A | 6/1977 | Nymann |
| 4,047,156 A | 9/1977 | Atkins |
| 4,048,886 A | 9/1977 | Zettler |
| 4,060,160 A | 11/1977 | Lieber |
| 4,063,777 A | 12/1977 | Takada |
| 4,070,940 A | 1/1978 | McDaniel et al. |
| 4,075,961 A | 2/1978 | Harris |
| 4,077,161 A | 3/1978 | Wyle et al. |
| 4,085,303 A | 4/1978 | McIntyre et al. |
| 4,090,345 A | 5/1978 | Harkness |
| 4,091,698 A | 5/1978 | Obear et al. |
| 4,106,378 A | 8/1978 | Kaiser |
| 4,117,752 A * | 10/1978 | Yoneda ............... B23D 59/001 192/129 A |
| 4,145,940 A | 3/1979 | Woloveke et al. |
| 4,152,833 A | 5/1979 | Phillips |
| 4,161,649 A | 7/1979 | Klos et al. |
| 4,175,452 A | 11/1979 | Idel |
| 4,184,394 A | 1/1980 | Gjerde |
| 4,190,000 A | 2/1980 | Shaull et al. |
| 4,195,722 A | 4/1980 | Anderson et al. |
| 4,199,930 A | 4/1980 | Lebet et al. |
| 4,200,002 A | 4/1980 | Takahashi |
| 4,206,666 A | 6/1980 | Ashton |
| 4,206,910 A | 6/1980 | Biesemeyer |
| 4,249,117 A | 2/1981 | Leukhardt et al. |
| 4,249,442 A | 2/1981 | Fittery |
| 4,251,599 A | 2/1981 | McCormick |
| 4,255,995 A | 3/1981 | Connor |
| 4,262,278 A | 4/1981 | Howard et al. |
| 4,267,914 A | 5/1981 | Saar |
| 4,270,427 A | 6/1981 | Colberg et al. |
| 4,276,459 A | 6/1981 | Willett et al. |
| 4,276,799 A | 7/1981 | Muehling |
| 4,291,794 A | 9/1981 | Bauer |
| 4,305,442 A | 12/1981 | Currie |
| 4,319,146 A | 3/1982 | Wires, Sr. |
| 4,321,841 A | 3/1982 | Felix |
| 4,334,450 A | 6/1982 | Benuzzi |
| 4,351,423 A | 9/1982 | Rogier |
| 4,372,202 A | 2/1983 | Cameron |
| 4,372,427 A | 2/1983 | Rogier |
| 4,374,552 A | 2/1983 | Dayen |
| 4,385,539 A | 5/1983 | Meyerhoefer et al. |
| 4,391,358 A | 7/1983 | Haeger |
| 4,418,597 A | 12/1983 | Krusemark et al. |
| 4,427,042 A | 1/1984 | Mitchell et al. |
| 4,453,112 A | 6/1984 | Sauer et al. |
| 4,466,170 A | 8/1984 | Davis |
| 4,466,233 A | 8/1984 | Thesman |
| 4,470,046 A | 9/1984 | Betsill |
| 4,492,291 A | 1/1985 | Chometon et al. |
| 4,503,739 A | 3/1985 | Konieczka |
| 4,510,489 A | 4/1985 | Anderson, III et al. |
| 4,512,224 A | 4/1985 | Terauchi |
| 4,518,043 A | 5/1985 | Anderson et al. |
| 4,532,501 A | 7/1985 | Hoffman |
| 4,532,844 A | 8/1985 | Chang et al. |
| 4,557,168 A | 12/1985 | Tokiwa |
| 4,559,858 A | 12/1985 | Laskowski et al. |
| 4,560,033 A | 12/1985 | DeWoody et al. |
| 4,566,512 A | 1/1986 | Wilson |
| 4,573,556 A | 3/1986 | Andreasson |
| 4,576,073 A | 3/1986 | Stinson |
| 4,589,047 A | 5/1986 | Gaus et al. |
| 4,589,860 A | 5/1986 | Brandenstein et al. |
| 4,599,597 A | 7/1986 | Rotbart |
| 4,599,927 A | 7/1986 | Eccardt et al. |
| 4,606,251 A | 8/1986 | Boileau |
| 4,615,247 A | 10/1986 | Berkeley |
| 4,621,300 A | 11/1986 | Summerer |
| 4,625,604 A | 12/1986 | Handler et al. |
| 4,637,188 A | 1/1987 | Crothers |
| 4,637,289 A | 1/1987 | Ramsden |
| 4,644,832 A | 2/1987 | Smith |
| 4,653,189 A | 3/1987 | Andreasson |
| 4,657,428 A | 4/1987 | Wiley |
| 4,661,797 A | 4/1987 | Schmall |
| 4,672,500 A | 6/1987 | Tholome et al. |
| 4,675,664 A | 6/1987 | Cloutier et al. |
| 4,679,719 A | 7/1987 | Kramer |
| 4,694,721 A | 9/1987 | Brickner, Jr. |
| 4,718,229 A | 1/1988 | Riley |
| 4,721,023 A | 1/1988 | Bartlett et al. |
| 4,722,021 A | 1/1988 | Hornung et al. |
| 4,751,603 A | 6/1988 | Kwan |
| 4,756,220 A | 7/1988 | Olsen et al. |
| 4,757,881 A | 7/1988 | Jonsson et al. |
| 4,774,866 A | 10/1988 | Dehari et al. |
| 4,792,965 A | 12/1988 | Morgan |
| 4,805,504 A | 2/1989 | Fushiya et al. |
| 4,805,505 A | 2/1989 | Cantlin |
| 4,831,279 A | 5/1989 | Ingraham |
| 4,840,135 A | 6/1989 | Yamauchi |
| 4,845,476 A | 7/1989 | Rangeard et al. |
| 4,864,455 A | 9/1989 | Shimomura et al. |
| 4,875,398 A | 10/1989 | Taylor et al. |
| 4,888,869 A | 12/1989 | Leatherman |
| 4,896,607 A | 1/1990 | Hall et al. |
| 4,906,962 A | 3/1990 | Duimstra |
| 4,907,679 A | 3/1990 | Menke |
| 4,934,233 A | 6/1990 | Brundage et al. |
| 4,936,876 A | 6/1990 | Reyes |
| 4,937,554 A | 6/1990 | Herman |
| 4,962,685 A | 10/1990 | Hagstrom |
| 4,964,450 A | 10/1990 | Hughes et al. |
| 4,965,909 A | 10/1990 | McCullough et al. |
| 4,969,063 A | 11/1990 | Scott et al. |
| 4,975,798 A | 12/1990 | Edwards et al. |
| 5,020,406 A | 6/1991 | Sasaki et al. |
| 5,025,175 A | 6/1991 | Dubois, III |
| 5,042,348 A | 8/1991 | Brundage et al. |
| 5,046,426 A | 9/1991 | Julien et al. |

(56) References Cited

U.S. PATENT DOCUMENTS

| | | | |
|---|---|---|---|
| 5,052,255 A | 10/1991 | Gaines | |
| 5,074,047 A | 12/1991 | King | |
| 5,081,406 A * | 1/1992 | Hughes | B23D 59/005 |
| | | | 318/478 |
| 5,082,316 A | 1/1992 | Wardlaw | |
| 5,083,973 A | 1/1992 | Townsend | |
| 5,086,890 A | 2/1992 | Turczyn et al. | |
| 5,094,000 A | 3/1992 | Becht et al. | |
| 5,103,940 A | 4/1992 | Meneut et al. | |
| 5,116,249 A | 5/1992 | Shiotani et al. | |
| 5,119,555 A | 6/1992 | Johnson | |
| 5,122,091 A | 6/1992 | Townsend | |
| 5,123,317 A | 6/1992 | Barnes, Jr. et al. | |
| 5,146,714 A | 9/1992 | Liiber | |
| 5,156,508 A | 10/1992 | Grisley | |
| 5,174,349 A | 12/1992 | Svetlik et al. | |
| 5,184,534 A | 2/1993 | Lee | |
| 5,198,702 A | 3/1993 | McCullough et al. | |
| 5,199,343 A | 4/1993 | OBanion | |
| 5,201,110 A | 4/1993 | Bane | |
| 5,201,684 A | 4/1993 | DeBois, III | |
| 5,201,863 A | 4/1993 | Peot | |
| 5,206,625 A | 4/1993 | Davis | |
| 5,207,253 A | 5/1993 | Hoshino et al. | |
| 5,212,621 A | 5/1993 | Panter | |
| 5,218,189 A | 6/1993 | Hutchison | |
| 5,230,269 A | 7/1993 | Shiotani et al. | |
| 5,231,359 A | 7/1993 | Masuda et al. | |
| 5,231,906 A | 8/1993 | Kogej | |
| 5,239,978 A | 8/1993 | Plangetis | |
| 5,245,879 A | 9/1993 | McKeon | |
| 5,257,570 A | 11/1993 | Shiotani et al. | |
| 5,265,510 A | 11/1993 | Hoyer-Ellefsen | |
| 5,272,946 A | 12/1993 | McCullough et al. | |
| 5,276,431 A | 1/1994 | Piccoli et al. | |
| 5,285,708 A | 2/1994 | Bosten et al. | |
| 5,293,802 A | 3/1994 | Shiontani et al. | |
| 5,320,382 A | 6/1994 | Goldstein et al. | |
| 5,321,230 A | 6/1994 | Shanldin et al. | |
| 5,331,875 A | 7/1994 | Mayfield | |
| 5,353,670 A | 10/1994 | Metzger, Jr. | |
| 5,377,554 A | 1/1995 | Reulein et al. | |
| 5,377,571 A | 1/1995 | Josephs | |
| 5,392,568 A | 2/1995 | Howard, Jr. et al. | |
| 5,392,678 A | 2/1995 | Sasaki et al. | |
| 5,401,928 A | 3/1995 | Kelley | |
| 5,411,221 A | 5/1995 | Collins et al. | |
| 5,423,232 A | 6/1995 | Miller et al. | |
| 5,436,613 A | 7/1995 | Ghosh et al. | |
| 5,447,085 A | 9/1995 | Gochnauer | |
| 5,451,750 A | 9/1995 | An | |
| 5,453,903 A | 9/1995 | Chow | |
| 5,471,888 A | 12/1995 | McCormick | |
| 5,480,009 A | 1/1996 | Wieland et al. | |
| 5,503,059 A | 4/1996 | Pacholok | |
| 5,510,587 A | 4/1996 | Reiter | |
| 5,510,685 A | 4/1996 | Grasselli | |
| 5,513,548 A | 5/1996 | Garuglieri | |
| 5,531,147 A | 7/1996 | Serban | |
| 5,534,836 A | 7/1996 | Schenkel et al. | |
| 5,572,916 A | 11/1996 | Takano | |
| 5,587,618 A | 12/1996 | Hathaway | |
| 5,592,353 A | 1/1997 | Shinohara et al. | |
| 5,606,889 A | 3/1997 | Bielinski et al. | |
| 5,619,896 A | 4/1997 | Chen | |
| 5,623,860 A | 4/1997 | Schoene et al. | |
| 5,647,258 A | 7/1997 | Brazell et al. | |
| 5,648,644 A | 7/1997 | Nagel | |
| 5,659,454 A | 8/1997 | Vermesse | |
| 5,667,152 A | 9/1997 | Mooring | |
| 5,671,633 A | 9/1997 | Wagner | |
| 5,695,306 A | 12/1997 | Nygren, Jr. | |
| 5,700,165 A | 12/1997 | Harris et al. | |
| 5,720,213 A | 2/1998 | Sberveglieri | |
| 5,722,308 A | 3/1998 | Ceroll et al. | |
| 5,724,875 A | 3/1998 | Meredith et al. | |
| 5,730,165 A | 3/1998 | Philipp | |
| 5,741,048 A | 4/1998 | Eccleston | |
| 5,755,148 A | 5/1998 | Stumpf et al. | |
| 5,768,786 A | 6/1998 | Kane et al. | |
| 5,771,742 A | 6/1998 | Bokaie et al. | |
| 5,782,001 A | 7/1998 | Gray | |
| 5,787,779 A | 8/1998 | Garuglieri | |
| 5,791,057 A | 8/1998 | Nakamura et al. | |
| 5,791,223 A | 8/1998 | Lanzer | |
| 5,791,224 A | 8/1998 | Suzuki et al. | |
| 5,791,441 A | 8/1998 | Matos et al. | |
| 5,797,307 A | 8/1998 | Horton | |
| 5,819,619 A | 10/1998 | Miller et al. | |
| 5,819,625 A | 10/1998 | Sberveglieri | |
| 5,852,951 A | 12/1998 | Santi | |
| 5,857,507 A | 1/1999 | Puzio et al. | |
| 5,861,809 A | 1/1999 | Eckstein et al. | |
| 5,875,698 A | 3/1999 | Ceroll et al. | |
| 5,880,954 A | 3/1999 | Thomson et al. | |
| 5,921,367 A | 7/1999 | Kashioka et al. | |
| 5,927,857 A | 7/1999 | Ceroll et al. | |
| 5,930,096 A | 7/1999 | Kim | |
| 5,937,720 A | 8/1999 | Itzov | |
| 5,942,975 A | 8/1999 | Sorensen | |
| 5,943,932 A | 8/1999 | Sberveglieri | |
| 5,950,514 A | 9/1999 | Benedict et al. | |
| 5,963,173 A | 10/1999 | Lian et al. | |
| 5,974,927 A | 11/1999 | Tsune | |
| 5,989,116 A | 11/1999 | Johnson et al. | |
| 6,009,782 A | 1/2000 | Tajima et al. | |
| 6,018,284 A | 1/2000 | Rival et al. | |
| 6,037,729 A | 3/2000 | Woods et al. | |
| D422,290 S | 4/2000 | Welsh et al. | |
| 6,050,174 A | 4/2000 | Schonlau et al. | |
| 6,052,884 A | 4/2000 | Steckler et al. | |
| 6,062,121 A | 5/2000 | Ceroll et al. | |
| 6,070,484 A | 6/2000 | Sakamaki | |
| 6,095,092 A | 8/2000 | Chou | |
| 6,109,157 A | 8/2000 | Talesky | |
| 6,112,785 A | 9/2000 | Yu | |
| 6,119,984 A | 9/2000 | Devine | |
| 6,131,629 A | 10/2000 | Puzio et al. | |
| 6,133,818 A | 10/2000 | Shieh et al. | |
| 6,141,192 A | 10/2000 | Garzon | |
| 6,148,504 A | 11/2000 | Schmidt et al. | |
| 6,148,526 A | 11/2000 | Kirn et al. | |
| 6,148,703 A | 11/2000 | Ceroll et al. | |
| 6,150,826 A | 11/2000 | Hokodate et al. | |
| 6,161,459 A | 12/2000 | Ceroll et al. | |
| 6,170,370 B1 | 1/2001 | Sommerville | |
| 6,227,563 B1 * | 5/2001 | Talisman | B60N 2/002 |
| | | | 280/735 |
| 6,244,149 B1 | 6/2001 | Ceroll et al. | |
| 6,250,190 B1 | 6/2001 | Ceroll et al. | |
| 6,257,061 B1 | 7/2001 | Nonoyama et al. | |
| 6,283,002 B1 | 9/2001 | Chiang | |
| 6,295,910 B1 | 10/2001 | Childs et al. | |
| 6,312,028 B1 | 11/2001 | Wilkosz | |
| 6,325,195 B1 | 12/2001 | Doherty | |
| 6,330,848 B1 | 12/2001 | Nishio et al. | |
| 6,336,273 B1 | 1/2002 | Nilsson et al. | |
| 6,352,137 B1 | 3/2002 | Stegall et al. | |
| 6,357,328 B1 | 3/2002 | Ceroll et al. | |
| 6,361,092 B1 | 3/2002 | Eagle et al. | |
| 6,366,099 B1 | 4/2002 | Reddi | |
| 6,376,939 B1 | 4/2002 | Suzuki et al. | |
| 6,404,098 B1 | 6/2002 | Kayama et al. | |
| 6,405,624 B2 | 6/2002 | Sutton | |
| 6,418,829 B1 | 7/2002 | Pilchowski | |
| 6,420,814 B1 | 7/2002 | Bobbio | |
| 6,427,570 B1 | 8/2002 | Miller et al. | |
| 6,430,007 B1 | 8/2002 | Jabbari | |
| 6,431,425 B1 | 8/2002 | Moorman et al. | |
| 6,450,077 B1 | 9/2002 | Ceroll et al. | |
| 6,453,786 B1 | 9/2002 | Ceroll et al. | |
| 6,460,442 B2 | 10/2002 | Talesky et al. | |
| 6,471,106 B1 | 10/2002 | Reining | |
| 6,479,958 B1 | 11/2002 | Thompson et al. | |

(56) References Cited

U.S. PATENT DOCUMENTS

| | | |
|---|---|---|
| 6,484,614 B1 | 11/2002 | Huang |
| D466,913 S | 12/2002 | Ceroll et al. |
| 6,492,802 B1 | 12/2002 | Bielski |
| D469,354 S | 1/2003 | Curtsinger |
| 6,502,493 B1 | 1/2003 | Eccardt et al. |
| 6,530,303 B1 | 3/2003 | Parks et al. |
| 6,536,536 B1 | 3/2003 | Gass et al. |
| 6,543,324 B2 | 4/2003 | Diis |
| 6,546,835 B2 | 4/2003 | Wang |
| 6,564,909 B1 | 5/2003 | Razzano |
| 6,575,067 B2 | 6/2003 | Parks et al. |
| 6,578,460 B2 | 6/2003 | Sartori |
| 6,578,856 B2 | 6/2003 | Kahle |
| 6,581,655 B2 | 6/2003 | Huang |
| 6,595,096 B2 | 7/2003 | Ccroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,659,233 B2 | 12/2003 | DeVlieg |
| 6,684,750 B2 | 2/2004 | Yu |
| 6,722,242 B2 | 4/2004 | Chuang |
| 6,734,581 B1 | 5/2004 | Griffis |
| 6,736,042 B2 | 5/2004 | Behne et al. |
| 6,742,430 B2 | 6/2004 | Chen |
| 6,796,208 B1 | 9/2004 | Jorgensen |
| 6,800,819 B2 | 10/2004 | Sato et al. |
| 6,826,988 B2 | 12/2004 | Gass et al. |
| 6,826,992 B1 | 12/2004 | Huang |
| 6,840,144 B2 | 1/2005 | Huang |
| 6,854,371 B2 | 2/2005 | Yu |
| 6,857,345 B2 | 2/2005 | Gass |
| 6,874,397 B2 | 4/2005 | Chang |
| 6,874,399 B2 | 4/2005 | Lee |
| 6,877,410 B2 | 4/2005 | Gass et al. |
| 6,880,440 B2 | 4/2005 | Gass et al. |
| 6,883,397 B2 | 4/2005 | Kimizuka |
| 6,889,585 B1 | 5/2005 | Harris et al. |
| 6,920,814 B2 | 7/2005 | Gass et al. |
| 6,922,153 B2 | 7/2005 | Pierga et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,968,767 B2 | 11/2005 | Yu |
| 6,986,370 B1 | 1/2006 | Schoene et al. |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 | 4/2006 | Gass et al. |
| 7,055,417 B1 | 6/2006 | Gass et al. |
| 7,077,039 B2 | 7/2006 | Gass et al. |
| 7,098,800 B2 | 8/2006 | Gass |
| 7,100,483 B2 | 9/2006 | Gass et al. |
| 7,137,326 B2 | 11/2006 | Gass et al. |
| 7,171,879 B2 | 2/2007 | Gass et al. |
| 7,197,969 B2 | 4/2007 | Gass et al. |
| 7,210,383 B2 | 5/2007 | Gass et al. |
| 7,357,056 B2 | 4/2008 | Gass et al. |
| 7,373,863 B2 | 5/2008 | O'Banion et al. |
| 7,895,927 B2 | 3/2011 | Gass |
| 9,522,476 B2 * | 12/2016 | Gass ............... B23D 47/08 |
| 2001/0032534 A1 | 10/2001 | Ceroll et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0043776 A1 | 4/2002 | Chuang |
| 2002/0050201 A1 | 5/2002 | Lane et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0069734 A1 | 6/2002 | Gass et al. |
| 2002/0088325 A1 | 7/2002 | Talesky et al. |
| 2002/0096030 A1 | 7/2002 | Wang |
| 2002/0096591 A1 | 7/2002 | Tanji |
| 2002/0109036 A1 | 8/2002 | Denen et al. |
| 2002/0134212 A1 | 9/2002 | Ceroll et al. |
| 2002/0170399 A1 | 11/2002 | Gass et al. |
| 2002/0170400 A1 | 11/2002 | Gass |
| 2002/0174755 A1 | 11/2002 | Behne et al. |
| 2002/0190581 A1 | 12/2002 | Gass et al. |
| 2003/0000359 A1 | 1/2003 | Eccardt et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2003/0213349 A1 | 11/2003 | Chang |
| 2004/0011177 A1 | 1/2004 | Huang |
| 2004/0040426 A1 | 3/2004 | Gass et al. |
| 2004/0060404 A1 | 4/2004 | Metzger, Jr. |
| 2004/0103544 A1 | 6/2004 | Hartmann |
| 2004/0104085 A1 | 6/2004 | Lang et al. |
| 2004/0118261 A1 | 6/2004 | Garcia et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0066784 A1 | 3/2005 | Gass |
| 2005/0087049 A1 | 4/2005 | Miller |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0268767 A1 | 12/2005 | Pierga et al. |
| 2005/0274432 A1 | 12/2005 | Gass et al. |
| 2006/0000337 A1 | 1/2006 | Gass |
| 2006/0032352 A1 | 2/2006 | Gass et al. |
| 2006/0096425 A1 | 5/2006 | Keller |
| 2006/0123960 A1 | 6/2006 | Gass et al. |
| 2006/0123964 A1 | 6/2006 | Gass et al. |
| 2006/0179983 A1 | 8/2006 | Gass et al. |
| 2006/0219076 A1 | 10/2006 | Gass et al. |
| 2006/0225551 A1 | 10/2006 | Gass |

(56) References Cited

U.S. PATENT DOCUMENTS

| | | |
|---|---|---|
| 2006/0230896 A1 | 10/2006 | Gass |
| 2006/0247795 A1 | 11/2006 | Gass et al. |
| 2006/0254401 A1 | 11/2006 | Gass et al. |
| 2006/0272463 A1 | 12/2006 | Gass |
| 2007/0028733 A1 | 2/2007 | Gass |
| 2008/0016998 A1 | 1/2008 | Keller |
| 2011/0023670 A1 | 2/2011 | Gass |
| 2011/0061768 A1 | 3/2011 | Gass et al. |

FOREIGN PATENT DOCUMENTS

| | | |
|---|---|---|
| DE | 76186 | 8/1921 |
| DE | 2917497 | 4/1979 |
| DE | 2800403 | 7/1979 |
| DE | 3427733 | 1/1986 |
| DE | 4205965 C1 | 2/1992 |
| DE | 4235161 | 5/1993 |
| DE | 4326313 | 2/1995 |
| DE | 19609771 | 6/1998 |
| DE | 20102704 | 2/2001 |
| EP | 146460 | 11/1988 |
| EP | 0362937 | 4/1990 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |
| JP | 06328359 | 11/1994 |
| WO | WO 01/26064 | 4/2001 |

OTHER PUBLICATIONS

Skil Model 3400-Type 1 10" Table Saw Parts List and Technical Bulletin, S-B Power Tool Company, Jun. 1993.
Shop Fox® Fence Operating Manual, Woodstock International, Inc., 1996, revised May 1997.
Gordon Engineering Corp., Product Catalog, pp. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Tablesaw Splitters and Blade Covers, *Fine Woodworking*, pp. 77-81, Dec. 2001.
The Merlin Splitter by Excalibur a Sommerville Design Product Overview & Generic Installation Notes, Sommerville Design & Manufacturin. Inc., at least as early as 2002.
INCRA Incremental Micro Precision Table Saw Fence Owner's Manual, Taylor Design Group, Inc., 2003.
Craftsman® Power and Hand Tools, pp. 142-143, 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Young Inventor: Teen's Device Earns Her Trip to Science Fair, May 5, 2006. *The Arizona Republic*, May 5, 2006.
Grizzly Industrial, Inc. Model G0605X/G0606X Extreme Series 12" Table Saw Owner's Manual, Grizzly Industrial, Inc., Oct. 2006.
Decision on Appeal No. 2007-002769 for U.S. Appl. No. 09/929,242, decided Aug. 29, 2007.
Decision on Appeal No. 2009-004424 for U.S. Appl. No. 10/984,643, decided Mar. 25, 2010.
*You Should Have Invented It*, French television show video/DVD.
Operator Injury Mitigation Using Electronic Sensing and Mechanical Braking Decoupling Devices in Handheld Circular Saws, Erin F. Epyard, date unknown.
Laguna Tools table saw owner's manual, date unknown.

\* cited by examiner

Detail A

Detail B

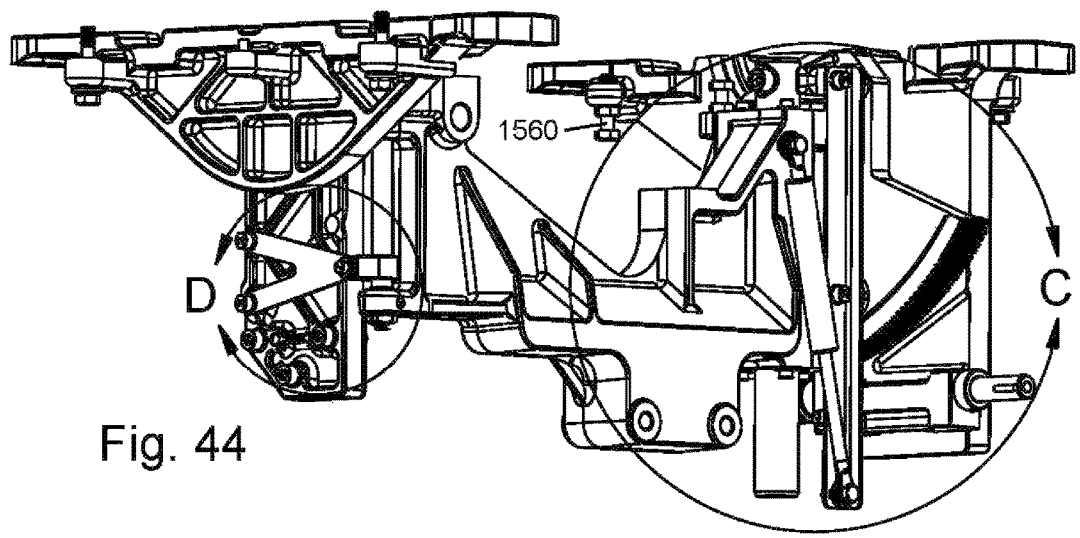
Fig. 44
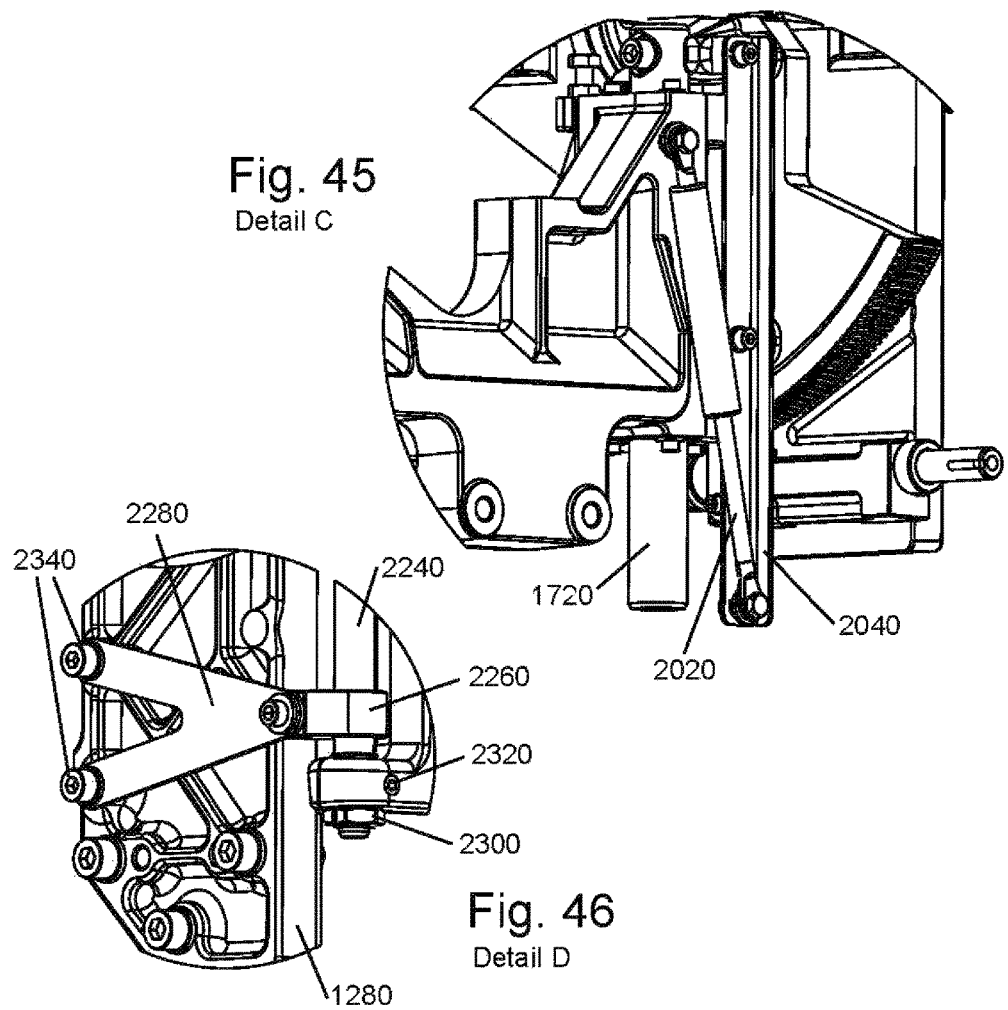
Fig. 45
Detail C
Fig. 46
Detail D

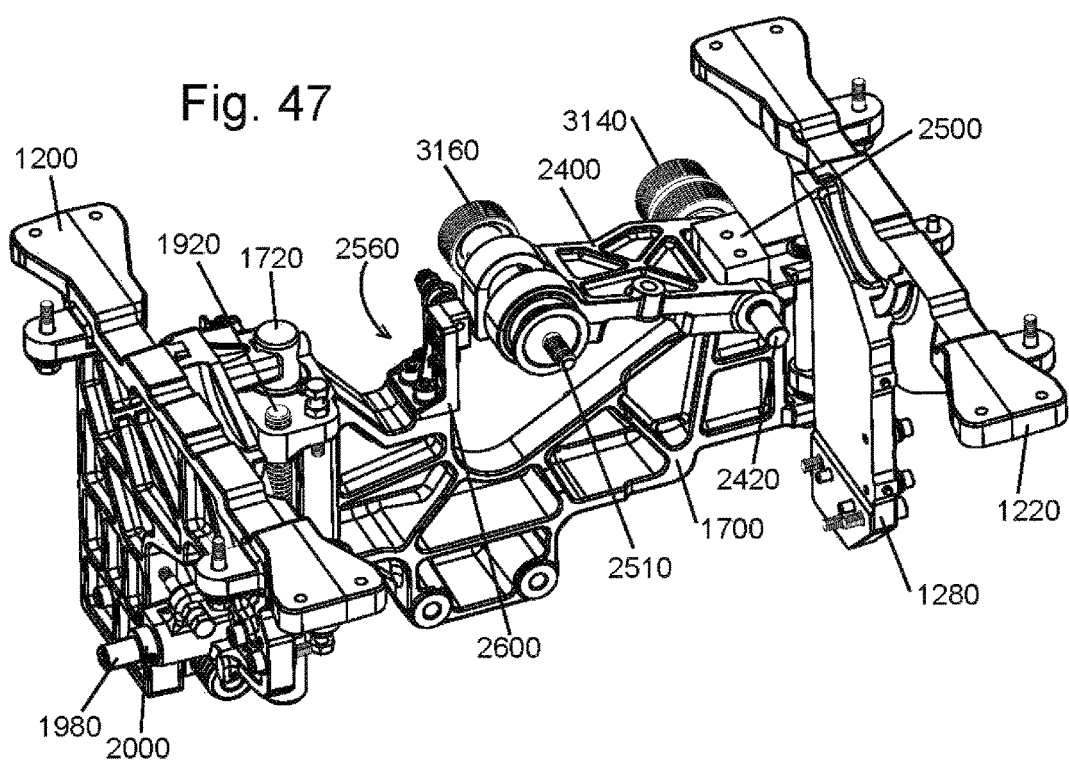
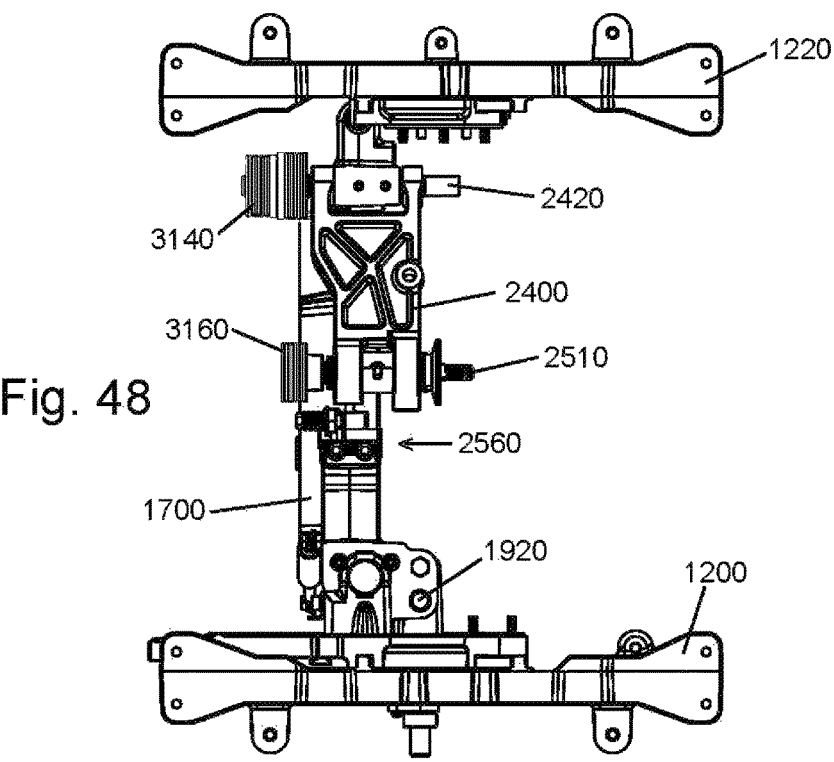

Detail E

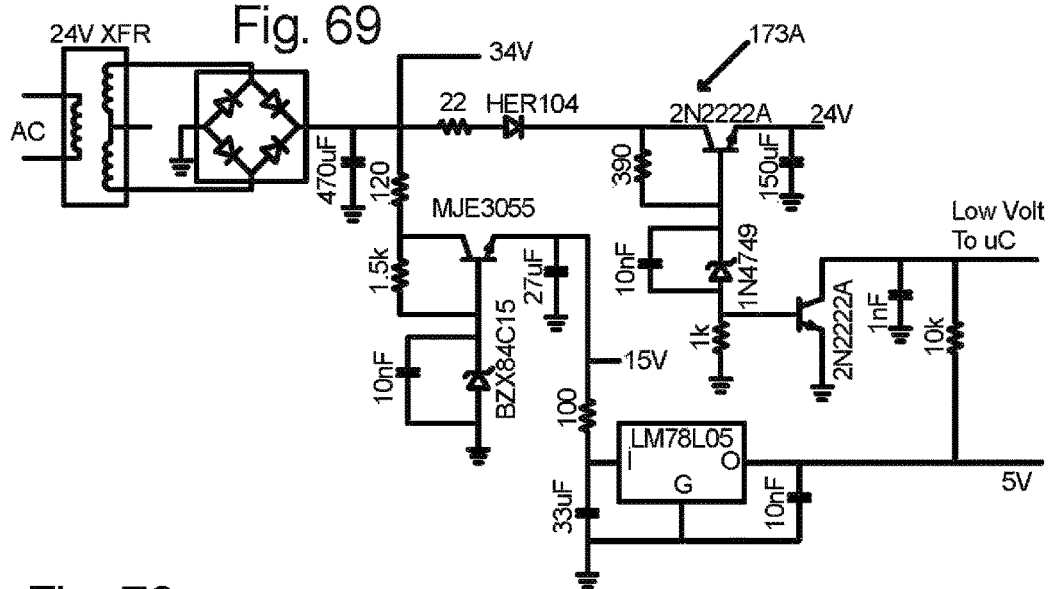
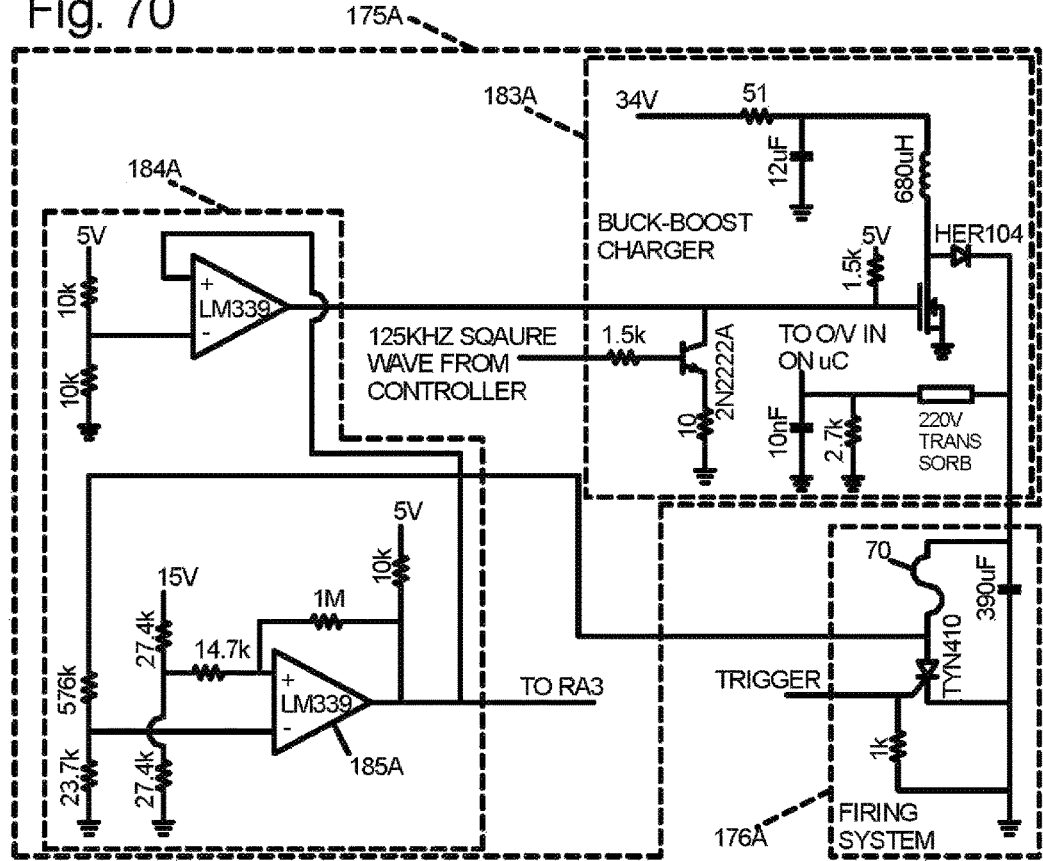

POWER EQUIPMENT WITH DETECTION AND REACTION SYSTEMS

CROSS-REFERENCE TO RELATED APPLICATIONS

This application is a continuation of the following U.S. Patent Applications, all of which are hereby incorporated by reference in their entireties:

Ser. No. 12/806,829, filed Aug. 20, 2010, which is a continuation of Ser. No. 11/796,819, filed Apr. 30, 2007, issuing as U.S. Pat. No. 8,079,292 on Dec. 20, 2011, which is a divisional continuation of Ser. No. 09/929,426, filed Aug. 13, 2001, issuing as U.S. Pat. No. 7,210,383 on May 1, 2007, which claims the benefit of and priority from a number of U.S. Provisional Patent Applications including Ser. No. 60/225,200, filed Aug. 14, 2000;

Ser. No. 12/806,829 is also a continuation of Ser. No. 12/655,695, filed Jan. 4, 2010, issuing as U.S. Pat. No. 8,006,595 on Aug. 30, 2011, which is a continuation of Ser. No. 11/975,985, filed Oct. 22, 2007, issuing as U.S. Pat. No. 7,640,835 on Jan. 5, 2010, which is a continuation of Ser. No. 09/929,221, filed Aug. 13, 2001, issuing as U.S. Pat. No. 7,284,467 on Oct. 23, 2007, which claims the benefit of and priority from a number of U.S. Provisional Patent Applications including Ser. No. 60/225,211, filed Aug. 14, 2000;

Ser. No. 12/806,829 is also a continuation of Ser. No. 12/002,388 filed Dec. 17, 2007, issuing as U.S. Pat. No. 8,011,279 on Sep. 6, 2011, which is a continuation of Ser. No. 09/929,227, filed Aug. 13, 2001, issuing as U.S. Pat. No. 7,308,843 on Dec. 18, 2007, which claims the benefit of and priority from a number of U.S. Provisional Patent Applications including Ser. No. 60/225,170, filed Aug. 14, 2000;

Ser. No. 12/806,829 is also a continuation of Ser. No. 11/401,050, filed Apr. 10, 2006, issuing as U.S. Pat. No. 7,788,999 on Sep. 7, 2010, which is a continuation of a number of applications including Ser. No. 09/929,240, filed Aug. 13, 2001, issuing as U.S. Pat. No. 7,100,483 on Sep. 5, 2006, which in turn claims the benefit of and priority from U.S. Provisional Patent Application Ser. No. 60/225,056, filed Aug. 14, 2000;

and Ser. No. 11/401,050 is also a continuation of Ser. No. 09/929,241, filed Aug. 13, 2001, issuing as U.S. Pat. No. 7,024,975 on Apr. 11, 2006, which in turn claims the benefit of and priority from a number of U.S. Provisional Patent Applications including Ser. No. 60/225,169, filed Aug. 14, 2000;

and Ser. No. 11/401,050 is also a continuation of Ser. No. 09/929,425, filed Aug. 13, 2001, issuing as U.S. Pat. No. 7,137,326 on Nov. 21, 2006, which in turn claims the benefit of and priority from U.S. Provisional Patent Application Ser. No. 60/225,210, filed Aug. 14, 2000;

and Ser. No. 11/401,050 is also a continuation of Ser. No. 10/172,553, filed Jun. 13, 2002, issuing as U.S. Pat. No. 7,231,856 on Jun. 19, 2007, which in turn claims the benefit of and priority from U.S. Provisional Patent Application Ser. No. 60/298,207, filed Jun. 13, 2001;

and Ser. No. 11/401,050 is also a continuation of Ser. No. 10/189,027, filed Jul. 2, 2002, issuing as U.S. Pat. No. 7,712,403 on May 11, 2010, which in turn claims the benefit of and priority from U.S. Provisional Patent Application Ser. No. 60/302,916, filed Jul. 3, 2001;

and Ser. No. 11/401,050 is also a continuation of Ser. No. 10/243,042, filed Sep. 13, 2002, issuing as U.S. Pat. No. 7,197,969 on Apr. 3, 2007, which in turn claims the benefit of and priority from U.S. Provisional Patent Application Ser. No. 60/324,729, filed Sep. 24, 2001;

and Ser. No. 11/401,050 is also a continuation of Ser. No. 10/643,296, filed Aug. 18, 2003, now abandoned, which in turn claims the benefit of and priority from U.S. Provisional Patent Application Ser. No. 60/406,138, filed Aug. 27, 2002;

and Ser. No. 11/401,050 is also a continuation of Ser. No. 10/794,161, filed Mar. 4, 2004, issuing as U.S. Pat. No. 7,098,800 on Aug. 29, 2006, which in turn claims the benefit of and priority from U.S. Provisional Patent Application Ser. No. 60/452,159, filed Mar. 5, 2003;

Ser. No. 12/806,829 is also a continuation of Ser. No. 12/800,607, filed May 19, 2010, issuing as U.S. Pat. No. 7,895,927 on Mar. 1, 2011, which is a continuation of a number of applications, including Ser. No. 11/542,938, filed Oct. 2, 2006, now abandoned, which in turn is a continuation of a number of applications, including Ser. No. 10/984,643, filed Nov. 8, 2004, issuing as U.S. Pat. No. 8,061,245 on Nov. 22, 2011, which also is a continuation of a number of applications, including Ser. No. 09/929,226, filed Aug. 13, 2001, issuing as U.S. Pat. No. 6,920,814 on Jul. 26, 2005, which in turn claims the benefit of and priority from U.S. Provisional Patent Application Ser. No. 60/225,206, filed Aug. 14, 2000;

and Ser. No. 10/984,643 is also a continuation of Ser. No. 09/929,240, filed Aug. 13, 2001, issuing as U.S. Pat. No. 7,100,483 on Sep. 5, 2006, which in turn claims the benefit of and priority from U.S. Provisional Patent Application Ser. No. 60/225,056, filed Aug. 14, 2000;

and Ser. No. 10/984,643 is also a continuation of Ser. No. 09/929,242, filed Aug. 13, 2001, issuing as U.S. Pat. No. 7,509,899 on Mar. 31, 2009, which claims the benefit of and priority from a number of U.S. Provisional Patent Applications including Ser. No. 60/225,089, filed Aug. 14, 2000;

and Ser. No. 10/984,643 is also a continuation of Ser. No. 10/051,782, filed Jan. 15, 2002, issuing as U.S. Pat. No. 6,877,410 on Apr. 12, 2005, which in turn claims the benefit of and priority from U.S. Provisional Patent Application Ser. No. 60/279,313, filed Mar. 27, 2001;

and Ser. No. 10/984,643 is also a continuation of Ser. No. 10/052,806, filed Jan. 16, 2002, issuing as U.S. Pat. No. 6,880,440 on Apr. 19, 2005, which in turn claims the benefit of and priority from U.S. Provisional Patent Application Ser. No. 60/270,942, filed Feb. 22, 2001;

and Ser. No. 10/984,643 is also a continuation of Ser. No. 10/205,164, filed Jul. 25, 2002, issuing as U.S. Pat. No. 6,945,149 on Sep. 20, 2005, which in turn claims the benefit of and priority from U.S. Provisional Patent Application Ser. No. 60/307,756, filed Jul. 25, 2001;

and Ser. No. 10/984,643 is also a continuation of Ser. No. 10/202,928, filed Jul. 25, 2002, issuing as U.S. Pat. No. 7,000,514 on Feb. 21, 2006, which in turn claims the benefit of and priority from U.S. Provisional Patent Application Ser. No. 60/308,492, filed Jul. 27, 2001;

and Ser. No. 10/984,643 is also a continuation of Ser. No. 10/785,361, filed Feb. 23, 2004, issuing as U.S. Pat. No. 6,997,090 on Feb. 14, 2006, which is a continuation of Ser. No. 10/215,929, filed Aug. 9, 2002, now abandoned, which in turn claims the benefit of and priority from U.S. Provisional Patent Application Ser. No. 60/312,141, filed Aug. 13, 2001;

Ser. No. 12/806,829 is also a continuation of Ser. No. 11/542,938, filed Oct. 2, 2006, now abandoned, which is a continuation of a number of applications, including Ser. No. 09/929,242, filed Aug. 13, 2001, issuing as U.S. Pat. No. 7,509,899 on Mar. 31, 2009, which claims the benefit of and priority from a number of U.S. Provisional Patent Applications including Ser. No. 60/225,089, filed Aug. 14, 2000;

and Ser. No. 11/542,938 is also a continuation of Ser. No. 11/401,774, filed Apr. 11, 2006, issuing as U.S. Pat. No. 7,525,055 on Apr. 28, 2009, which is a continuation of Ser. No. 11/027,322, filed Dec. 31, 2004, now abandoned, which claims the benefit of and priority from U.S. Provisional Patent Application Ser. No. 60/533,598, filed Dec. 31, 2003;

and Ser. No. 11/542,938 is also a continuation of Ser. No. 11/445,548, filed Jun. 2, 2006, issuing as U.S. Pat. No. 7,347,131 on Mar. 25, 2008;

and Ser. No. 11/542,938 is also a continuation of Ser. No. 11/506,260, filed Aug. 18, 2006, issuing as U.S. Pat. No. 7,359,174 on Apr. 15, 2008, which is a continuation of a number of application including Ser. No. 10/923,282, filed Aug. 20, 2004, now abandoned, which in turn claims the benefit of and priority from U.S. Provisional Patent Application Ser. No. 60/496,568, filed Aug. 20, 2003;

Ser. No. 12/806,829 is also a continuation of Ser. No. 12/590,094, filed Nov. 2, 2009, issuing as U.S. Pat. No. 7,958,806 on Jun. 14, 2011, which is a continuation of Ser. No. 09/929,236, filed Aug. 13, 2001, issuing as U.S. Pat. No. 7,610,836 on Nov. 3, 2009, which claims the benefit of and priority from a number of U.S. Provisional patent applications including Ser. No. 60/225,201, filed Aug. 14, 2000;

Ser. No. 12/806,829 is also a continuation of Ser. No. 11/811,719, filed Jun. 11, 2007, issuing as U.S. Pat. No. 7,832,314 on Nov. 16, 2010, which is a continuation of Ser. No. 11/061,162, filed Feb. 18, 2005, issuing as U.S. Pat. No. 7,228,772 on Jun. 12, 2007, which is a continuation of Ser. No. 09/929,244, filed Aug. 13, 2001, issuing as U.S. Pat. No. 6,857,345 on Feb. 22, 2005, which in turn claims the benefit of and priority from a number of U.S. Provisional Patent Applications including Ser. No. 60/225,212, filed Aug. 14, 2000;

Ser. No. 12/806,829 is also a continuation of Ser. No. 12/587,695, filed Oct. 9, 2009, issuing as U.S. Pat. No. 7,921,754 on Apr. 12, 2011, which is a continuation of Ser. No. 09/929,237, filed Aug. 13, 2001, issuing as U.S. Pat. No. 7,600,455 on Oct. 13, 2009, which claims the benefit of and priority from a number of U.S. Provisional Patent Applications including Ser. No. 60/225,059, filed Aug. 14, 2000;

Ser. No. 12/806,829 is also a continuation of Ser. No. 12/661,766, filed Mar. 22, 2010, issuing as U.S. Pat. No. 8,051,759 on Nov. 8, 2011, which is a continuation of Ser. No. 11/810,196, filed Jun. 4, 2007, issuing as U.S. Pat. No. 7,681,479 on Mar. 23, 2010, which is a continuation of Ser. No. 09/929,234, filed Aug. 13, 2001, issuing as U.S. Pat. No. 7,225,712 on Jun. 5, 2007, which claims the benefit of and priority from a number of U.S. Provisional Patent Applications including Ser. No. 60/225,094, filed Aug. 14, 2000;

Ser. No. 12/806,829 is also a continuation of Ser. No. 12/655,694, filed Jan. 4, 2010, issuing as U.S. Pat. No. 7,908,950 on Mar. 22, 2011, which is a continuation of Ser. No. 12/079,836, filed Mar. 27, 2008, issuing as U.S. Pat. No. 7,640,837 on Jan. 5, 2010, which is a divisional continuation of Ser. No. 09/929,235, filed Aug. 13, 2001, issuing as U.S. Pat. No. 7,350,444 on Apr. 1, 2008, which claims the benefit of and priority from a number of U.S. Provisional Patent Applications including Ser. No. 60/225,058, filed Aug. 14, 2000;

Ser. No. 12/806,829 is also a continuation of Ser. No. 12/799,211, filed Apr. 19, 2010, issuing as U.S. Pat. No. 8,100,039 on Jan. 24, 2012, which is a continuation of Ser. No. 12/220,946, filed Jul. 29, 2008, issuing as U.S. Pat. No. 7,698,976 on Apr. 20, 2010, which is a continuation of Ser. No. 09/929,238, filed Aug. 13, 2001, now abandoned, which claims the benefit of and priority from a number of U.S. Provisional Patent Applications including Ser. No. 60/225,057, filed Aug. 14, 2000;

Ser. No. 12/806,829 is also a continuation of Ser. No. 12/590,924, filed Nov. 16, 2009, issuing as U.S. Pat. No. 8,186,255 on May 29, 2012, which is a divisional continuation of Ser. No. 12/154,675, filed May 23, 2008, issuing as U.S. Pat. No. 7,617,752 on Nov. 17, 2009, which is a divisional continuation of Ser. No. 10/053,390, filed Jan. 16, 2002, issuing as U.S. Pat. No. 7,377,199 on May 27, 2008, which is a continuation-in-part of a number of applications including Ser. No. 09/676,190, filed Sep. 29, 2000, issuing as U.S. Pat. No. 7,055,417 on Jun. 6, 2006; and Ser. No. 10/053,390 also claims the benefit of and priority from U.S. Provisional Patent Application Ser. No. 60/270,011, filed Feb. 20, 2001;

Ser. No. 12/806,829 is also a continuation of Ser. No. 12/313,162, filed Nov. 17, 2008, issuing as U.S. Pat. No. 7,789,002 on Sep. 7, 2010, which is a continuation of Ser. No. 11/348,580, filed Feb. 6, 2006, now abandoned, which is a continuation of a number of applications including Ser. No. 10/052,705, filed Jan. 16, 2002, issuing as U.S. Pat. No. 6,994,004 on Feb. 7, 2006, which in turn claims the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, and Ser. No. 60/273,178, filed Mar. 2, 2001; and Ser. No. 11/348,580 also claims the benefit of and priority from U.S. Provisional Patent Application Ser. No. 60/667,485, filed Mar. 31, 2005; and Ser. No. 12/313,162 is also a continuation of Ser. No. 11/098,984, filed Apr. 4, 2005, issuing as U.S. Pat. No. 7,353,737 on Apr. 8, 2008, which is a continuation of Ser. No. 09/929,238, filed Aug. 13, 2001, now abandoned, Ser. No. 10/047,066, filed Jan. 14, 2002, issuing as U.S. Pat. No. 6,945,148 on Sep. 20, 2005, and Ser. No. 10/051,782, filed Jan. 15, 2002, issuing as U.S. Pat. No. 6,877,410 on Apr. 12, 2005;

Ser. No. 12/806,829 is also a continuation of Ser. No. 12/661,993, filed Mar. 26, 2010, issuing as U.S. Pat. No. 8,061,246 on Nov. 22, 2011, which is a continuation of Ser. No. 11/982,972, filed Nov. 5, 2007, issuing as U.S. Pat. No. 7,685,912 on Mar. 30, 2010, which is a continuation of Ser. No. 10/932,339, filed Sep. 1, 2004, issuing as U.S. Pat. No. 7,290,472 on Nov. 6, 2007, which is a continuation of Ser. No. 10/047,066, filed Jan. 14, 2002, issuing as U.S. Pat. No. 6,945,148 on Sep. 20, 2005, which in turn claims the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, and Ser. No. 60/273,902, filed Mar. 6, 2001; and Ser. No. 10/932,339 is also a continuation of Ser. No. 10/050,085, filed Jan. 14, 2002, now abandoned;

Ser. No. 12/806,829 is also a continuation of Ser. No. 10/100,211, filed Mar. 13, 2002, which claims the benefit of and priority from U.S. Provisional Patent Application Ser. No. 60/275,583, filed Mar. 13, 2001;

Ser. No. 12/806,829 is also a continuation of Ser. No. 11/256,757, filed Oct. 24, 2005, issuing as U.S. Pat. No. 8,065,943 on Nov. 29, 2011, which is a continuation of Ser. No. 09/955,418, filed Sep. 17, 2001, issuing as U.S. Pat. No. 6,957,601 on Oct. 25, 2005, which in turn claims the benefit of and priority to a number of U.S. Provisional Patent Applications, including: Ser. No. 60/233,459, filed Sep. 18, 2000, Ser. No. 60/270,011, filed Feb. 20, 2001, Ser. No.

60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, Ser. No. 60/273,902, filed Mar. 6, 2001, Ser. No. 60/275,594, filed Mar. 13, 2001, Ser. No. 60/275,595, filed Mar. 13, 2001, Ser. No. 60/279,313, filed Mar. 27, 2001, Ser. No. 60/292,081, filed May 17, 2001, Ser. No. 60/292,100, filed May 17, 2001, Ser. No. 60/298,207, filed Jun. 13, 2001, Ser. No. 60/302,937, filed Jul. 2, 2001, Ser. No. 60/302,916, filed Jul. 3, 2001, Ser. No. 60/306,202, filed Jul. 18, 2001, Ser. No. 60/307,756, filed Jul. 25, 2001, Ser. No. 60/308,492, filed Jul. 27, 2001, and Ser. No. 60/312,141, filed Aug. 13, 2001;

Ser. No. 12/806,829 is also a continuation of Ser. No. 10/146,527, filed May 15, 2002, which claims the benefit of and priority from U.S. Provisional Patent Application Ser. No. 60/292,100, filed May 17, 2001;

Ser. No. 12/806,829 is also a continuation of Ser. No. 12/586,469, filed Sep. 21, 2009, now abandoned, which is a divisional continuation of Ser. No. 11/702,330, filed Feb. 5, 2007, issuing as U.S. Pat. No. 7,591,210 on Sep. 22, 2009, which is a continuation of Ser. No. 10/189,031, filed Jul. 2, 2002, issuing as U.S. Pat. No. 7,171,879 on Feb. 6, 2007, which claims the benefit of and priority from U.S. Provisional Patent Application Ser. No. 60/302,937, filed Jul. 2, 2001;

Ser. No. 12/806,829 is also a continuation of Ser. No. 11/208,214, filed Aug. 19, 2005, issuing as U.S. Pat. No. 7,784,507 on Aug. 31, 2010, which is a continuation of Ser. No. 10/251,576, filed Sep. 20, 2002, now abandoned, which claims the benefit of and priority to U.S. Provisional Patent Application Ser. No. 60/323,975, filed Sep. 21, 2001, and Ser. No. 10/251,576 is also a continuation-in-part of Ser. No. 10/197,975, filed Jul. 18, 2002, now abandoned, which claims the benefit of and priority to U.S. Provisional Patent Application Ser. No. 60/306,202, filed Jul. 18, 2001, and Ser. No. 11/208,214 is also a continuation-in-part of Ser. No. 09/676,190, filed Sep. 29, 2000, issuing as U.S. Pat. No. 7,055,417 on Jun. 6, 2006, which in turn claims the benefit of and priority from U.S. Provisional Patent Application Ser. No. 60/157,340, filed Oct. 1, 1999 and Ser. No. 60/182,866, filed Feb. 16, 2000;

Ser. No. 12/806,829 is also a continuation of Ser. No. 12/231,080, filed Aug. 29, 2008, issuing as U.S. Pat. No. 7,900,541 on Mar. 8, 2011, which is a continuation of Ser. No. 11/487,717, filed Jul. 17, 2006, issuing as U.S. Pat. No. 7,421,315, on Sep. 2, 2008, which is a continuation of U.S. patent application Ser. No. 10/292,607, filed Nov. 12, 2002, issuing as U.S. Pat. No. 7,077,039 on Jul. 18, 2006, which claims the benefit of and priority from U.S. Provisional Patent Application Ser. No. 60/335,970, filed Nov. 13, 2001;

Ser. No. 12/806,829 is also a continuation of Ser. No. 12/655,962, filed Jan. 11, 2010, now abandoned, which is a continuation of Ser. No. 12/313,277, filed Nov. 17, 2008, issuing as U.S. Pat. No. 7,644,645 on Jan. 12, 2010, which is a continuation of Ser. No. 10/345,630, filed Jan. 15, 2003, now abandoned, which claims the benefit of and priority from U.S. Provisional Patent Application Ser. No. 60/349,989, filed Jan. 16, 2002;

Ser. No. 12/806,829 is also a continuation of Ser. No. 12/658,759, filed Feb. 12, 2010, now abandoned, which is a continuation of Ser. No. 11/787,471, filed Apr. 17, 2007, issuing as U.S. Pat. No. 7,661,343 on Feb. 16, 2010, which is a continuation of Ser. No. 10/341,260, filed Jan. 13, 2003, now abandoned, which claims the benefit of and priority from U.S. Provisional Patent Application Ser. No. 60/351,797, filed Jan. 25, 2002;

Ser. No. 12/806,829 is also a continuation of Ser. No. 11/647,676, filed Dec. 29, 2006, issuing as U.S. Pat. No. 7,836,804 on Nov. 23, 2010, which is a continuation-in-part of Ser. No. 10/923,290, filed Aug. 20, 2004, issuing as U.S. Pat. No. 7,472,634 on Jan. 6, 2009, which claims the benefit of and priority from U.S. Provisional Patent Application Ser. No. 60/496,550, filed Aug. 20, 2003;

Ser. No. 12/806,829 is also a continuation of Ser. No. 12/079,820, filed Mar. 27, 2008, issuing as U.S. Pat. No. 7,845,258 on Dec. 7, 2010, which is a divisional continuation of Ser. No. 10/923,273, filed Aug. 20, 2004, issuing as U.S. Pat. No. 7,350,445 on Apr. 1, 2008, which claims the benefit of and priority from U.S. Provisional Patent Application Ser. No. 60/496,574, filed Aug. 20, 2003;

Ser. No. 12/806,829 is also a continuation of Ser. No. 12/454,569, filed May 18, 2009, issuing as U.S. Pat. No. 7,991,503 on Aug. 2, 2011, which is a continuation of Ser. No. 11/027,600, filed Dec. 31, 2004, issuing as U.S. Pat. No. 7,536,238 on May 19, 2009, which claims the benefit of and priority from U.S. Provisional Patent Application Ser. No. 60/533,791, filed Dec. 31, 2003;

Ser. No. 12/806,829 is also a continuation of Ser. No. 12/799,915, filed May 3, 2010, issuing as U.S. Pat. No. 8,087,438 on Jan. 3, 2012, which is a continuation of Ser. No. 12/322,069, filed Jan. 26, 2009, issuing as U.S. Pat. No. 7,707,918 on May 4, 2010, which is a continuation of U.S. patent application Ser. No. 11/107,499, filed Apr. 15, 2005, issuing as U.S. Pat. No. 7,481,140 on Jan. 27, 2009;

Ser. No. 12/806,829 is also a continuation of Ser. No. 12/077,576, filed Mar. 19, 2008, now abandoned, which is a continuation of Ser. No. 11/027,254, filed Dec. 31, 2004, now abandoned, which claims the benefit of and priority from U.S. Provisional Patent Application Ser. No. 60/533,852, filed Dec. 31, 2003;

Ser. No. 12/806,829 is also a continuation of Ser. No. 12/799,920, filed May 3, 2010, issuing as U.S. Pat. No. 8,122,807 on Feb. 28, 2012, which is a continuation of Ser. No. 11/026,114, filed Dec. 31, 2004, issuing as U.S. Pat. No. 7,707,920 on May 4, 2010, which claims the benefit of and priority from U.S. Provisional Patent Application Ser. No. 60/533,811, filed Dec. 31, 2003;

Ser. No. 12/806,829 is also a continuation of Ser. No. 11/026,006, filed Dec. 31, 2004, issuing as U.S. Pat. No. 8,459,157 on Jun. 11, 2013, which claims the benefit of and priority from U.S. Provisional Patent Application Ser. No. 60/533,575, filed Dec. 31, 2003;

Ser. No. 12/806,829 is also a continuation of Ser. No. 11/045,972, filed Jan. 28, 2005, issuing as U.S. Pat. No. 7,827,890 on Nov. 9, 2010, which claims the benefit of and priority from U.S. Provisional Patent Application Ser. No. 60/540,377, filed Jan. 29, 2004; and Ser. No. 12/806,829 is also a continuation of Ser. No. 12/454,730, filed May 20, 2009, issuing as U.S. Pat. No. 7,997,176 on Aug. 16, 2011, which is a continuation of Ser. No. 11/395,502, filed Mar. 31, 2006, now abandoned, which claims the benefit of and priority from U.S. Provisional Patent Application Ser. No. 60/667,485, filed Mar. 31, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The computer program listing identified herein is subject to copyright protection.

COMPUTER PROGRAM LISTING APPENDIX

A computer program listing is being submitted herewith electronically via EFS-WEB as a Computer Program Listing Appendix. The computer program listing is hereby incorporated by reference. The computer program listing is one ASCII text file entitled "sawbrk.txt". The ASCII text file was created Jun. 29, 2000. The size of the ASCII text file is 50 kilobytes. The ASCII text file is part of U.S. Provisional Patent Application 60/225,059, filed Aug. 14, 2000, which is hereby incorporated by reference into the present application. The file submitted electronically via EFS-WEB has a date of Nov. 21, 2016 and it is an identical copy of the ASCII text file created Jun. 29, 2000.

FIELD

The present disclosure relates to safety systems and more particularly to methods for enhancing the safety of power equipment.

BACKGROUND

Power equipment such as table saws, miter saws and other woodworking machinery include cutting tools like circular saw blades and knife blades that present a risk of injury to a user of the equipment. Accordingly, safety features or systems are incorporated with power equipment to minimize the risk of injury. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

Other safety systems try to prevent or minimize injury by detecting and reacting to an event. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine. U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid.

U.S. Pat. No. 4,117,752, which is herein incorporated by reference, discloses a braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms-1 s to stop the blade. Therefore, the system is too slow to stop the blade quickly enough to avoid serious injury.

BRIEF DESCRIPTION OF THE DRAWINGS

FIG. 44 shows a perspective view of an elevation plate and elevation system with portions labeled "C" and "D" designated for detail views.

FIG. 45 is the detail view of the portion labeled "C" in FIG. 44, showing part of an elevation system.

FIG. 46 is the detail view of the portion labeled "D" in FIG. 44, showing part of an elevation system.

FIG. 47 is a perspective top view of part of the internal mechanism of the saw shown in FIG. 3, including an elevation plate and arbor assembly.

FIG. 48 is a bottom view of the components shown in FIG. 47.

FIG. 69 is a schematic of a power supply of the subsystem of FIG. 65.

FIG. 70 is a schematic of a boost regulator portion and a firing portion of the subsystem of FIG. 65.

DETAILED DESCRIPTION

Figure 1:
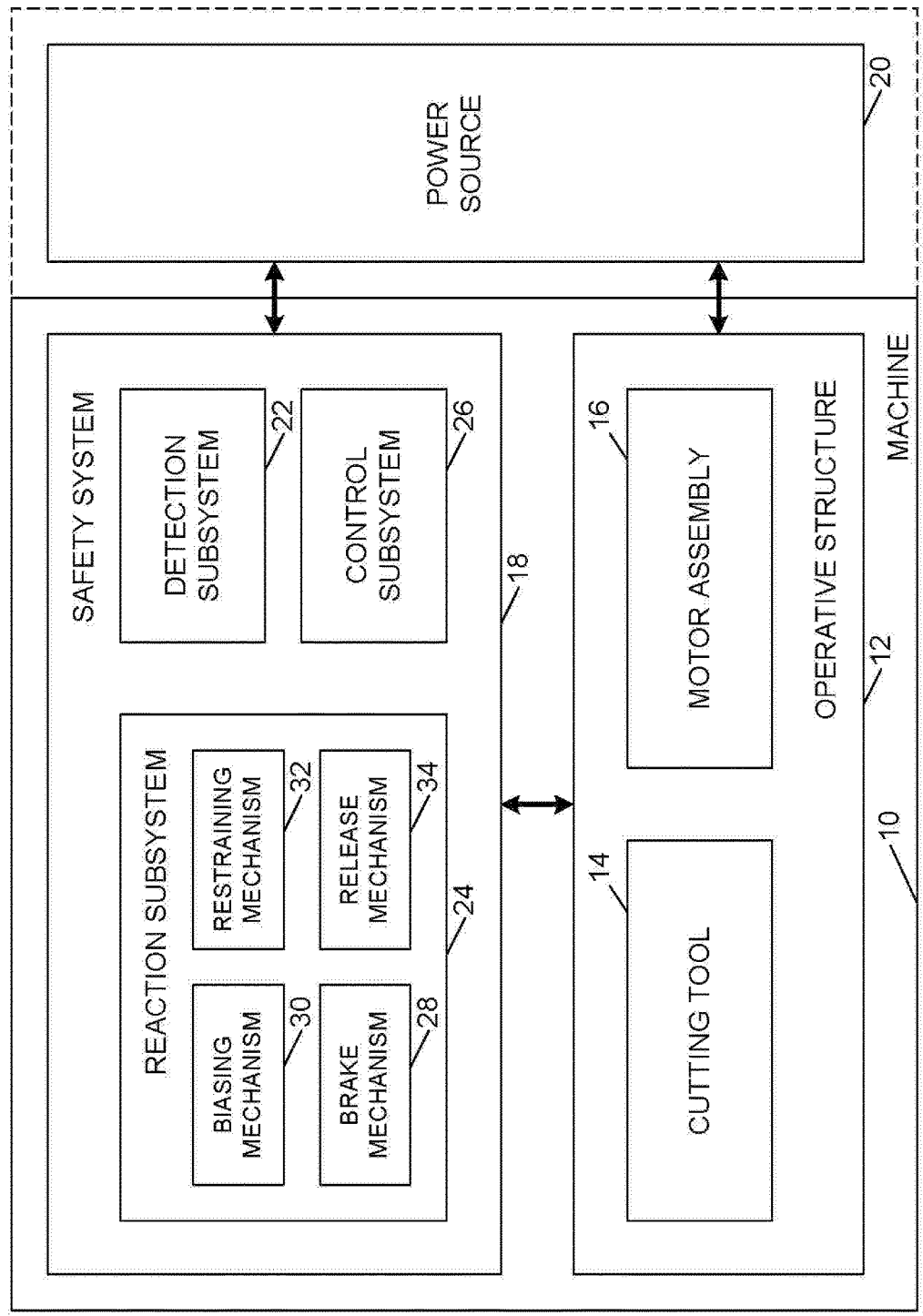
FIG. 1 is a schematic block diagram of a machine with a fast-acting safety system.

A machine that may incorporate a retraction system according to the present disclosure is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
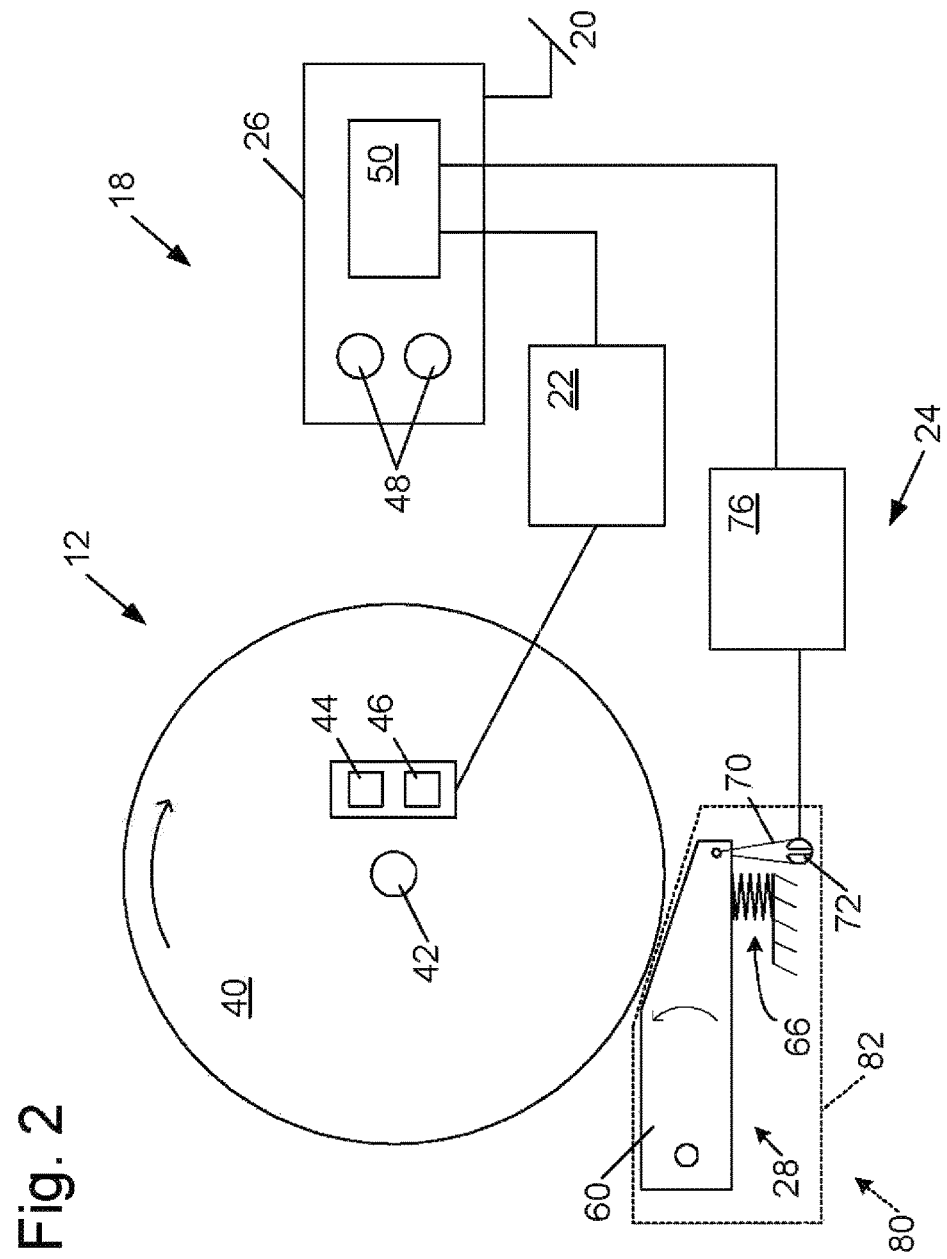
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC, and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. The detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC, and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, entitled "Firing Subsystem For Use In Fast Acting Safety System," filed Aug. 14, 2000 by SD3, LLC, U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

Figure 15:
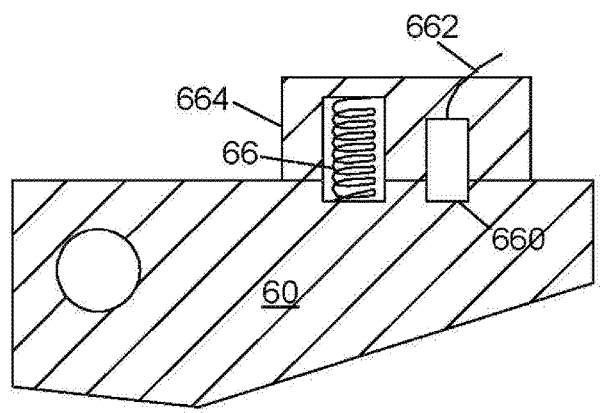
FIG. 15 shows an explosive charge that can be triggered by a firing subsystem.

Other systems can also be used to shift the pawl or pawls into contact with the blade, and firing system 76 may also be used to trigger some action other than burning a fusible member. For example, firing system 76 can fire a small explosive charge to move a pawl. FIG. 15 shows a relatively small, self-contained explosive charge 660 in the form of a squib or detonator that can be used to drive pawl 60 against a blade. An example of a suitable explosive charge is an M-100 detonator available, for example, from Stresau Laboratory, Inc., of Spooner, Wis. Although any suitable explosive charge system may be used, the exemplary embodiment preferably uses a self-contained charge or squib to increase safety and focus the force of the explosion along the direction of movement of the pawl. A trigger line 662 extends from the charge, and it may be connected to firing system 76 to trigger detonation.

Explosive charge 660 can be used to move pawl 60 by inserting the charge between the pawl and a stationary block 664 adjacent the charge. When the charge detonates, the pawl is pushed away from the block. A compression spring 66 is placed between the block and pawl to ensure the pawl does not bounce back from the blade when the charge is detonated. Prior to detonation, the pawl is held away from the blade by the friction-fit of the charge in both the block and pawl. However, the force created upon detonation of the charge is more than sufficient to overcome the friction fit. Alternatively, the pawl may be held away from the blade by other mechanisms such as a frangible member, gravity, a spring between the pawl and block, etc.

Firing system 76 may also trigger a DC solenoid, which can be over-driven with a current surge to create a rapid displacement, a pressurized air or gas cylinder to supply the pressure in place of the spring or charge, or an electromagnet to either repel the pawl against the blade or to release a spring-loaded pawl toward the blade.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. Nos. 60/182,866 and 60/157,340, the disclosures of which are herein incorporated by reference.

As briefly mentioned above, reaction subsystem 24 can be configured with a retraction system to retract or move a cutting tool away from the point of accidental contact with a user. Moving away from the point of accidental contact reduces the time the cutting tool is in contact with the user, thereby minimizing any injury to the user. Moving the cutting tool away from the point of accidental contact also prevents the cutting tool from moving toward the user, which could increase any injury to the user. For example, a spinning blade in a miter saw has substantial angular momentum, and that angular momentum could cause the blade to move downward toward a user when a brake pawl hits the blade. The spinning blade in a table saw also has substantial angular momentum that could cause the blade to move upward toward a user when a brake pawl hits the blade, depending on the position of the brake, the weight of the blade and the amount of play in the structure supporting the blade. Preventing any such movement lessens the potential injury to the user. A retraction system may be used in addition to or instead of other safety mechanisms.

Figure 3:
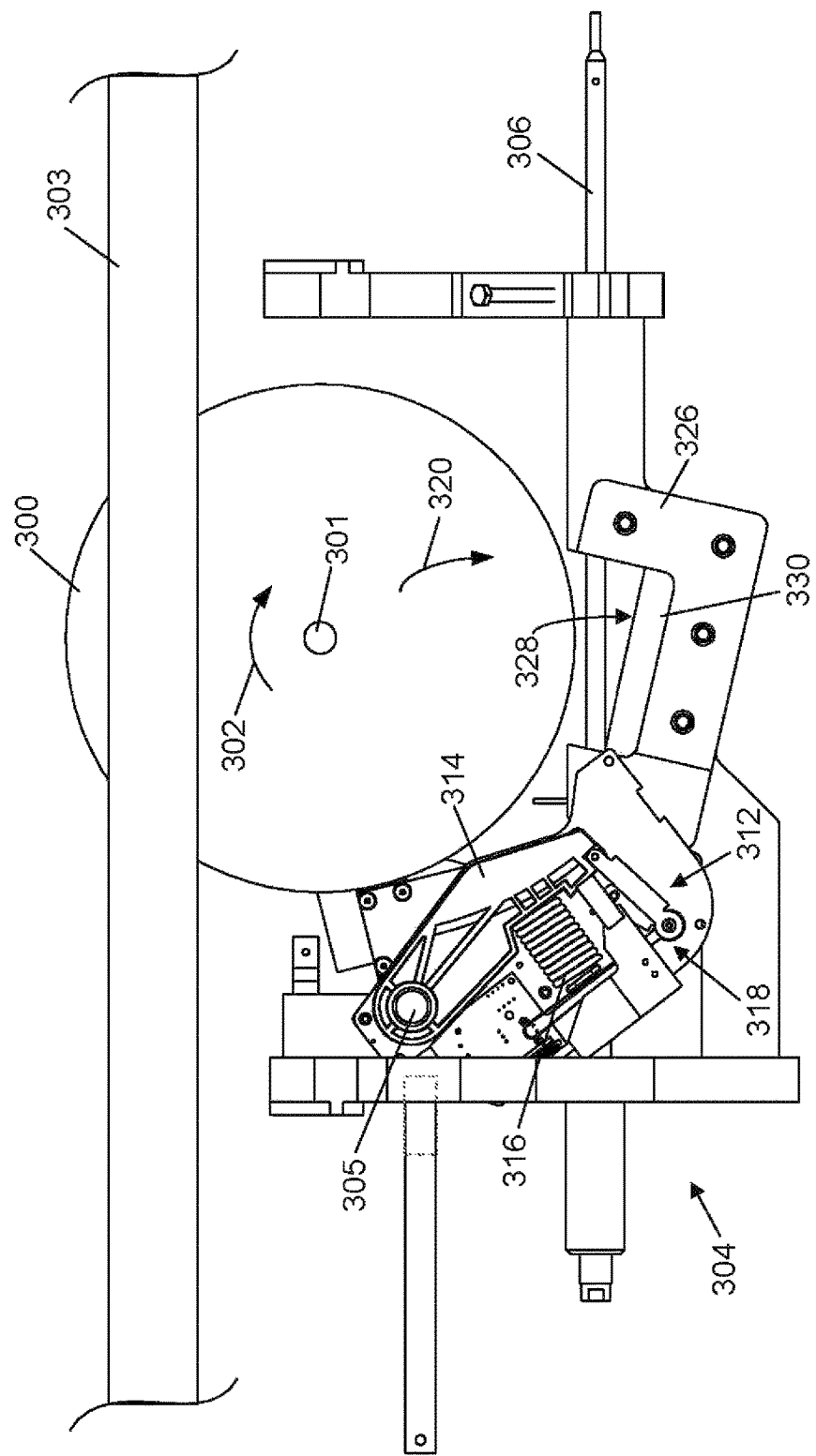
FIG. 3 is a schematic side view of a table saw with a retraction system.
Figure 4:
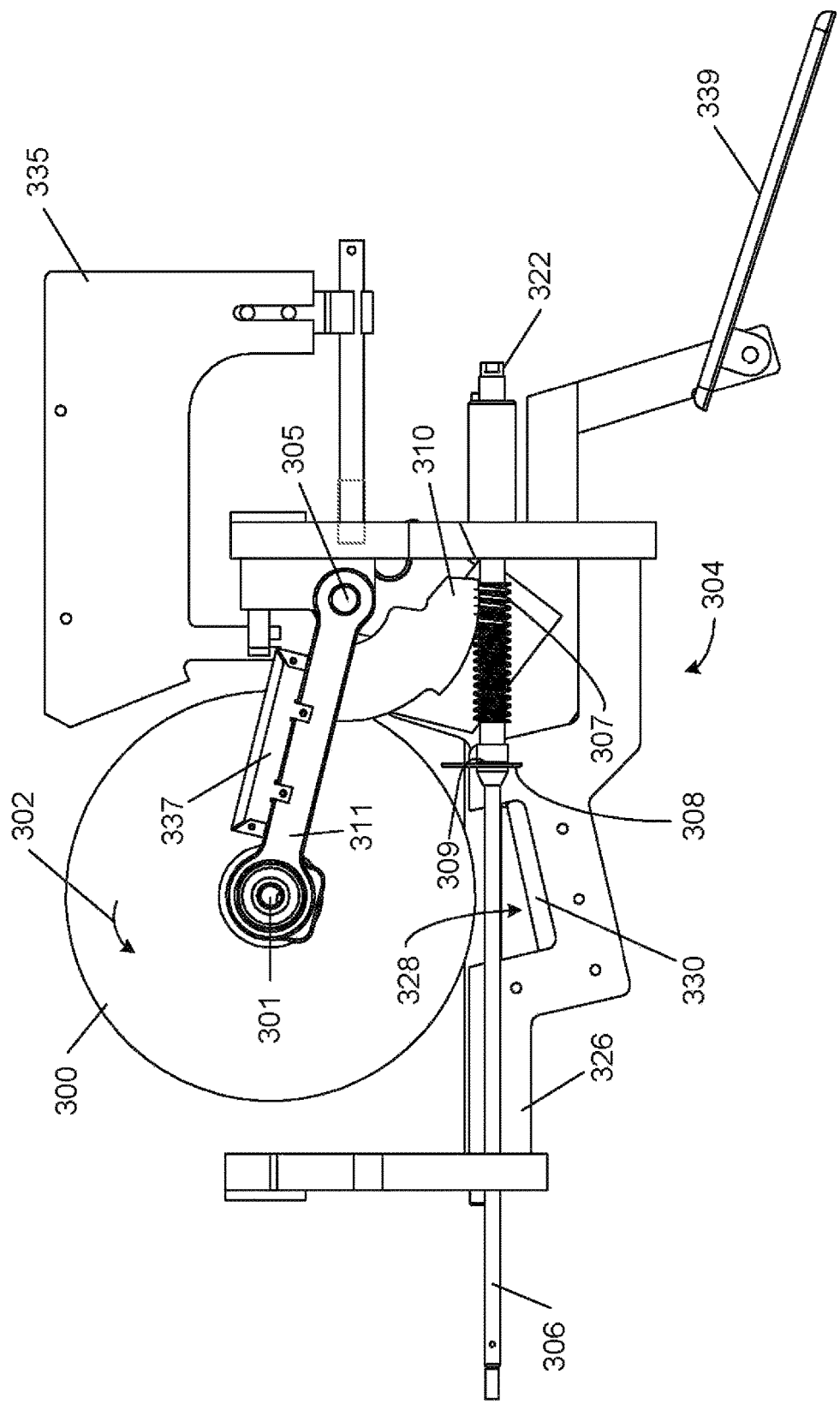
FIG. 4 is a schematic side view of a second side of a table saw with a retraction system.

FIGS. 3 and 4 show side views of a table saw configured with both a retraction system and a braking mechanism. A blade 300 is mounted on an arbor 301 to spin in the direction of arrow 302. A table 303 (not shown in FIG. 4), which defines the work surface or cutting region for the table saw, is adjacent the blade and the blade extends above the table. A support structure 304 may support blade 300 and arbor 301 in any known way, or as described in more detail in U.S. Provisional Patent Application Ser. No. 60/225,058, titled "Table Saw with Improved Safety System," filed Aug. 14, 2000.

Blade 300 is configured to pivot up and down so that a user can position the blade to extend above the table as needed. The blade pivots around a pin 305. A user may pivot the blade to adjust its position by turning a shaft 306 on which a worm gear 307 is mounted. The worm gear is mounted on the shaft so that it turns with the shaft, but so that it may slide on the shaft when necessary, as explained below. Worm gear 307 is mounted on shaft 306 like a collar, with the shaft extending through a longitudinal hole in the worm gear. The worm gear is held in place during normal operation of the saw by a spring clip 308, which is positioned in a groove or channel 309 on the worm gear and which also engages a detent or shoulder on shaft 306 to hold the worm gear in place. The worm gear engages an arcuate rack 310 that supports an arbor block 311, which in turn supports arbor 301 and blade 300. Thus, when a user turns shaft 306, such as by turning a knob attached to the shaft (not shown), worm gear 307 moves arbor block 311 and the blade up or down, depending on the direction that the worm gear is turned.

A brake cartridge 312 is mounted in the saw adjacent blade 300. The brake cartridge includes a pawl 314 biased toward blade 300 by a spring 316. The pawl is held away from blade 300 by a release mechanism 318, as described generally above and as described in more detail in U.S. Provisional Patent Application Ser. No. 60/225,170, entitled "Spring-Biased Brake Mechanism for Power Equipment," U.S. Provisional Patent Application Ser. No. 60/225,169, entitled "Brake Mechanism for Power Equipment," U.S. Provisional Patent Application Ser. No. 60/225,201, entitled "Replaceable Brake Mechanism for Power Equipment," and U.S. Provisional Patent Application Ser. No. 60/225,212, entitled "Brake Positioning System," all filed Aug. 14, 2000. The cartridge is configured so that the release mechanism releases the pawl into the blade upon the receipt of a detection signal, as explained generally above and as explained in more detail in U.S. Provisional Patent Application Ser. No. 60/225,056, titled "Firing Subsystem for use in a Fast-Acting Safety System," filed Aug. 14, 2000.

Brake cartridge 312 is positioned on the blade's pivot axis so that pawl 314 can move around pin 305. Thus, when pawl 314 hits the blade, the angular momentum of the blade is transferred to the arbor block, and the blade, arbor block, rack and cartridge try to retract or move down in the direction of arrow 320. Alternatively, the cartridge may be positioned on a pin different from pin 305, but that still pivots with the blade.

The blade will move down to the extent permitted by the contact between rack 310 and worm gear 307. If the worm gear is fixed in place, the downward movement of the blade may strip teeth on the rack and/or worm gear, and may prevent the blade from moving down as far as desired. In the embodiment shown in FIGS. 3 and 4, the worm gear is adapted to snap free and move on shaft 306 when the pawl hits the blade.

When the pawl hits the blade, the resultant angular momentum impulse causes spring clip 308 to snap loose, allowing the worm gear to slide down the shaft toward an end 322 of the shaft. The spring clip snaps loose because the rack moves down when the blade is stopped, and the rack contacts the worm gear and forces the worm gear to move. The force of the rack against the worm gear causes the spring clip to snap loose. The worm gear is put back in place by moving it back along shaft 306 until the spring clip snaps into place on the shaft.

The table saw shown in FIGS. 3 and 4 also includes a support 326 configured with a seat or region 328 in which is placed an impact-absorbing material 330. The support is positioned under the arbor and arbor block so that when the blade retracts, the arbor block strikes impact-absorbing material 330. Support 326 and impact absorbing material 330 act as a barrier to stop the downward movement of the blade. The support is positioned so that blade 300 may retract a sufficient distance. The impact-absorbing material can be any one of a number of cushioning materials, such as rubber, dense foam, plastic, etc. One material found to be suitable is available under the part number C-1002-06 from AearoEAR, of Indianapolis, Ind. Alternatively, impact-absorbing material 330 may be attached to the undersurface of the arbor block instead of on support 326. Additionally, support 326 may take many forms. In fact, shaft 306 may be configured and positioned so that it provides a surface to stop the downward movement of the blade.

FIG. 4 also shows a splitter 335 that extends above table 303 behind blade 300 to prevent kickback. A blade guard may also substantially enclose blade 300. FIG. 4 further shows a housing 337 for electronic components relating to the safety system, and a motor mount 339, which are not shown in FIG. 3.

In the construction described above, the angular momentum of the blade causes the blade, arbor block and cartridge to all pivot down away from the cutting region when the pawl strikes the blade. Thus, the angular momentum of the blade causes the retraction. Blade 300 is permitted to move downward a sufficient distance so that the blade is completely retracted. In independent experiments, the safety system depicted in FIGS. 3 and 4 and described above has been shown to retract the blade completely below table 303 within approximately 14 milliseconds after contact is detected. Indeed the downward motion of the blade during retraction is too fast to detect with the human eye, i.e., the blade disappears below table 303 with no discernable transition or downward motion. The ability of the blade to retract minimizes any injury from accidental contact with the blade.

Figure 5:
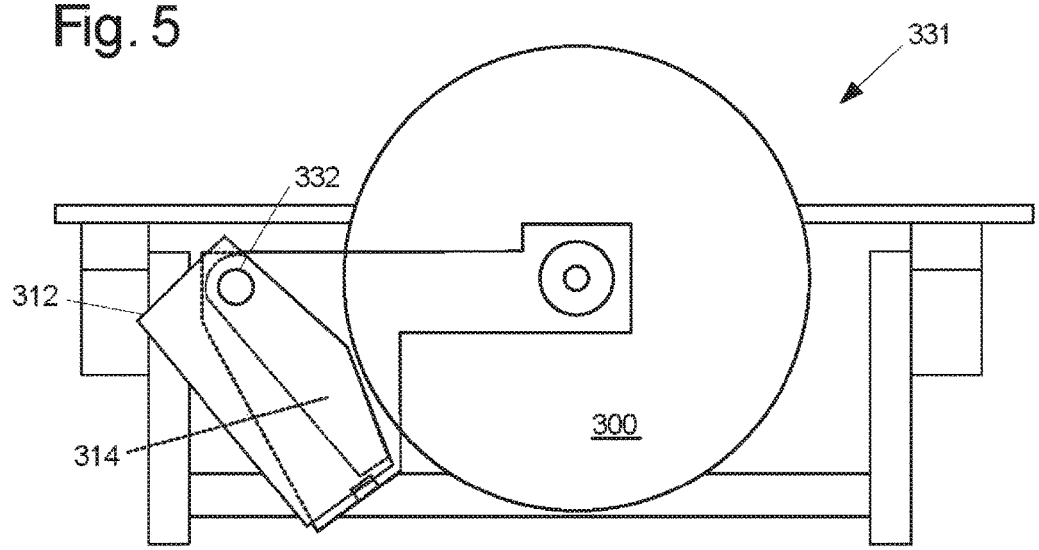
FIG. 5 is a schematic, side view of a saw with another embodiment of a retraction system.

FIG. 5 shows another embodiment of a retraction system used with a brake pawl. A saw 331 includes a blade 300 and a brake cartridge 312 housing a brake pawl 314. The cartridge and pawl are mounted to the frame of the saw by a pin 332. The pin is mounted to the saw in such a way that it may not pivot up and down with the blade. When the blade hits the pawl, the blade climbs down the pawl, or in other words, moves generally around the point of contact with the pawl. The pawl and blade do not pivot downward together, as in the embodiment shown in FIGS. 3 and 4, because the pawl is fixed to the frame of the saw. In this embodiment, the blade retracts by "climbing" down the pawl.

Figure 6:
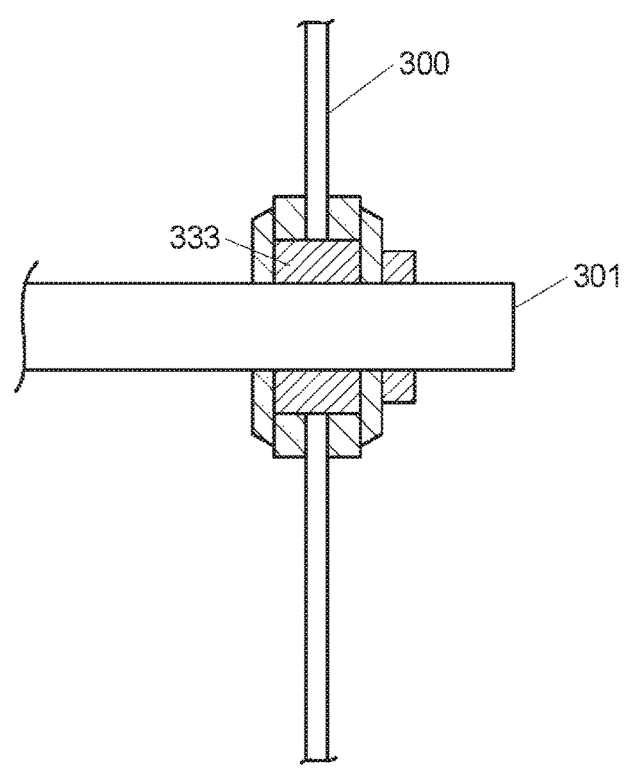
FIG. 6 is a section view of a retraction system using a deformable bushing.

Another embodiment of a retraction system comprises a compressible bushing. Typically, a blade 300 in a table saw, miter saw or other machine is mounted to an arbor over a bushing 333, as shown in FIG. 6. A locking nut, washers and an arbor flange are used to secure the blade to the arbor. Bushing 333 may be constructed from a material that is soft enough to deform when the blade is stopped suddenly. For example, depending on the type of braking system used, a substantial radial impact load may be transmitted to the arbor when the brake is actuated. A deformable bushing can be used to absorb some of this impact and reduce the chance of damage to the arbor. In addition, proper positioning of the brake in combination with a deformable bushing may be employed to cause the blade to move away from the user upon activation of the brake. Where a plastic bushing is placed between the blade and the arbor, the substantial force created by stopping the blade almost instantly may cause the bushing to deform. Typically, the edge of the mounting hole of the blade will bite into the bushing as the blade attempts to rotate about the pawl. Therefore, if the pawl is mounted at the back of the blade, then the blade will tend to move downward into the bushing and away from the user when the pawl engages the blade.

Figure 7:
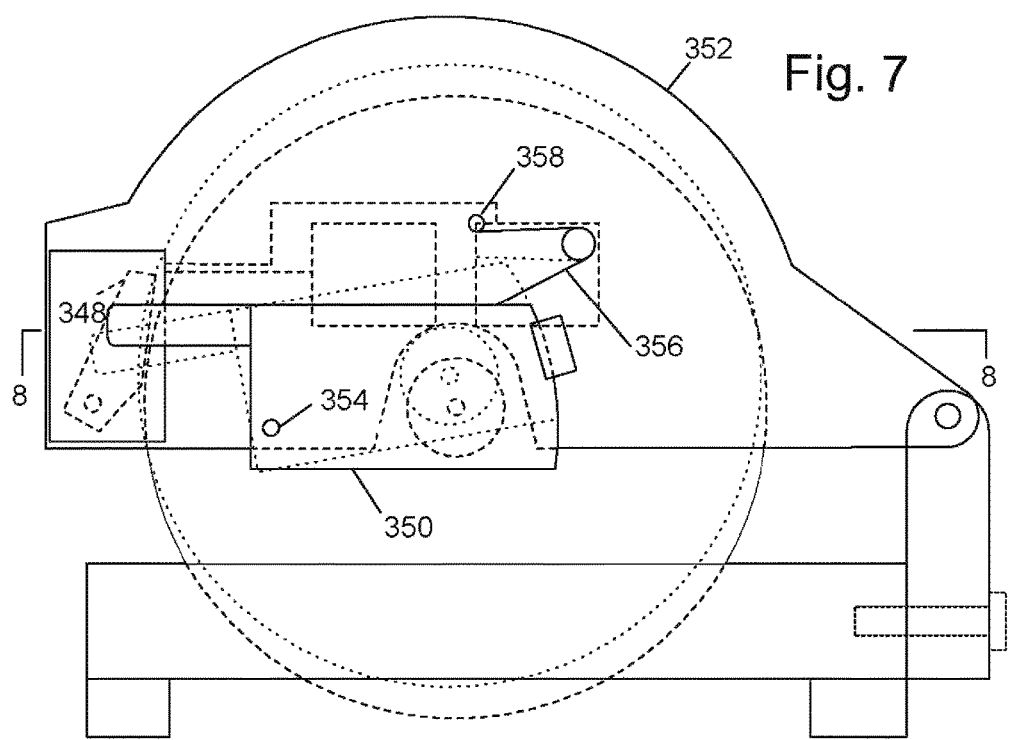
FIG. 7 is a schematic side view of a miter saw with a retraction system.
Figure 8:
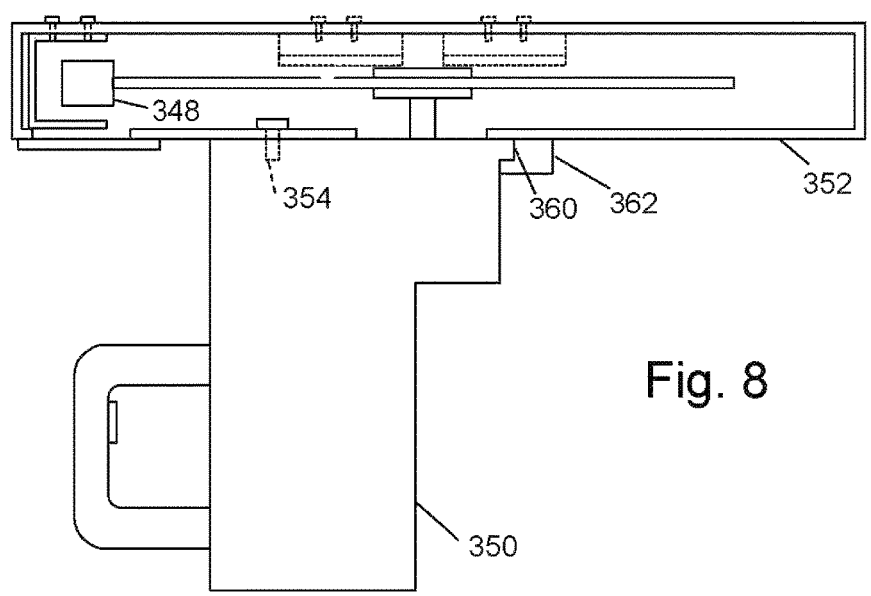
FIG. 8 is a section view of the miter saw shown in FIG. 7.

FIGS. 7 and 8 show a miter saw equipped with both a brake and a retraction system. The miter saw is configured with a pivotal motor assembly to allow the blade to move upward into the housing upon engagement with a brake pawl 348. Motor assembly 350 is connected to housing 352 via pivot bolt 354, allowing the motor assembly to pivot about bolt 354 in the direction of blade rotation. A spring 356 is compressed between the motor assembly and an anchor 358 to bias the motor assembly against the direction of blade rotation. The motor assembly may include a lip 360, which slides against a flange 362 on the housing to hold the end of the motor assembly opposite the pivot bolt against the housing.

When the saw is in use, spring 356 holds the motor assembly in a normal position rotated fully counter to the direction of blade rotation. However, once the pawl is released to engage the blade, the motor assembly and blade pivot upward against the bias of the spring. In this embodiment, the pawl is positioned at the front of the blade so that the pivot bolt 354 is between the pawl and the arbor. This arrangement encourages the blade to move upward into the housing when stopped. The spring is selected to be sufficiently strong to hold the motor assembly down when cutting through a workpiece, but sufficiently compressible to allow the blade and motor assembly to move upward when the blade is stopped. Of course, the blade and motor assembly may be configured in any of a variety of ways to at least partially absorb the angular momentum of the blade.

Figure 9:
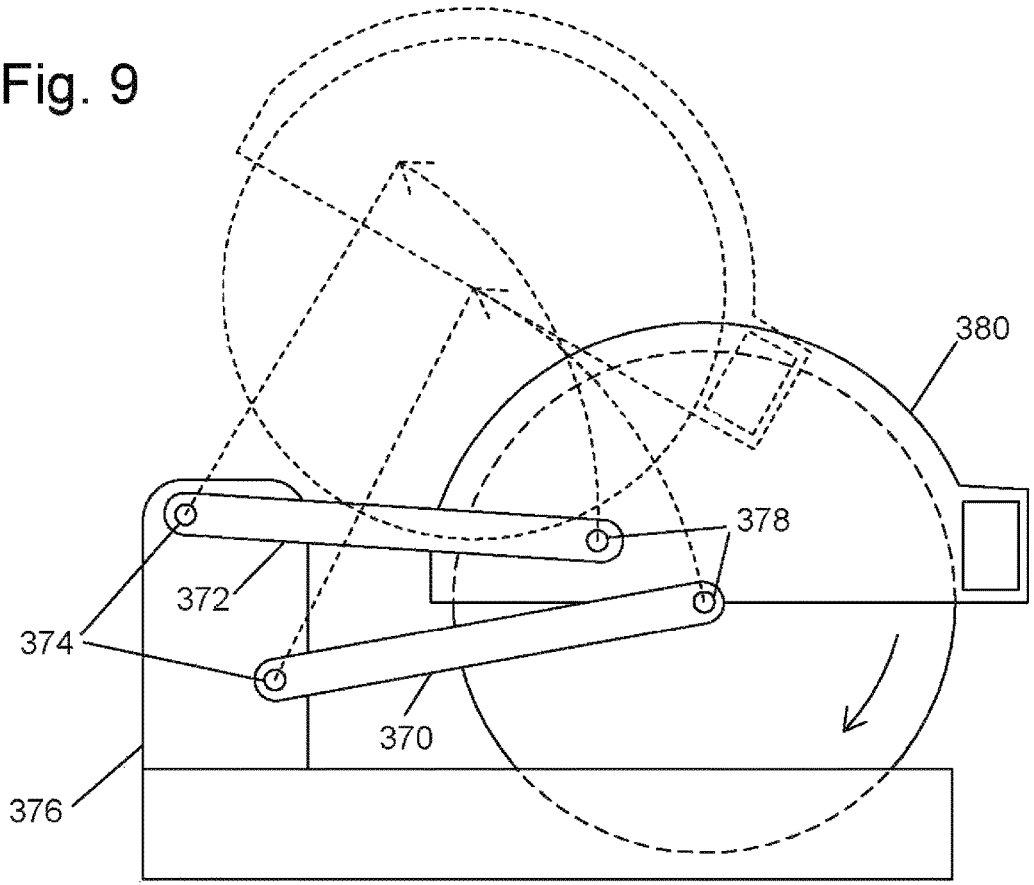
FIG. 9 shows another embodiment of a miter saw with a retraction system.

FIG. 9 shows an alternative configuration of a miter saw adapted to move away from an accidental contact with a user by absorbing the angular momentum of the blade. In this configuration, the miter saw includes two swing arms 370 and 372. One end 374 of each swing arm 370, 372 is connected to base 376, and the opposite end 378 of each swing arm is connected to housing 380, the blade, and/or the motor assembly (not shown). The position of the swing arms relative to each other may vary depending on the swing arm motion desired. In FIG. 9, swing arm 370 is connected to base 376 somewhat below and forward of swing arm 372. Typically, the motor assembly is rigidly attached to end 378 of swing arm 370, while housing 380 is connected to rotate about end 378 of swing arm 370. End 378 of swing arm 372 is connected only to the housing. Alternatively, the motor assembly may be connected to rotate about end 378 of swing arm 370 along with the housing.

The geometry of the configuration shown in FIG. 9 causes the housing and/or motor assembly to rotate as the swing arms pivot. Significantly, when the swing arms move upward, the housing and/or motor assembly rotate in the same direction in which the blade rotates during cutting. As a result, when a brake pawl engages the blade and transfers the angular momentum of the blade to the housing and/or motor assembly, the housing and/or motor assembly tend to rotate in the same direction as the blade. This causes the swing arms to pivot upward, drawing the blade away from the workpiece and the user's body. Thus, the miter saw configuration illustrated in FIG. 9 is adapted to absorb the angular momentum of the blade and translate that angular momentum into an upward force on the swing arms.

Figure 10:
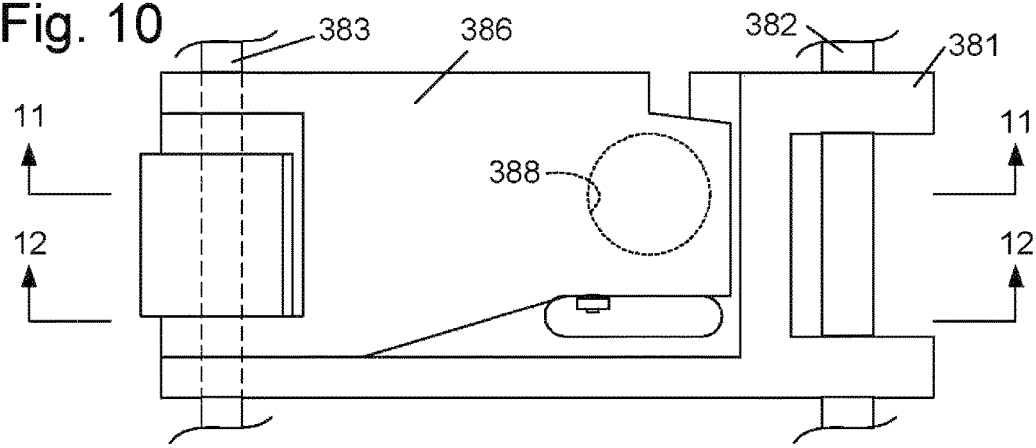
FIG. 10 shows a schematic drawing of a retraction system using a spring to retract a cutting tool.
Figure 11:
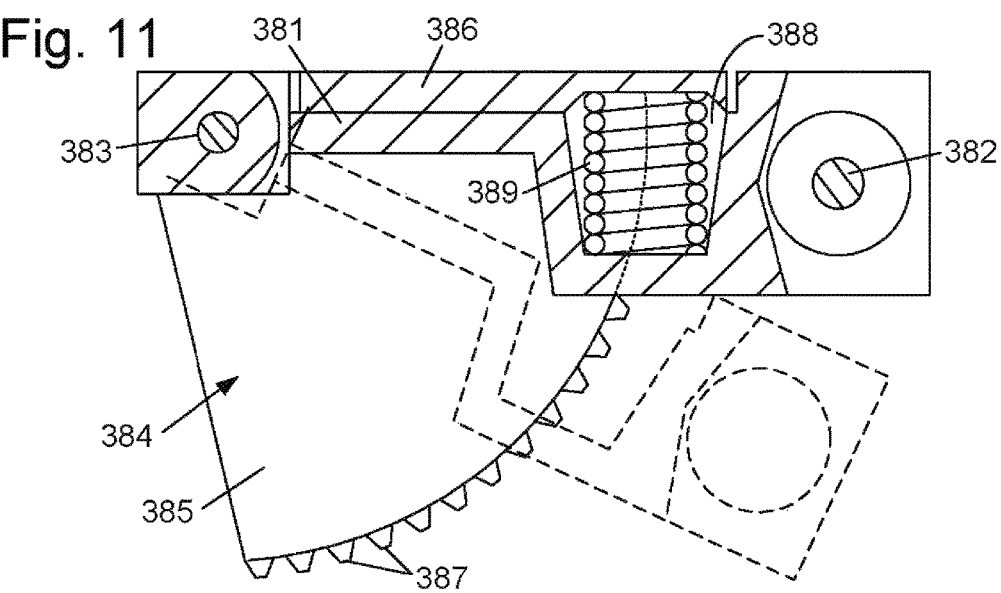
FIG. 11 is a sectional view of the retraction system shown in FIG. 10.
Figure 12:
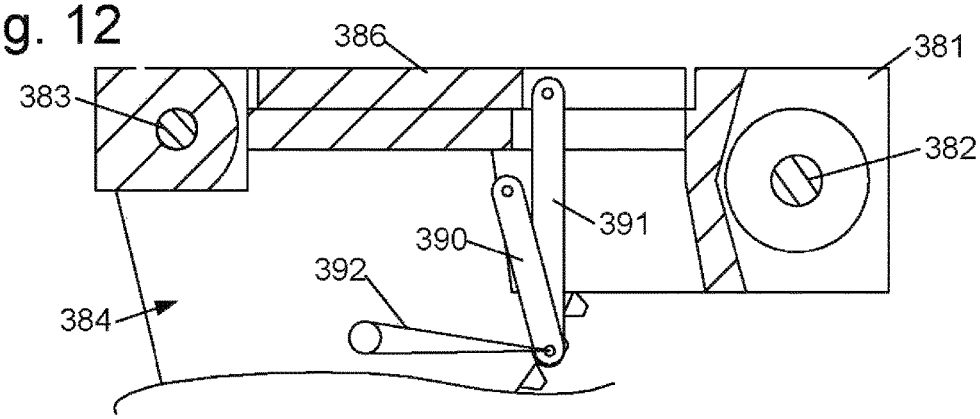
FIG. 12 also is a sectional view of the retraction system shown in FIG. 10.

In any of the systems described above, a spring or other force can be used to push the blade away from the point of contact with the user. The spring could be released by a mechanism similar to the mechanism that releases the pawl to strike the blade. FIGS. 10-12 show how a spring may be used to retract a blade in a table saw. FIG. 10 is a top view and FIGS. 11 and 12 are side views of an arbor block 381 holding an arbor 382 used to drive a blade (not shown). Arbor block 381 is pivotally mounted to pin 383 so that the arbor block and blade may pivot up and down to adjust the position of the blade in the saw.

A segment gear 384, like rack 310 described above in connection with FIGS. 3 and 4, is also mounted on pin 383, and is connected to arbor block 381 in the manner described below, to raise and lower the arbor. Segment gear 384 includes a side portion 385 positioned substantially perpendicularly to the plane of arbor block 381, and a top portion 386 positioned over arbor block 381. The side portion 385 includes gear teeth 387 to engage a worm gear to raise and lower the arbor block. Side portion 385 and top portion 386 are connected to each other and move together. Top portion 386 extends over the top of the entire arbor block, as shown. The arbor block is constructed with a region to accommodate top portion 386 so that top portion 386 does not extend substantially above the arbor block, which could limit the ability of the arbor block and blade to pivot upward when desired, such as by contacting the underside of a table in a table saw.

A pocket 388 is formed in arbor block 381 to house a spring 389. In the position shown in FIG. 11, spring 389 is compressed between top portion 386 of segment gear 384 and arbor block 381 because the segment gear and arbor block are coupled together.

The segment gear and arbor block are coupled by a compound linkage having, as shown in FIG. 12, a first arm 390 attached at one end to the arbor block and at its other end to a second arm 391. The second arm, in turn, is attached to top portion 386 of segment gear 384, as shown. First and second arms 390 and 391 are hingedly connected to each other, and to the arbor block and segment gear. The arms are configured so that the force of the spring pushing apart the arbor block and the top portion of the segment gear biases the first and second arms in such a way that the arms want to move. A fusible member 392, which may take the form of a wire as described above, restrains the arms from movement. Of course, numerous different linkages may be used, and numerous types and configurations of fusible members or other release mechanisms may be used. The linkage may be selected to provide a sufficient mechanical advantage so that the arbor block and top portion of the segment gear may be held together with as thin a fusible member as possible, so that the fusible member may be burned as easily as possible. Various analogous compound linkages are described in U.S. Provisional Patent Application Ser. No. 60/225,170, entitled "Spring-Biased Brake Mechanism for Power Equipment," filed Aug. 14, 2000. The fusible member may be burned by a system as described above, or as described in more detail in U.S. Provisional Patent Application Ser. No. 60/225,056, entitled "Firing Subsystem for Use in Fast-Acting Safety System," filed Aug. 14, 2000, the disclosure of which is hereby incorporated by reference. The compound linkage and the fusible member are preferably configured so that they accommodate spring forces of 100 to 500 pounds or more. In other embodiments, the restraining member may include various mechanical linkages, or may be part of various actuators, and those linkages and/or actuators may be released or fired by solenoids, gas cylinders, electromagnets, and/or explosives, as explained in U.S. Provisional Patent Application Ser. No. 60/302,916, entitled "Actuators for Use in Fast-Acting Safety Systems," filed Jul. 3, 2001, the disclosure of which is hereby incorporated by reference.

When the fusible member is burned, the compound linkage is free to move, and the spring pushes arbor block 381 down, away from top portion 386 of the segment gear, as shown by the dashed lines in FIG. 11, thereby retracting the blade. The stronger the spring, the faster the blade will be retracted. The segment gear does not move because it is coupled through teeth 387 to a worm gear or some other structure.

Retracting a blade by a spring or some other force may be thought of as direct retraction. A spring or other force may be used with some other retraction system to increase the speed that a cutting tool retracts, or a spring or other force may be used as the sole means of retraction. The systems for direct retraction described above may be used on various pieces of equipment, including table saws, miter saws and band saws.

Figure 13:
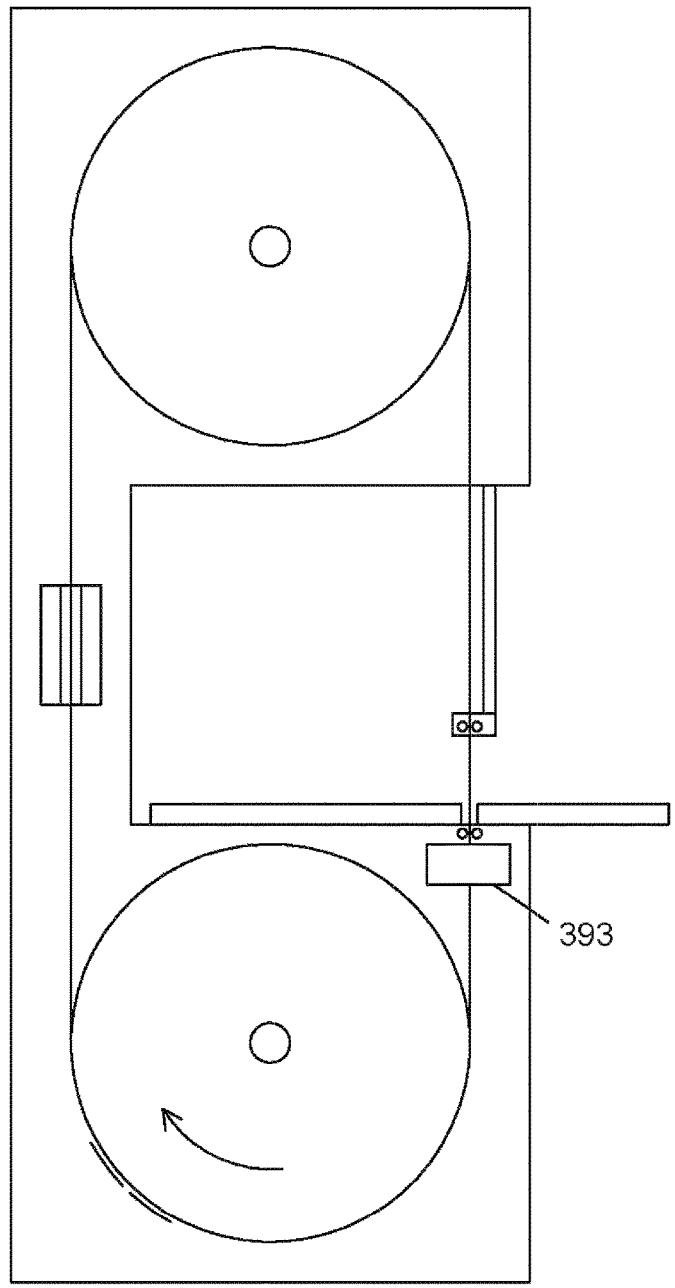
FIG. 13 is a schematic view of a band saw with a retraction system.

FIG. 13 is a schematic diagram of a system to retract the blade of a band saw. Typically, a band saw includes a main housing enclosing a pair of vertically spaced-apart wheels. The perimeter of each wheel is coated or covered in a high-friction material such as rubber, etc. A relatively thin, continuous loop blade tightly encircles both wheels. A workpiece is cut by passing it toward the blade in a cutting zone between the wheels. The workpiece is passed toward the blade on a table, which forms the bottom of the cutting zone.

Figure 14:
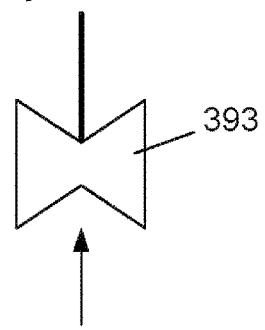
FIG. 14 is a top view of a roller used in the system shown in FIG. 13.

The band saw shown in FIG. 13 includes roller 393 positioned adjacent the blade. The roller is configured to contact the blade and push the blade away from the point of accidental contact with a user. In addition, the roller may be configured to push the blade off the wheels, thereby stopping the motion of the blade. A top view of the roller is shown in FIG. 14 pushing against a blade in the direction of the arrow. The roller may be part of a cartridge, and may be released into the blade just as the pawls described above are released. The roller should have a diameter large enough so that the roller can roll over the teeth of the blade.

The systems for direct retraction of a cutting tool may also be implemented on hand-held circular saws. Such saws typically include a base plate that contacts a workpiece during sawing. The base plate supports the saw on the workpiece. The base plate may be configured so that it is pushed down when the blade contacts a user. The result of that action is to effectively retract the blade because the base plate would push the user away from the blade.

Figure 16:
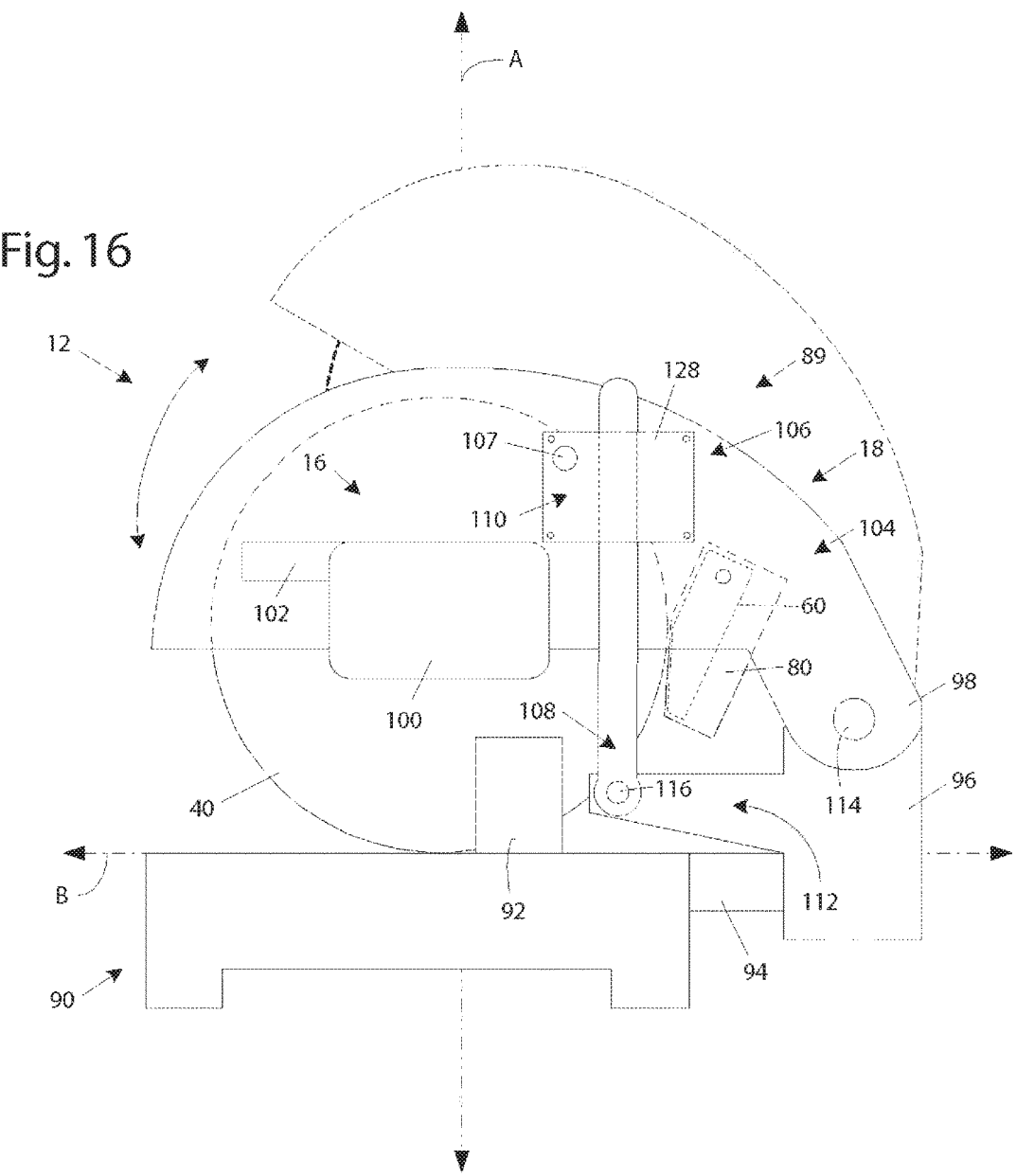
FIG. 16 is a schematic side elevation view of a miter saw having an alternative exemplary safety system configured to stop the miter saw pivot arm as well as the blade.

FIG. 16 illustrates an exemplary miter saw 89 having an alternative embodiment of safety system 18 configured to at least partially retract the pivot arm in the event of contact between the blade and the user's body.

Exemplary miter saw 89 includes a base assembly 90 adapted to support a workpiece (not shown) during cutting. Typically, one or more fences 92 are mounted on base assembly 90 and adapted to prevent the workpiece from shifting across the base assembly during cutting. Operative structure 12 is coupled to base assembly 90 and includes a platen 94, a tilt mechanism 96, and a pivot arm 98. Platen 94 is coupled to base assembly 90 and rotatable, relative to the base assembly, about the axis indicated at A. Tilt mechanism 96 is coupled to platen 94. At least a portion of the tilt mechanism is rotatable, relative to base assembly 90, about the axis indicated at B. Pivot arm 98 is coupled to tilt mechanism 96 and selectively pivotal toward and away from base assembly 90, as illustrated in FIG. 16. Typically, the pivot arm is biased upward away from base assembly 90 by a spring or other suitable mechanism.

Motor assembly 16 is mounted on pivot arm 98 and includes at least one motor 100 and a control handle 102. Blade 40 is coupled to an arbor shaft (not shown) that is rotatably driven by motor 100. Control handle 102 includes one or more controls (not shown) that are operable by a user to control motor 100. A user brings blade 40 into contact with a workpiece by grasping control handle 102 and pulling pivot arm 98 downward against the upward bias from a nominal position (indicated generally by dash lines in FIG. 16), toward base assembly 90. Once the cutting operation is completed, the user allows the pivot arm to pivot upward toward the nominal position.

It will be appreciated by those of skill in the art that the miter saw configuration depicted in FIG. 16 and described above is one commonly referred to as a "compound miter saw," which allows a user to make a compound (i.e., both mitered and beveled) cut in a workpiece by adjusting the position of platen 94 and/or tilt mechanism 96. However, there are many other miter saw configurations known to those of skill in the art which are also suitable for use with the present invention. Thus, it will be understood that the particular miter saw configurations depicted and described herein are provided to illustrate exemplary embodiments of the invention, and should not be interpreted to limit the scope or application of the present invention.

Although not shown in FIG. 16, detection subsystem 22 and control subsystem 26 may be mounted at any desired location on miter saw 89 and configured to detect contact between blade 40 and a user's body as described above and in the references incorporated herein. Alternatively, the detection and control subsystems may be configured to detect contact between the user's body and some other portion of the miter saw such as a guard, etc. Upon receiving an activation signal, a first portion 104 of reaction subsystem 24 is configured to stop the rotation of blade 40, while a second portion 106 of the reaction subsystem is configured to move pivot arm 98 upward away from the base assembly. In the exemplary embodiment, first portion 104 includes a brake pawl 60 mounted in a cartridge 80, such as described above and in the incorporated references. Brake pawl 60 is selectively pivotal into blade 40 to stop the rotation of the blade. Alternatively, the first portion may employ other brake mechanisms such as described in the incorporated references. As a further alternative, first portion 104 may be omitted so that the rotation of blade 40 is not stopped in response to the occurrence of a dangerous condition.

In any event, second portion 106 retracts the pivot arm upward far enough to remove the blade from contact with the user's body. Preferably, the second portion is configured to move the pivot arm upward at least ⅛-inch, more preferably at least ¼-inch, and most preferably at least ½-inch or more. In embodiments where the reaction subsystem is configured to stop the rotation of blade 40, the second portion preferably retracts the pivot arm before or at the same time the blade is stopped. This prevents the pivot arm from moving downward as a result of angular momentum transferred to the pivot arm from the blade. The second portion of the reaction subsystem may be triggered prior to the first portion, or the second portion may be configured to engage the pivot arm more quickly than the brake pawl engages the blade.

Second portion 106 of exemplary reaction subsystem 24 includes a brace member 108 and a retraction assembly 110. Brace member 108 is pivotally coupled to tilt mechanism 96 at 105. Retraction assembly 110 is pivotally coupled to pivot arm 98 at 107 and configured to slidably receive at least a portion of brace member 108. The retraction assembly is configured to quickly grip or lock onto the brace member and urge the pivot arm upward upon receipt of an actuation signal from control subsystem 26. Once the retraction assembly has been triggered, pivot arm 98 is prevented from further downward movement toward base assembly 90. While second portion 106 is illustrated as having a single brace member and a single retraction assembly on one side of miter saw 89, it will be appreciated that the reaction subsystem may alternatively include a plurality of brace members and/or retraction assemblies positioned at selected locations on miter saw 89.

Brace member 108 may take any of a variety of different forms. In the exemplary embodiment, the brace member is an elongate bar or shaft pivotally coupled to tilt mechanism 96. Brace member 108 may be constructed of any suitably rigid material such as steel, aluminum, plastic, ceramic, etc. The pivotal coupling between the brace member and the tilt mechanism allows the brace member to pivot as necessary to follow the retraction assembly as the pivot arm moves toward and away from the base assembly. In the exemplary embodiment, the brace member is coupled to the tilt mechanism by a ball-joint-rod-end-bearing coupling 105, such as are available from a variety of sources including MSC Industrial Supply Company of Melville, N.Y. Alternatively, other types of couplings may be used, such as universal couplings, etc.

In the exemplary embodiment, brace member 108 is coupled to an arm portion 112 of tilt mechanism 96 that extends outward from the tilt mechanism toward the base assembly. While arm 112 is depicted as an integral, unitary portion of the tilt mechanism, the arm portion may alternatively take the form of a separate bracket attached to the tilt mechanism. Alternatively, the arm may be omitted and brace member 108 may be coupled to another portion of the tilt mechanism. As further alternatives, the brace member may be coupled to a different portion of miter saw 10 such as platen 94, fence 92, or base assembly 90, etc. In any event, the brace member should be relatively rigidly supported to ensure that pivot arm 98 is moved upward when retraction assembly 110 is triggered.

Retraction assembly 110 may be coupled to pivot arm 98 in any of a variety of different places. Typically, the retraction assembly and pivot point 107 are disposed to position brace member 108 spaced apart from pivot point 114 of arm 98 to increase the moment of the upward force applied by reaction subsystem 24 to pivot arm 98. It will be appreciated that the further brace member 108 is positioned from pivot point 114, the greater the moment of force provided by the retraction assembly. Thus, it is generally desirable, though not necessary, to position the brace member as close to the front of miter saw 89 (i.e., the left side as shown in FIG. 16) as possible without interfering with the use of the miter saw. Similarly, the pivot point 105 of the brace member is disposed, relative to the retraction assembly, to orient the brace member generally perpendicular to the direction in which the pivot arm moves. This arrangement ensures that the downward force on the brace member is substantially a compression force rather than torque. Alternatively, retraction assembly 110 and pivot point 105 may be disposed at any selected positions suitable for stopping downward movement of pivot arm 98.

Since brace member 108 is coupled to tilt mechanism 96, the brace member will rotate along with pivot arm 98 about axis A when the miter saw is adjusted for mitered cuts. Similarly, the brace member will tilt about axis B when the miter saw is adjusted for beveled cuts. Thus, the exemplary configuration of reaction subsystem 24 depicted in FIG. 16 allows a user to adjust miter saw 89 throughout its full range of movement.

Optionally, reaction subsystem 24 may include one or more positioning mechanisms configured to remove any play or looseness in the couplings between brace member 108 and tilt mechanism 96, and/or the couplings between retraction assembly 110 and pivot arm 98. In situations where play or looseness may be present, the positioning mechanism ensures that the brace member and retraction assembly do not shift when the reaction subsystem is triggered.

Turning attention now to FIGS. 17-21, one exemplary embodiment of retraction assembly 110 is illustrated. Exemplary retraction assembly 110 is configured to grip and push downward on brace member 108 to move pivot arm 98 upward in response to an activation signal from control subsystem 26. Retraction assembly 110 includes a housing 118 configured to slidably receive brace member 108. Housing 118 includes a lower wall 120, and an upper wall 122 spaced apart from the lower wall. Housing 118 also includes a first end wall 124 and a second end wall 126 extending between opposite ends of lower wall 120 and upper wall 122. The lower, upper and end walls are connected together by any suitable mechanism such as bolts 127. A pair of side walls 128 (shown in FIG. 16) cover the sides of the lower, upper and end walls to enclose the housing.

Housing 118 is connected to the side of pivot arm 98 by a pivotal coupling 107 that allows the housing to move relative to the pivot arm as needed. Any of a variety of different couplings may be used which are known to those of skill in the art, such as a shoulder screw, etc. The pivotal coupling allows housing 118 to move as necessary to maintain a constant orientation or alignment with the brace member. In embodiments where the brace member is connected to a different structure on miter saw 89 such as platen 94 or fence 92, coupling 107 may be configured to allow the housing to both pivot parallel to the side of the pivot arm and tilt away from the pivot arm as needed.

As mentioned above, housing 118 is configured to slide along brace member 108. Lower wall portion 120 includes an orifice 130 configured to slide over the brace member. Similarly, upper wall portion 122 includes an orifice 132 configured to slide over the brace member. Orifices 130 and 132 are generally axially aligned and sized to closely fit around the brace member, thereby maintaining the housing in a uniform orientation relative to the brace member as pivot arm 98 is moved toward and away from the workpiece.

Figure 17:
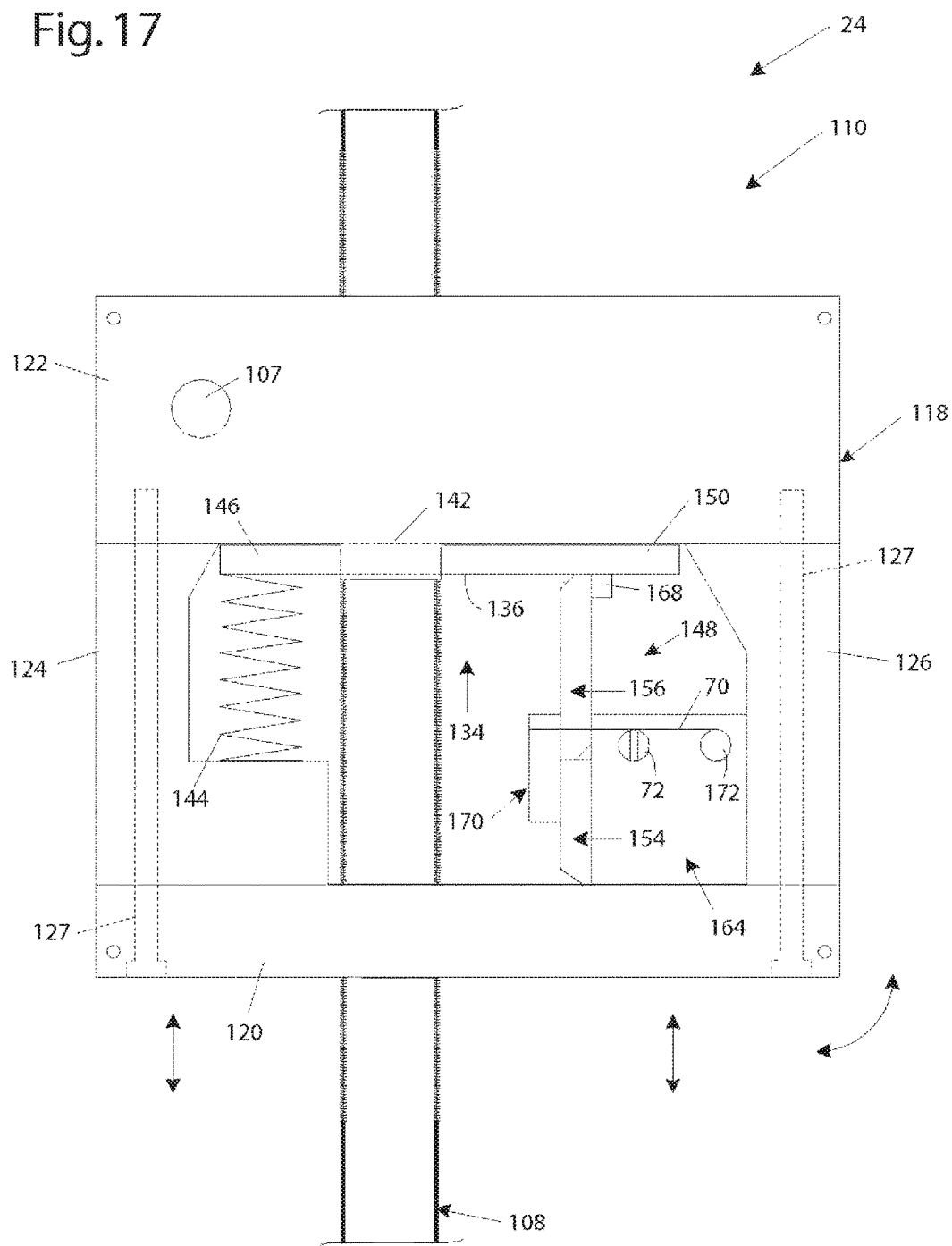
FIG. 17 is a magnified side view of an exemplary retraction assembly according to the present invention.
Figure 18:
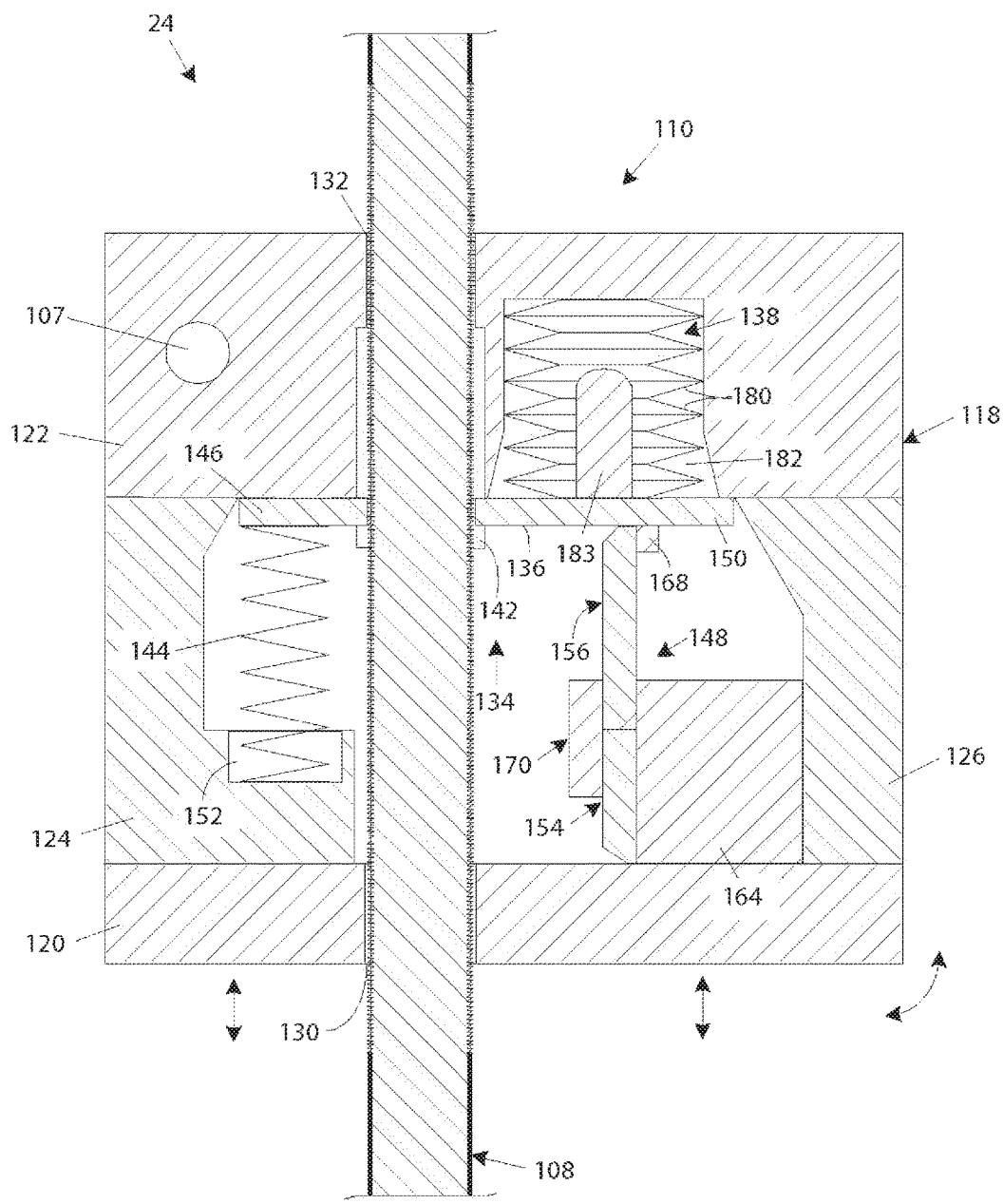
FIG. 18 is a magnified cross-sectional view of the retraction assembly of FIG. 17.
Figure 20:
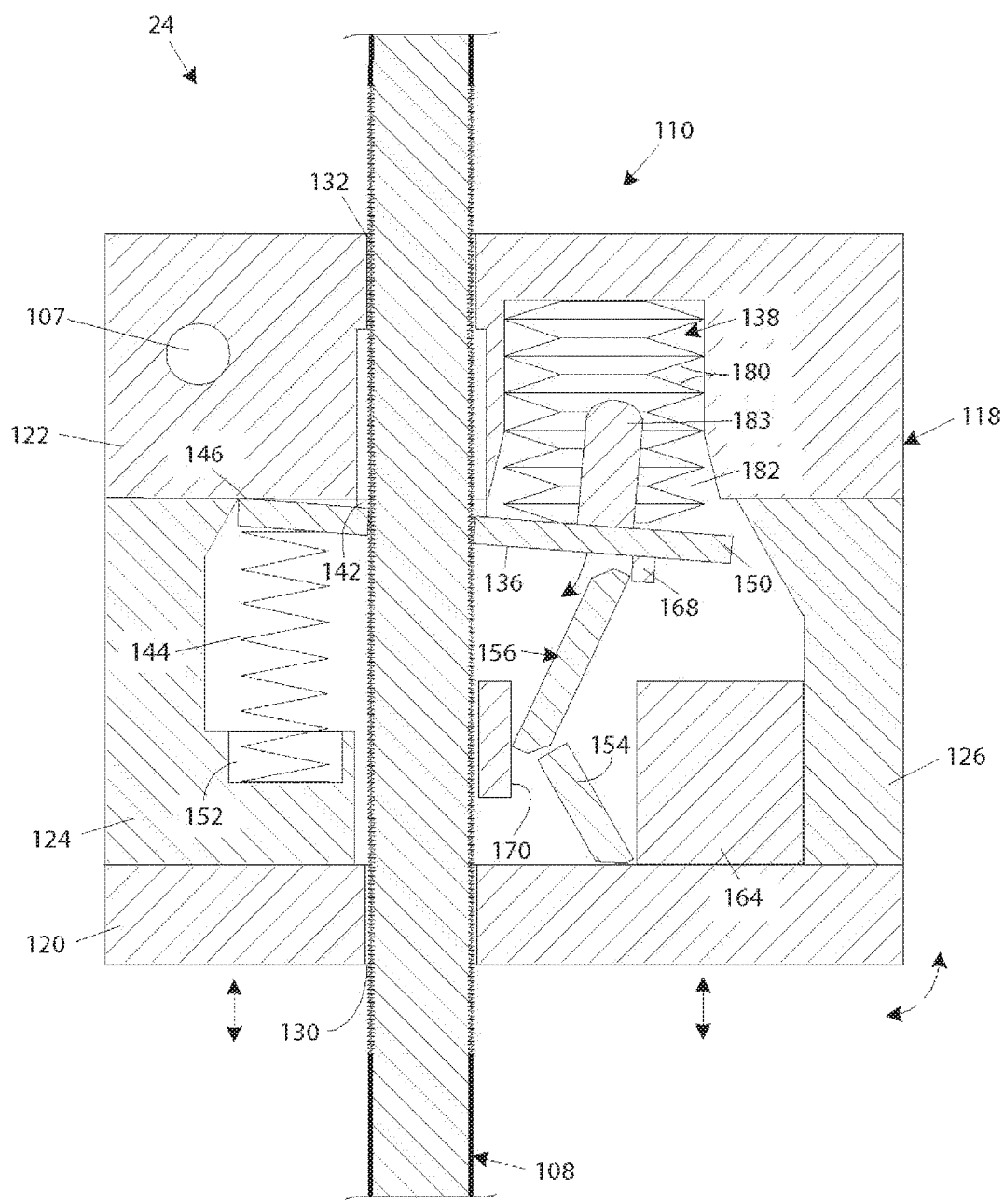
FIG. 20 is similar to FIG. 18 except that the clamping device is shown pivoted to the locked position.

Retraction assembly 110 also includes an actuator 134 configured to selectively grip brace member 108 and push the housing upward. Actuator 134 may be any one or a combination of elements, devices or mechanisms configured to quickly and securely grip the brace member. In the exemplary embodiment, actuator 134 includes a clamping device 136 adapted to selectively grip the brace member, and a drive mechanism 138 adapted to urge the housing upward relative to the clamping device. Clamping device 136 is formed to define an orifice 140 adapted to closely fit and slide along the brace member. The clamping device is pivotal between a nominal or unactuated position (as shown in FIGS. 17 and 18), and an actuated or locked position (as shown in FIG. 20). When the clamping device is in the nominal position, the sides of orifice 140 are substantially aligned with the sides of brace member 108 so that the clamping device slides relatively freely along the brace member. Conversely, when the clamping device is pivoted into the locked or actuated position, the sides of orifice 140 press into and bind against the brace member to releasably lock the clamping device onto the brace member. Drive mechanism 138 is disposed between the clamping device and upper wall 122 and configured to push the upper wall away from the clamping device when the clamping device is in the locked position. As a result, housing 118 and pivot arm 98 are pushed upward relative to the brace member and base assembly 90.

Clamping device 136 may be constructed of any suitable material adapted to grip the brace member and support the force exerted by drive mechanism 138. Typically, the clamping device is constructed of a material which does not cause damage to brace member 108 when the retraction assembly is triggered. For example, the clamping device and brace member may each be formed from a relatively rigid material such as hardened steel. Alternatively, the clamping device and/or brace member may be formed of any of a variety of other suitable materials known to those of skill in the art.

When in the nominal position, clamping device 136 is disposed adjacent the lower surface of upper wall 122 between end walls 124 and 126. The end walls are spaced to align the clamping device and orifice 140 end-to-end with the upper wall and orifice 132. Each end wall is inwardly tapered adjacent the upper wall so as not to obstruct the movement of the clamping device. Upper wall 122 includes a pair of alignment structures 142 adapted to align the clamping device and orifice 140 side-to-side with the upper wall and orifice 132. When clamping device 136 is in the nominal position, orifice 140 is generally axially aligned with orifice 132 and orifice 130 to slidably receive the brace member.

Clamping device 136 is held in the nominal position by a yieldable support element such as spring 144 that engages the clamping device adjacent a first end 146, as well as a releasable restraining mechanism 148 that engages the clamping device adjacent a second end 150. First end wall 124 includes a recessed region adapted to hold a portion of spring 144 and align the spring with the clamping device. Although spring 144 is depicted as a compression spring, it will be appreciated that spring 144 may be any type of spring or other mechanism adapted to yieldably hold first end 146 adjacent the lower surface of upper wall 122.

Restraining mechanism 148 may take any of a variety of different configurations adapted to releasably support second end 150 of the clamping device. In the exemplary embodiment, drive mechanism 138 (which will be discussed in more detail below) exerts a constant downward force on the clamping device adjacent second end 150. Restraining mechanism 148 is configured to support the clamping device against the force exerted by the drive mechanism. Typically, though not necessarily, the restraining mechanism is generally aligned with the drive mechanism to reduce any bending stress to the clamping device.

Figure 21:
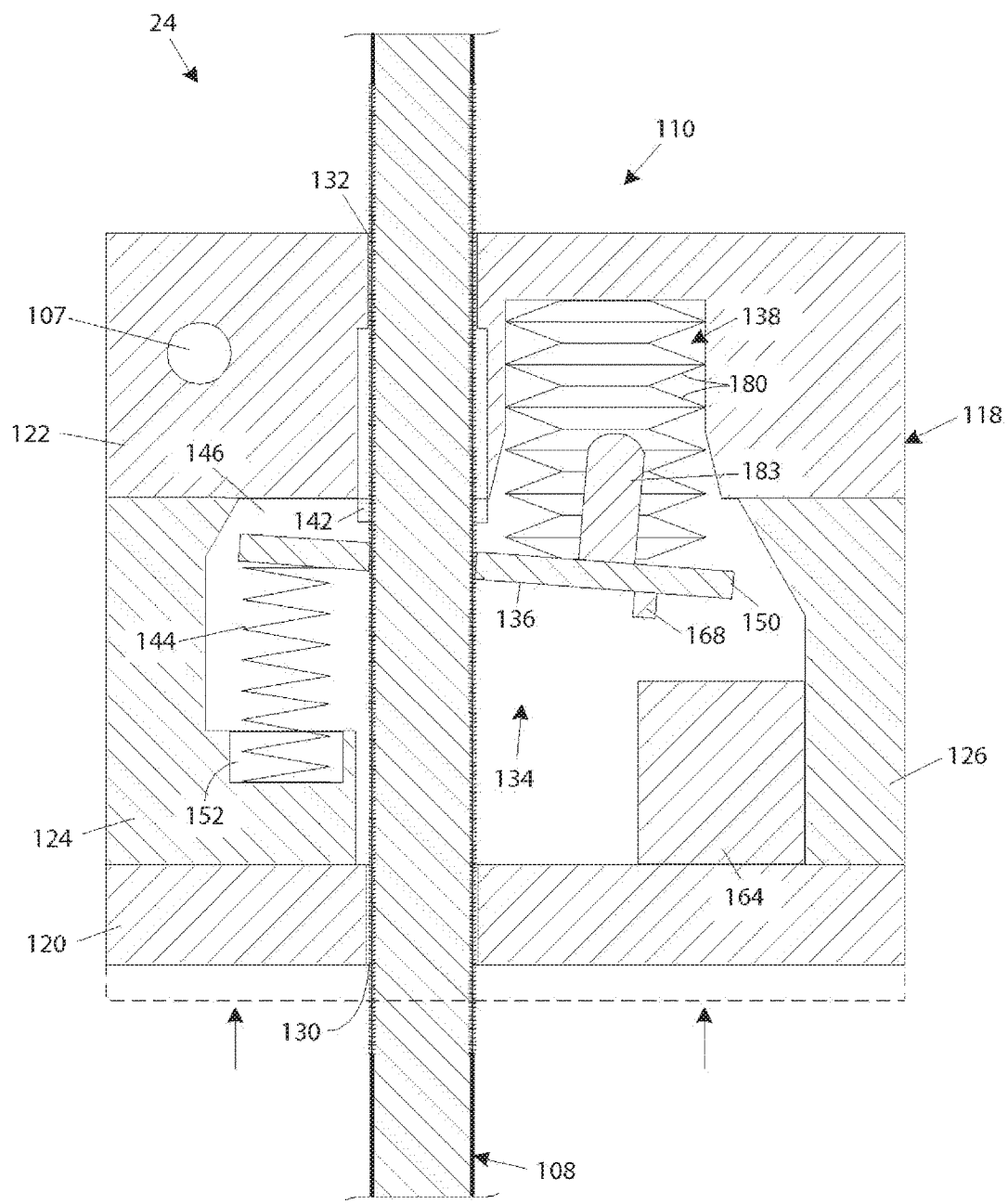
FIG. 21 is similar to FIG. 20 except that the housing is shown pushed upward relative to the brace member. For clarity, the components of the restraining member are not shown.

Exemplary restraining mechanism 148 is selectively collapsible to release the second end of the clamping device. The restraining mechanism includes an elongate collapsible base 154 adapted to support an elongate brace 156. In its uncollapsed state illustrated in FIGS. 17-19, a lower end 158 of base 154 rests on the upper surface of lower wall 120. The base extends upward from the lower wall toward the clamping device. A lower end 160 of brace 156 rests on an upper end 162 of base 154. The brace extends upward from the base to support the clamping device. When the base collapses, the brace is dislodged, thereby releasing the clamping device as shown in FIGS. 20-21.

When in the uncollapsed, upright position, one side of base 154 is disposed against a buttress structure 164. One side of lower end 160 of the brace is also disposed against the buttress structure, while an upper end 166 of the brace is disposed against a shoulder structure 168 on the clamping device. Shoulder structure 168 is configured to position the brace in upright alignment on top of the base. Base 154 and brace 156 are clamped against the buttress structure by a stabilizer member 170. The stabilizer member is held in clamping engagement with the base and the brace by a fusible member 70 such as described above and in the incorporated references. Fusible member 70 extends from the stabilizer member, over a contact mount 72 to an anchor point 172. Contact mount 72 is coupled to a firing subsystem (not shown) adapted to supply sufficient electrical current to melt the fusible member. In the exemplary embodiment, contact mount 72 is anchored to buttress structure 164, which is constructed of an electrically non-conducting material such as plastic, etc.

Figure 19:
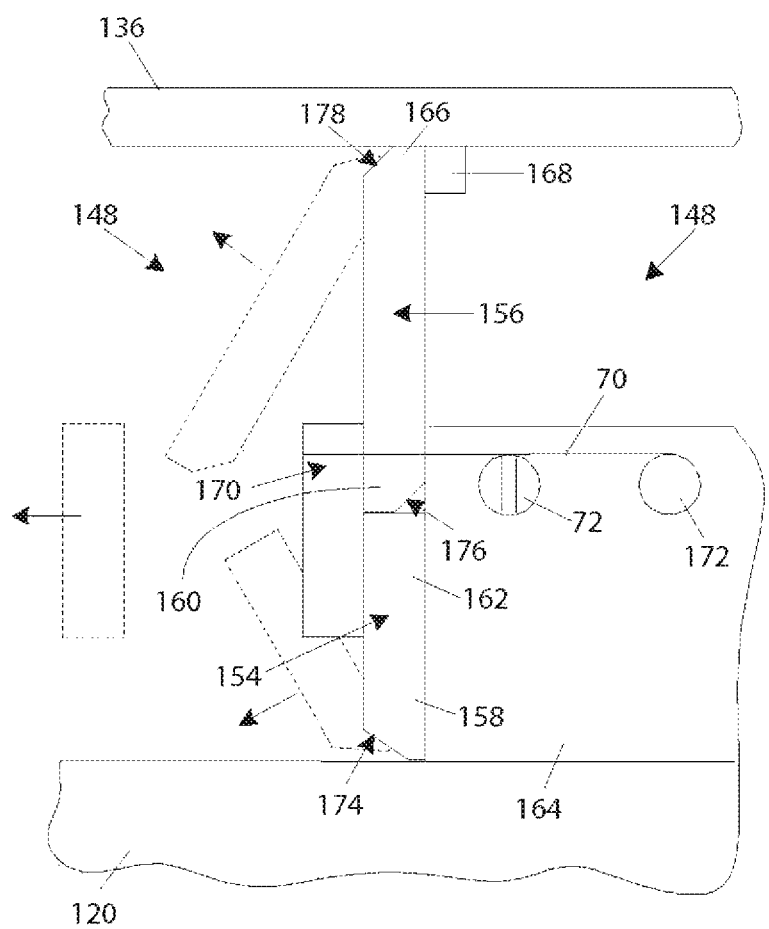
FIG. 19 is a magnified, fragmentary view of the retraction assembly of FIG. 17, showing the restraining mechanism in detail.

Lower end 158 of the base includes a beveled region 174 opposite the buttress structure. As shown in FIG. 19, beveled region 174 extends through more than half the thickness of the base. Lower end 160 of the brace includes a beveled region 176 adjacent the buttress structure. As a result, a portion of the downward pressure exerted on the clamping device by the drive mechanism is translated onto upper end 162 as a pivoting force away from the buttress structure. The remainder of the downward force is translated into a downward force on lower wall 128. The upper end of the base is prevented from pivoting outward so long as stabilizer structure 170 remains in place.

Those of skill in the art will appreciate that the particular configuration of restraining mechanism 148 described above provides a mechanical advantage for supporting second end 150 of the clamping device under the downward force of the drive mechanism. The proportion of downward force translated into pivoting force on the base will vary with the depth of beveled regions 174 and 176. Beveled regions 174 and 176 typically are configured so that much of the downward force applied by the drive mechanism is translated into downward force on base 154 rather than pivoting force. As a result, fusible member 70 is only required to support a portion of the force exerted by the drive mechanism. Indeed, several hundred pounds of downward force may be translated into only 10-20 pounds of outward pivoting force on stabilizer structure 170. This allows the fusible member to have a smaller diameter, thereby requiring less energy to melt. Nevertheless, the outward pivoting force should be sufficient to ensure the base collapses within 5-10 milliseconds, and preferably within 1-5 milliseconds.

In any event, when stabilizer member 170 is released, the upper end of base 154 quickly pivots outward from the buttress structure and collapses beneath the brace, as illustrated in FIGS. 19 and 20. Upper end 166 of the brace includes a beveled region 178 opposite shoulder structure 168 to allow the lower end of the brace to freely pivot outward from the buttress structure along with the base. Second end 150 of the clamping device is thereby released to move downward under the urging of the drive mechanism.

While second end 150 of the clamping device is pushed downward by the drive mechanism, first end 146 is pushed upward by spring 144. As a result, clamping device 136 pivots about brace member 108 into the locked position where the edges of orifice 140 bind against the sides of the brace member as shown in FIG. 20. The angle through which the clamping device must pivot before binding against the brace member will vary based at least partially on the size differential between orifice 140 and brace member 108. It is believed that the binding force generated by the clamping device against the brace member is increased where the pivot angle between the nominal position and the locked position is relatively small. Therefore, orifice 140 typically is sized to fit relatively closely around the brace member. For example, in an embodiment where brace member 108 takes the form of a rod having a circular cross-section with a diameter of approximately 0.375-inch, one suitable diameter for orifice 140 would be approximately 0.376-inch. Alternatively, other diameters may also be used within the scope of the invention. For clarity, the size difference between orifice 140 and brace member 108 is shown substantially exaggerated in FIGS. 18, 20 and 21.

As mentioned above, drive mechanism 138 is disposed between upper wall 122 and second end 150 of the clamping device. The drive mechanism is configured to urge the second end and upper wall apart when the clamping device is released from restraining mechanism 148. Once clamping device 136 pivots to the locked position, further downward movement of second end 150 is prevented because the clamping device is locked against the brace member. As a result, the additional drive force exerted by the drive mechanism forces upper wall 122 and housing 118 upward relative to the clamping device and brace member, as illustrated in FIG. 21. Since the housing is coupled to pivot arm 98, the pivot arm is forced upward as well.

Drive mechanism 138 should be configured to overcome the downward momentum of the pivot arm as well as any transferred angular momentum caused by stopping blade 40. In addition, the upward force exerted by the drive mechanism on the housing should be substantially larger than any downward force exerted by spring 144. Typically, the drive mechanism is configured to provide 100-500 pounds of upward force on the pivot arm. The length of upward travel of the pivot arm will depend on the length of translation, or 'throw,' of the drive mechanism as well as the distance second end 150 pivots downward before locking against the brace member.

In the exemplary embodiment, drive mechanism 138 includes a plurality of Belleville springs 180 stacked in series. The number of springs in the series is selected to provide a desired throw. Optionally, each spring in the series may alternatively be plural springs stacked in parallel to provide a desired amount of driving force. Springs 180 are disposed in a recessed region 182 of upper wall 122. The recessed region is sized to maintain the springs in general axial alignment. Additionally, clamping device 136 includes a spindle structure 183, adapted to fit within the central bores of at least a portion of the springs to maintain alignment between the springs. The spindle structure also serves to maintain alignment between the springs and the clamping device. It will be appreciated by those of skill in the art that drive mechanism 138 may alternatively take any of a variety of other configurations adapted to lock the clamping device against the brace member and force the pivot arm upward. For example, the drive mechanism may include a coil compression spring, explosive device, etc.

In any event, once the retraction assembly has been triggered, it may be uncoupled from the pivot arm and slid off the brace member. A new, untriggered retraction assembly may then be installed to place miter saw 89 and safety system 18 back in operation. Alternatively, the triggered retraction assembly may be reset using a new fusible member.

While one particular implementation of retraction assembly 110 has been described, it will be appreciated that numerous alterations and modifications are possible within the scope of the invention. Additionally, while the retraction assembly has been described in the context of retracting the pivot arm of a miter saw, it will be appreciated that the retraction assembly may also be adapted for use in other ways and on other machines.

Machines that include various components and features discussed above may be described as follows:

A cutting machine comprising a cutter; a brake adapted to stop the cutter, where the brake has an idle position and a braking position; and an actuation system adapted to selectively move the brake from the idle position to the braking position, where at least a portion of the actuation system must be replaced after moving the brake from the idle position to the braking position; wherein the actuation system includes an explosive device.

A cutting machine comprising a support structure; a cutting tool adapted to cut a workpiece, where the cutting tool is supported by the support structure; a detection system adapted to detect a dangerous condition between the cutting tool and a person; a reaction system adapted to perform a specified action upon detection of the dangerous condition; an explosive to trigger the reaction system to perform the specified action upon firing of the explosive; and a firing subsystem to fire the explosive upon detection of the dangerous condition.

A table saw adapted to implement features of the safety systems described above is shown at 1000 in FIG. 22. Saw 1000 is often called a cabinet saw or a tilting-arbor saw. The saw includes a table 1020 on which a work piece may be cut. The table is supported by a cabinet 1040. A blade 1050 (labeled in FIGS. 23 through 26) extends up through an opening 1060 in the table and a blade guard 1080 covers the blade. Hand wheels 1100 and 1120 may be turned to adjust the elevation of the blade (the height the blade extends above the table) and the tilt of the blade relative to the tabletop, respectively. In operation, a user turns the hand wheels to position the blade as desired and then makes a cut by pushing a work piece on the table past the spinning blade.

FIGS. 23 through 26 show various views of the internal mechanism of saw 1000. FIGS. 27 through 32 show additional views of the internal mechanism of the saw, but with the table removed. The remaining figures show various components and mechanisms that may be used in the saw.

Table 1020 is bolted onto a front trunnion bracket 1200 and a back trunnion bracket 1220 by bolts 1240 (the bolts are shown best in FIGS. 29 through 32). The trunnion brackets, in turn, are bolted onto and supported by cabinet 1040 through holes such as hole 1070 shown in FIG. 27. The cabinet is constructed to support the weight of the table and the internal mechanism of the saw. Alternatively, table 1020 could be secured directly to the cabinet or some other support instead of to the trunnions.

Figure 23:
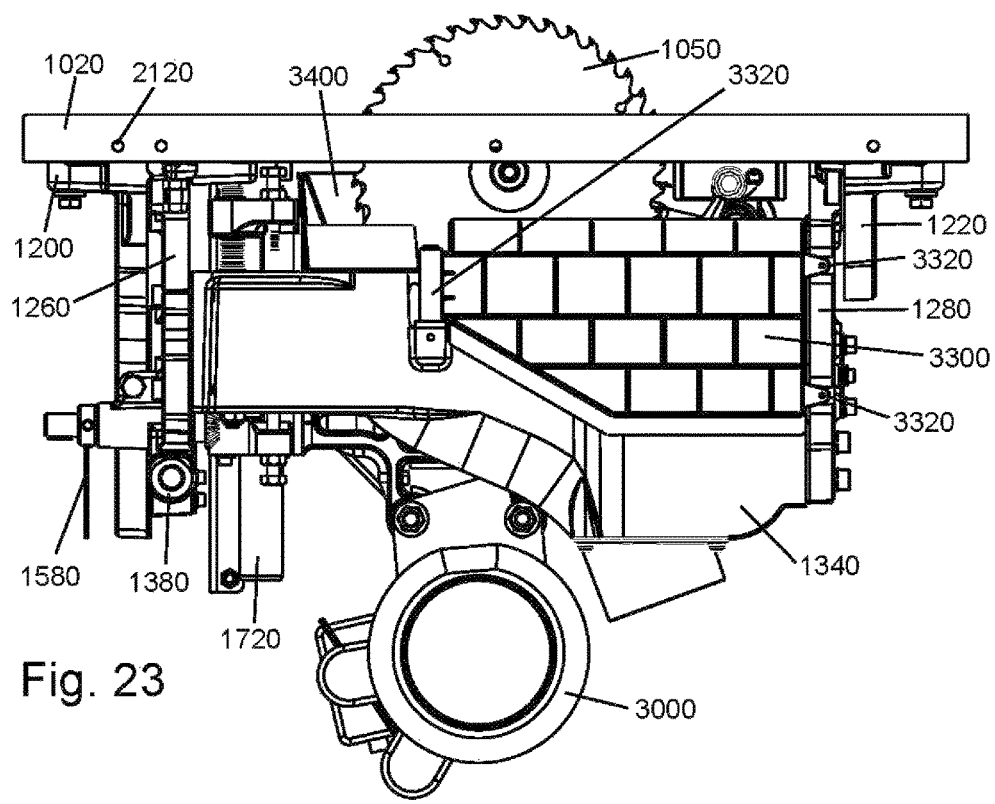
FIG. 23 shows a right-side view of the internal mechanism of the saw shown in FIG. 22.
Figure 24:
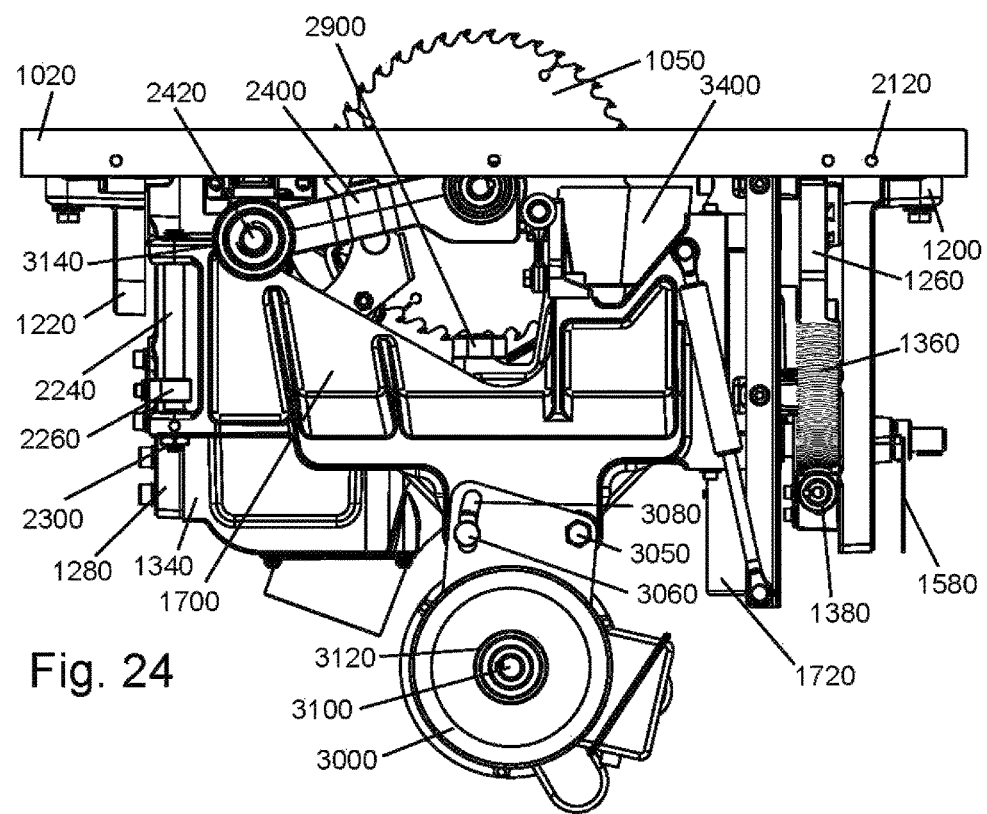
FIG. 24 shows a left-side view of the internal mechanism of the saw shown in FIG. 22.
Figure 32:
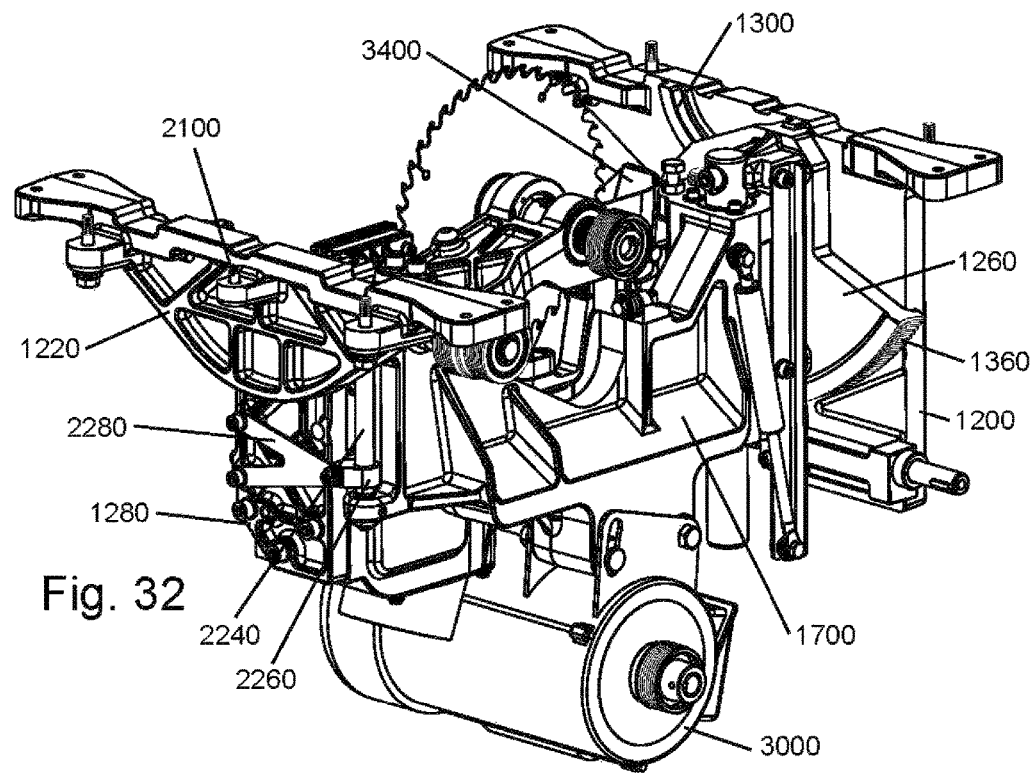
FIG. 32 shows a back-left perspective view of the internal mechanism of the saw.

It is important for the table to be positioned properly relative to the blade. Typically, the front edge of the table should be as perpendicular to the plane of the blade as possible in order to make straight, square cuts. There are many mechanisms by which the position of the table relative to the blade can be adjusted. FIGS. 23, 24, and 32 show one such mechanism. A pin 2100 extends up from a flange in rear trunnion bracket 1220, as shown in FIG. 32. That pin is positioned substantially in the side-to-side center of the rear trunnion bracket. Pin 2100 extends up into a corresponding socket on the underside of the back edge of the table and the table is able to pivot around the pin. Table 1020 includes two holes 2120, one in the right front side of the table and one in the left front side, as shown in FIGS. 23 and 24. A bolt is threaded into each of those holes and extends through the side of the table. Holes 2120 are positioned so that when the bolts are threaded through the holes, the ends of the bolts abut the right and left sides of the front trunnion bracket, respectively. Those sides are labeled 2130 in FIG. 27. Threading a bolt farther into its hole will cause the bolt to push against the front trunnion bracket and the table will then pivot around pin 2100. Thus, the position or squareness of the table relative to the blade can be adjusted by threading the bolts into holes 2120 a desired amount.

Saw 1000 also includes front and rear trunnions 1260 and 1280. These trunnions are supported in the saw by the front and rear trunnion brackets, respectively. Each trunnion bracket includes an arcuate tongue or flange 1300 (best seen in FIGS. 29 through 32), and the front and rear trunnions each include a corresponding arcuate groove 1320 (grooves 1320 are labeled in FIGS. 29 and 31). Trunnion brackets 1200 and 1220 support trunnions 1260 and 1280 by flanges 1300 extending into corresponding grooves 1320. In this manner, the flanges provide a shoulder or surface on which the trunnions may rest. The arcuate tongue and groove connections also allow the trunnions to slide relative to the trunnion brackets. When the trunnions slide on the trunnion brackets, the blade of the saw tilts relative to the tabletop because the blade is supported by the trunnions, as will be explained below.

A trunnion brace 1340 extends between and interconnects the front and rear trunnions so that the trunnions move together. The trunnion brace also holds the front and rear trunnions square and prevents the trunnions from moving off flanges 1300 when the mechanism is assembled. The trunnion brackets, trunnions and trunnion brace are shown isolated from other structure in FIGS. 33 through 35.

The trunnions and trunnion brace are tilted relative to the trunnion brackets by gears. A rack gear 1360 is cut into an edge of front trunnion 1260, and a worm gear 1380 is mounted on front trunnion bracket 1200 to mesh with the rack gear. This arrangement is shown in detail in FIGS. 36 through 39. Worm gear 1380 is mounted on a shaft 1400 and the shaft is supported in a bracket 1420. A collar 1430 holds the shaft in place in the bracket. Bracket 1420 is bolted onto front trunnion bracket 1200 by bolts 1440. The bolts pass through oversized holes in the front trunnion bracket and thread into holes in bracket 1420. The oversized holes in the front trunnion bracket allow for adjustment of the position of bracket 1420 up or down relative to the rack gear. Being able to adjust the position of the bracket up or down is important in order to make sure the rack and worm gears mesh properly. Of course, the oversized holes may be in bracket 1420 and the threaded holes may be in the front trunnion bracket.

Figure 56:
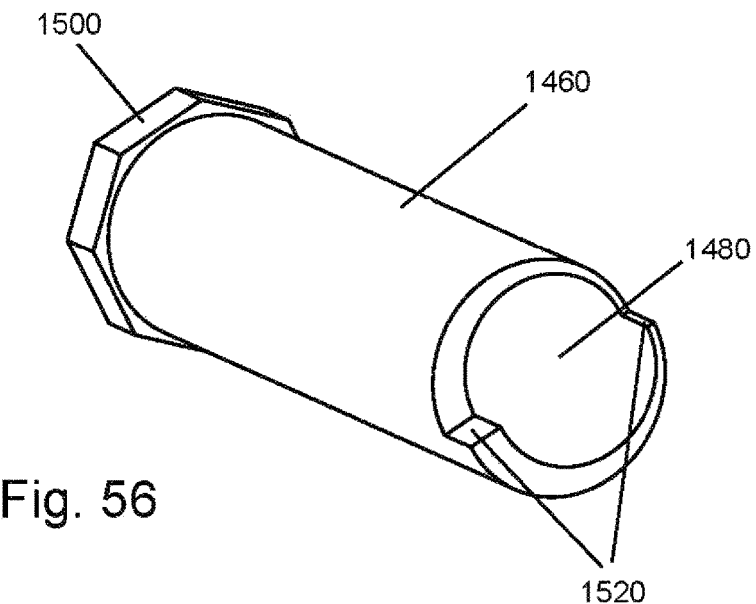
FIG. 56 shows an eccentric bushing.
Figure 57:
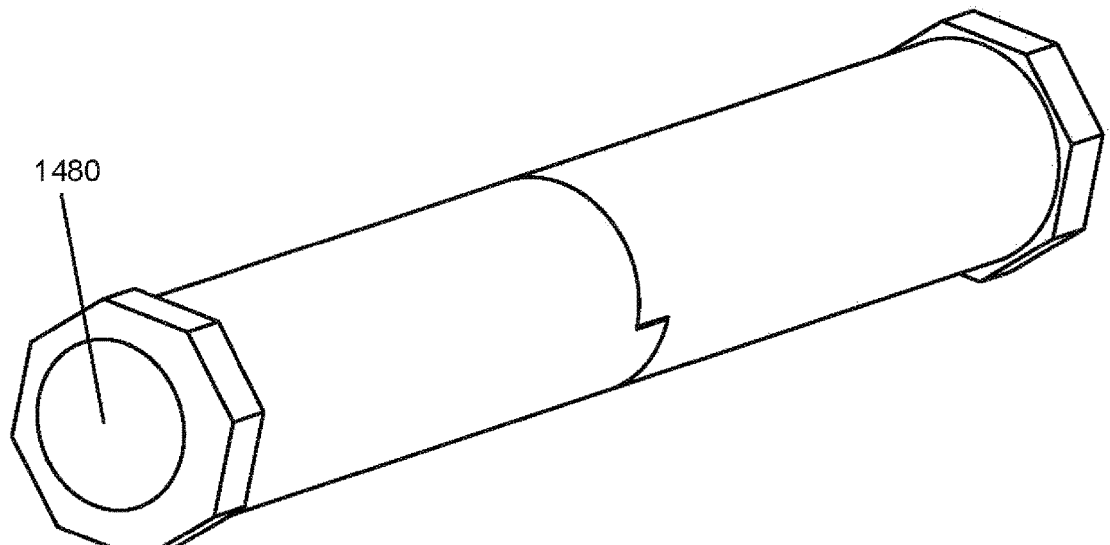
FIG. 57 shows two eccentric bushings end-to-end.

Other mechanisms also may be used to align worm gear 1380 with rack gear 1360. One such mechanism is one or more eccentric bushings that hold shaft 1400 in bracket 1420. The bushings may be turned to move shaft 1400 and worm gear 1380 toward or away from rack gear 1360 to make sure the gears mesh properly. A possible eccentric bushing is shown in FIG. 56 at 1460. The bushing includes a hole 1480 positioned off-center from the longitudinal axis of the bushing, a hex head 1500 to allow a person to turn the bushing, and shoulders 1520. The bushing is configured so that two such bushings may be positioned end to end, as shown in FIG. 57, and shaft 1400 may be supported in the resulting hole 1480. When the bushings are positioned in bracket 1420, turning either of the two hex heads 1500 with a wrench will cause both bushings to turn because shoulders 1520 abut, and turning the bushings will cause shaft 1400 and worm gear 1380 to move toward or away from rack gear 1360 because hole 1480 is off center.

Figure 37:
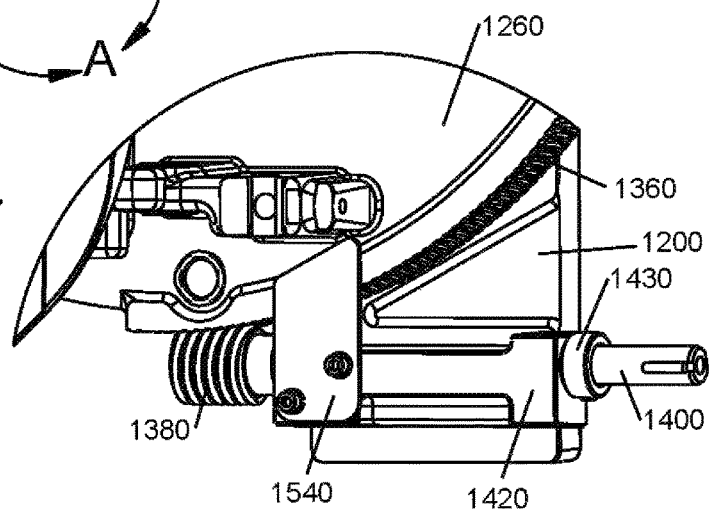
FIG. 37 is the detail view of the portion labeled "A" in FIG. 36, showing part of a tilt control mechanism.
Figure 38:
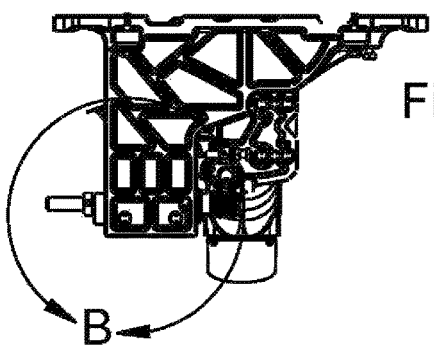
FIG. 38 shows part of the internal mechanism of the saw with a portion labeled "B" designated for a detailed view.
Figure 39:
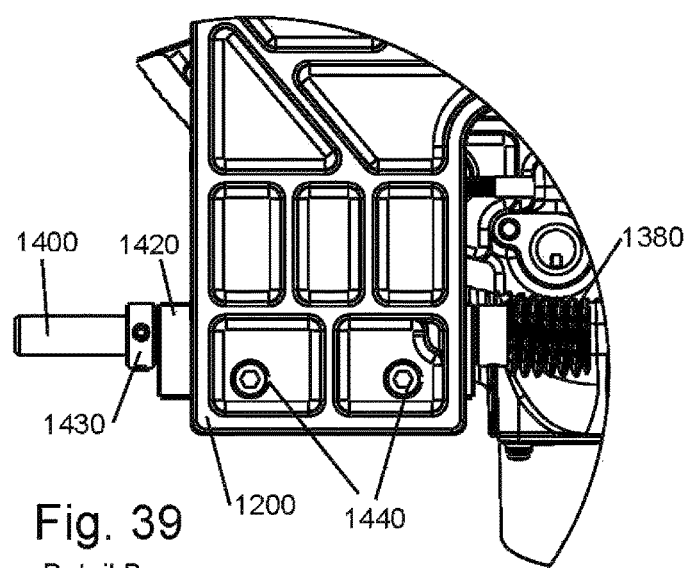
FIG. 39 is the detail view of the portion labeled "B" in FIG. 38, showing part of a tilt control mechanism.

Shaft 1400 extends out through a hole in cabinet 1040 and hand wheel 1120 is mounted on the shaft. When a user turns hand wheel 1120 and shaft 1400, worm gear 1380 meshes with rack gear 1360 causing the trunnions to move and the blade to tilt relative to the tabletop. A plate 1540 is bolted to bracket 1420 and extends up past rack gear 1360, as shown in FIG. 37, to help prevent the bottom of front trunnion 1260 from moving away from the front trunnion bracket and to help maintain the rack gear and worm gear in position.

Figure 25:
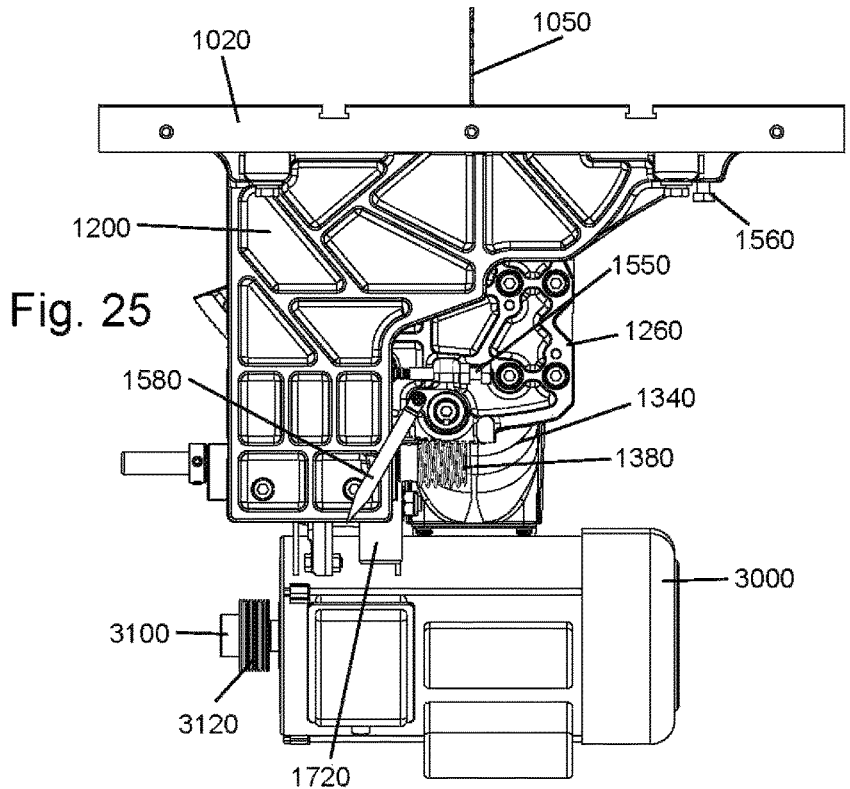
FIG. 25 shows a front view of the internal mechanism of the saw shown in FIG. 22.
Figure 26:
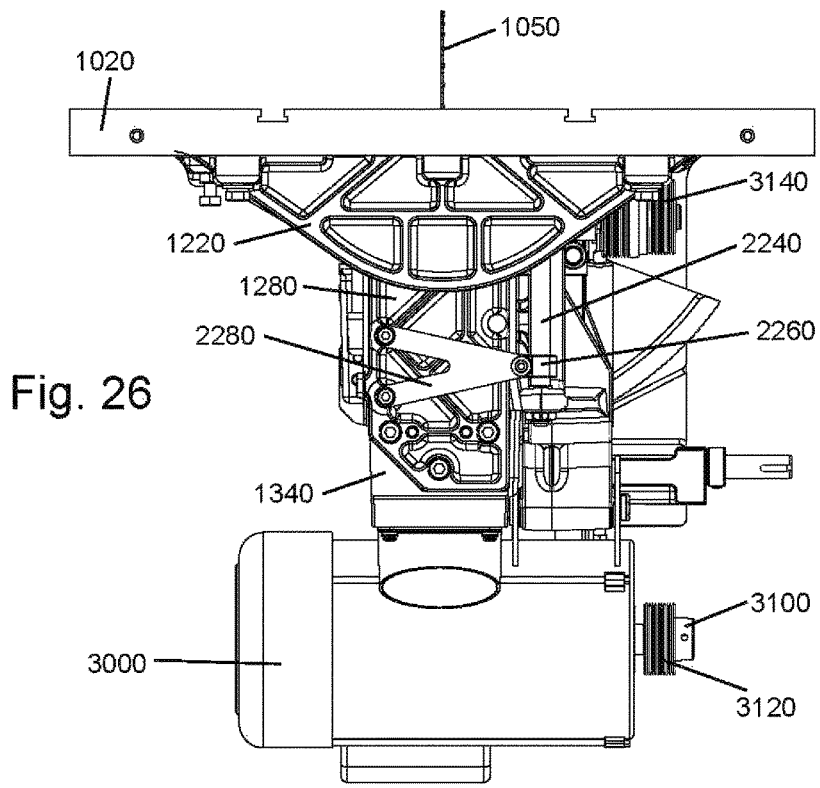
FIG. 26 shows a back view of the internal mechanism of the saw shown in FIG. 22.
Figure 27:
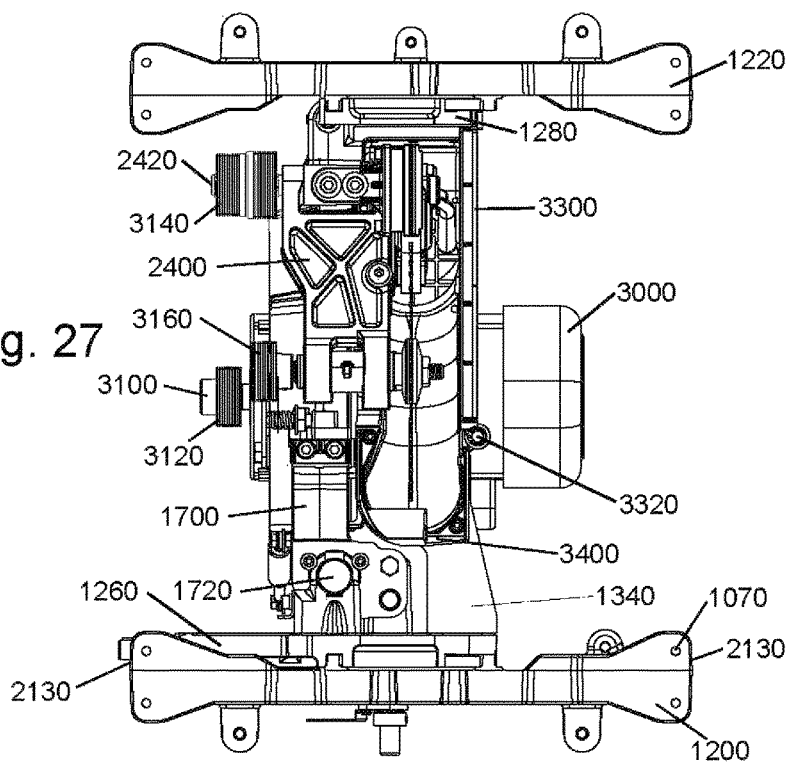
FIG. 27 shows a top view of the internal mechanism of the saw shown in FIG. 22 with the table removed.
Figure 28:
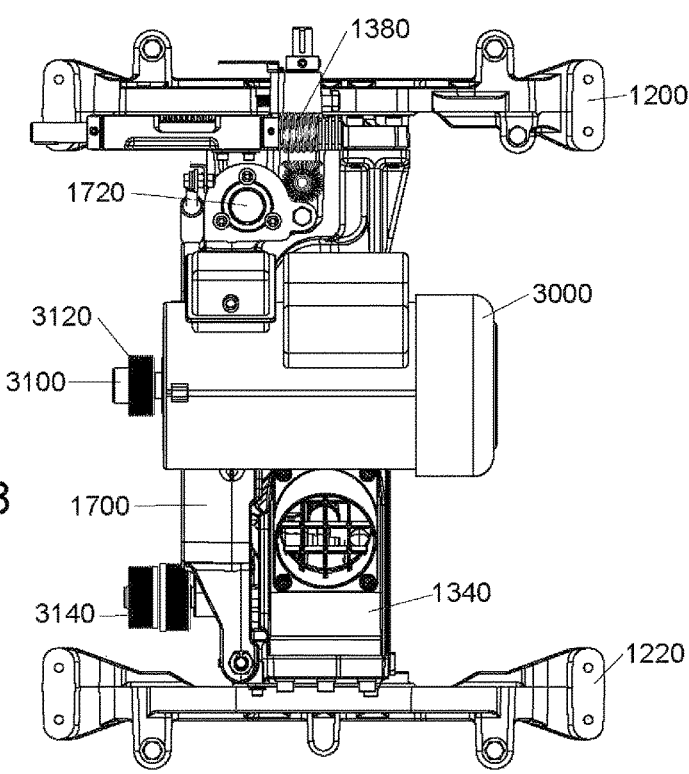
FIG. 28 shows a bottom view of the internal mechanism of the saw shown in FIG. 22.
Figure 29:
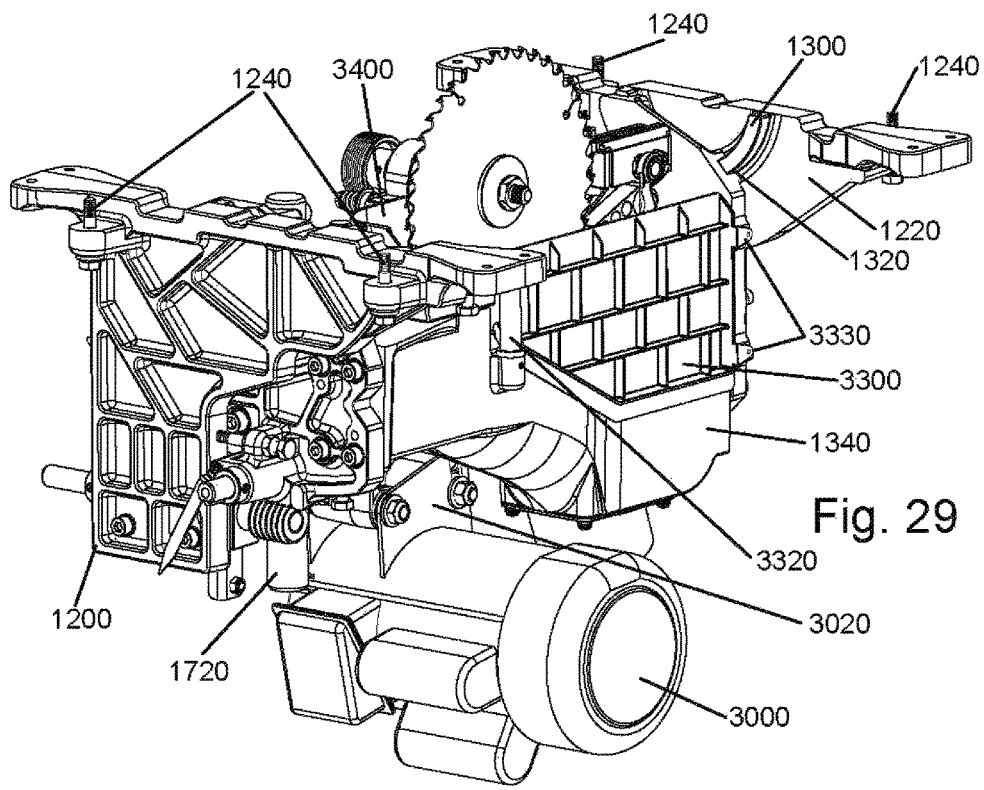
FIG. 29 shows a front-right perspective view of the internal mechanism of the saw with the table removed.

Stops 1550 and 1560, shown best in FIG. 25, limit the distance that the trunnions and trunnion brace may move. Stop 1550 comprises a bolt threaded through a shoulder in the front trunnion bracket and a lock nut to hold the bolt in place. The bolt is positioned so that it will abut a side edge of the front trunnion bracket when the front trunnion is at one limit of its movement, as shown in FIG. 25. Stop 1560 comprises a bolt threaded into a hole in the front trunnion bracket (also shown in FIG. 44). A lock nut or some other means may be used to hold the bolt in place. The bolt is positioned so that the front trunnion will abut the head of the bolt when the front trunnion is at the opposite limit of its movement. The distance the trunnions may move can be adjusted by threading the bolts in stops 1550 and 1560 in or out, as desired.

Saw 1000 typically includes a label 1570 mounted on the front of the cabinet. Label 1570 includes angle demarcations to indicate the degree the blade tilts relative to the tabletop. A pointer 1580 is mounted on or adjacent shaft 1400 to point to the angle demarcations on label 1570. For instance, when the blade is tilted 45 degrees relative to the tabletop, pointer 1580 would point to the 45 degree mark on label 1570. In the depicted embodiment, pointer 1580 is mounted to the front trunnion, adjacent shaft 1400.

Saw 1000 also includes an elevation plate 1700. The elevation plate is supported by the front and rear trunnions and tilts with the trunnions. The blade is supported on the elevation plate, as will be described, so tilting the elevation plate causes the blade to tilt. The elevation plate is also configured to move up and down relative to the trunnions. Moving the elevation plate up and down is what causes the blade to move up and down relative to the tabletop.

Figure 58:
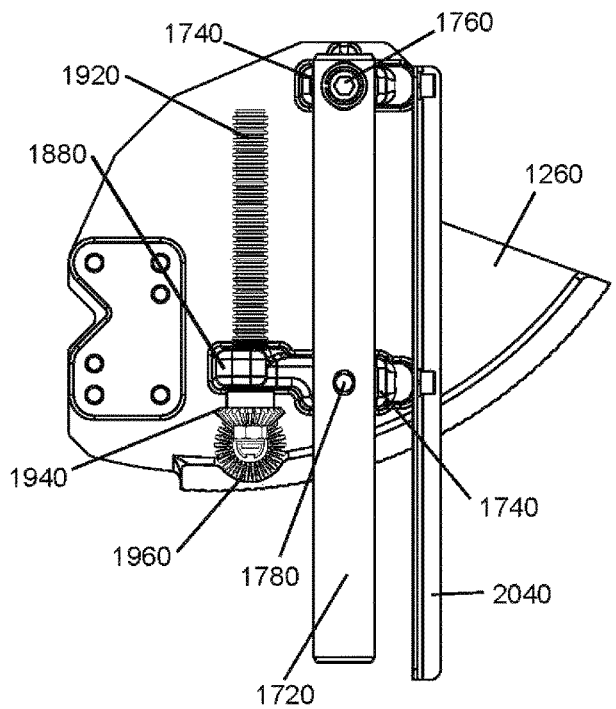
FIG. 58 shows shafts used in the elevation system of the saw shown in FIG. 22.
Figure 59:
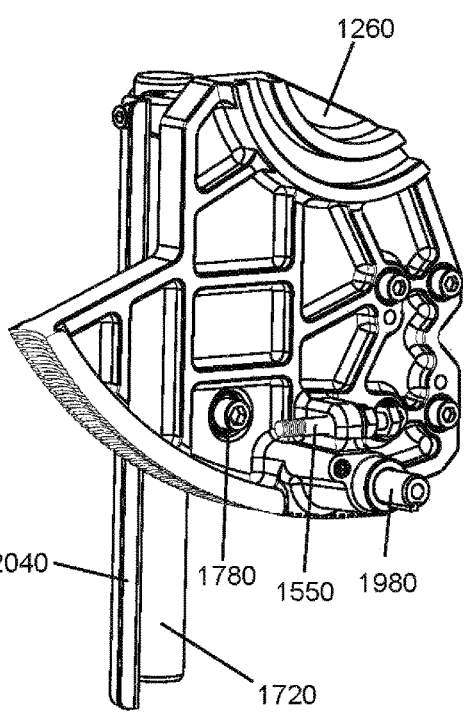
FIG. 59 is a different view of the portion of the elevation system shown in FIG. 58.
Figure 60:
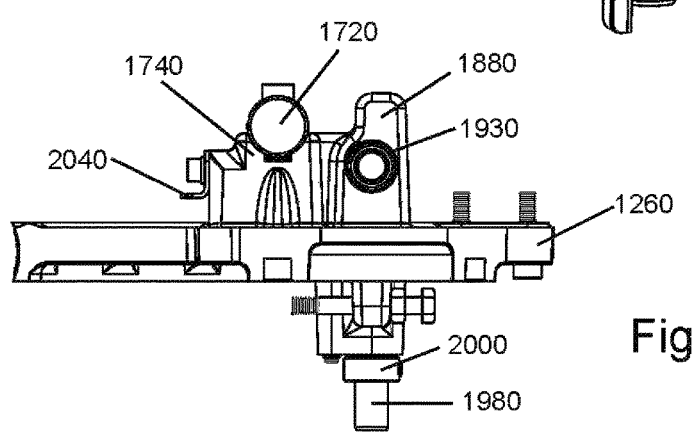
FIG. 60 is a top view of the portion of the elevation system shown in FIG. 58.
Figure 61:
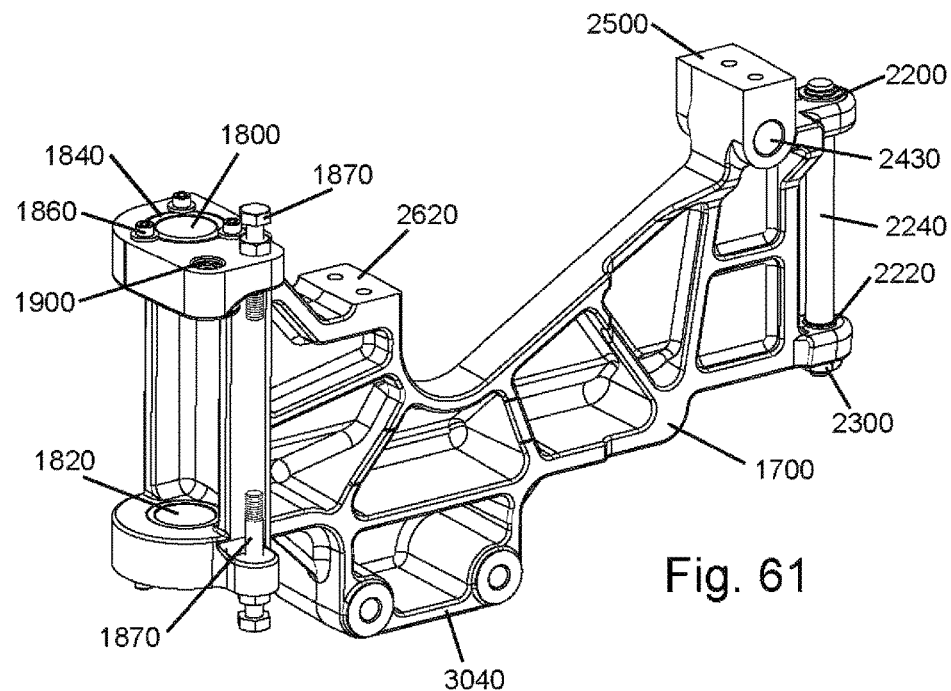
FIG. 61 is a perspective, right-side view of an elevation plate.

Elevation plate 1700 includes two bores 1800 and 1820, labeled in FIG. 61. A bushing 1840, which may be made from oil impregnated bronze, fits into each bore and is held in place by screws and washers 1860. The washers overlap the edge of the bushing to prevent the bushing from moving out of the bore. A support shaft 1720 fits into bores 1800 and 1820, as shown in FIGS. 40 through 45, and elevation plate 1700 is free to slide up and down on the shaft. Shaft 1720 is bolted onto front trunnion 1260 to connect the elevation plate to the front trunnion. In the depicted embodiment, shaft 1720 fits into two notches 1740 in front trunnion 1260. Bolts 1760 and 1780 then secure the shaft to the front trunnion, as shown in FIGS. 58 through 60. Bolt 1760 extends through shaft 1720 and threads into a hole in the front trunnion. Bolt 1780 extends through the front trunnion and threads into shaft 1720. In this manner the shaft is securely anchored to the front trunnion. Shaft 1720 may be mounted to the front trunnion in other ways as well.

Figure 40:
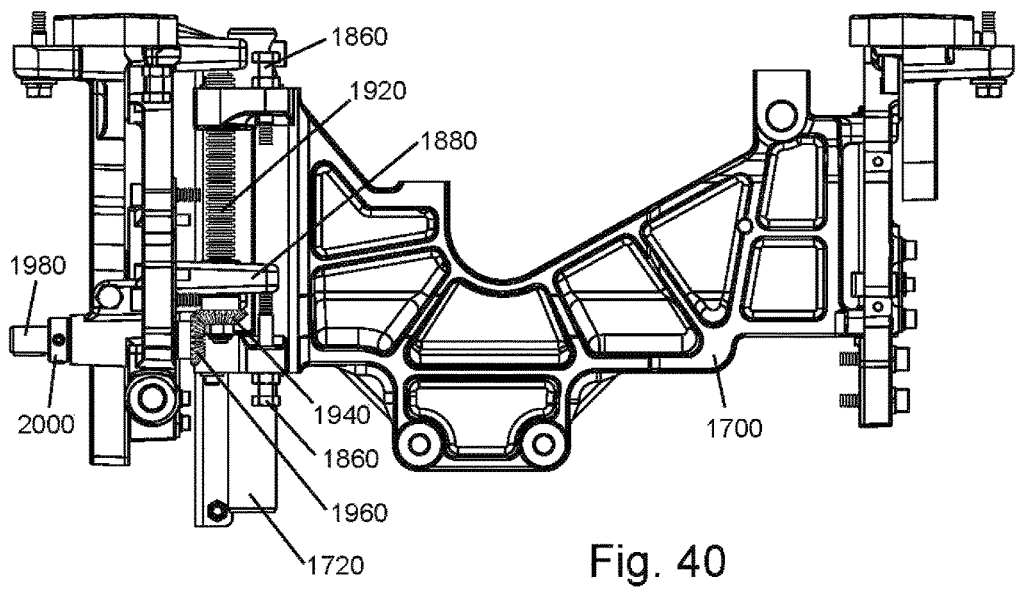
FIG. 40 shows a right-side view of an elevation plate and elevation system.
Figure 41:
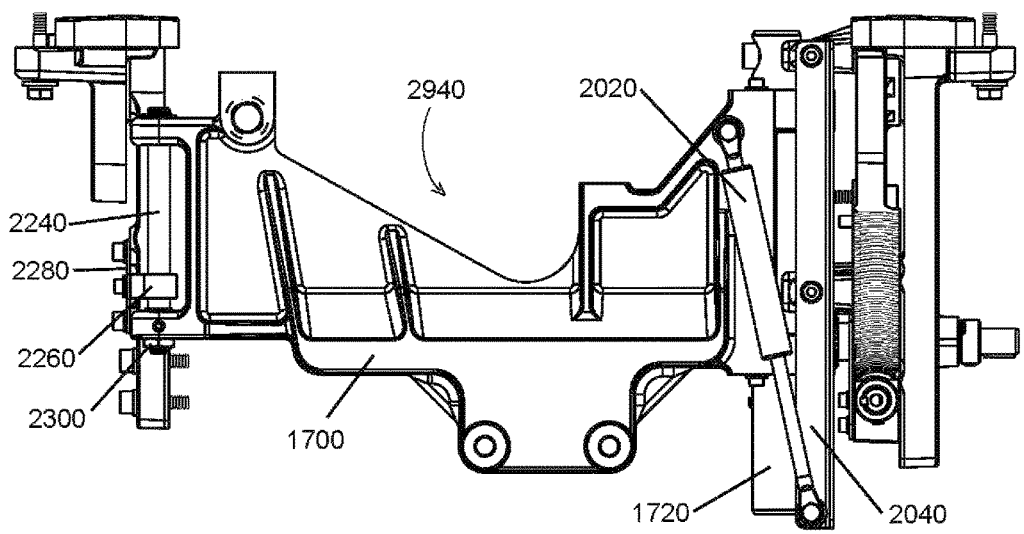
FIG. 41 shows a left-side view of an elevation plate and elevation system.
Figure 42:
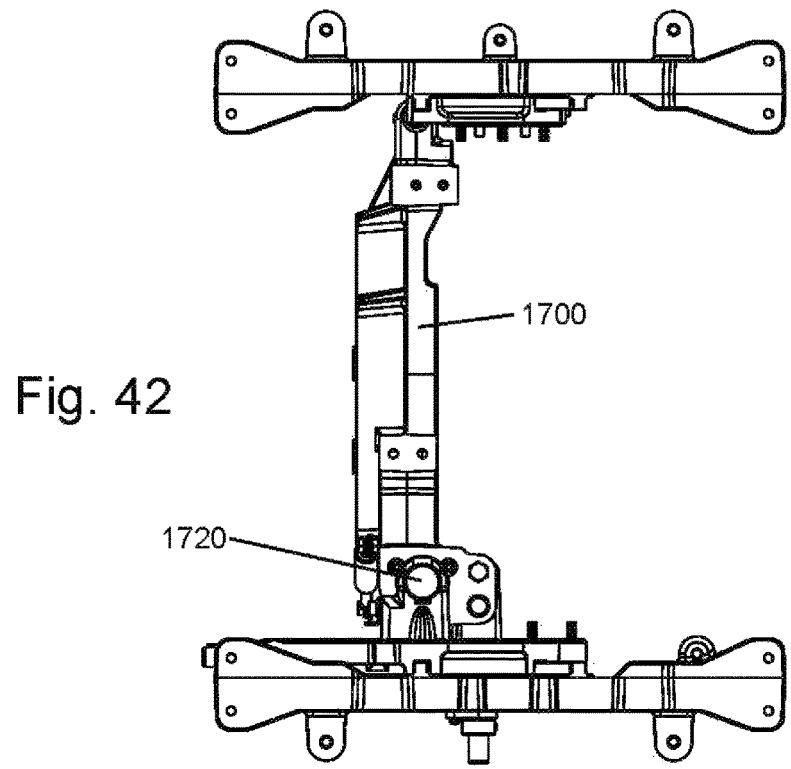
FIG. 42 shows a top view of an elevation plate and elevation system.
Figure 43:
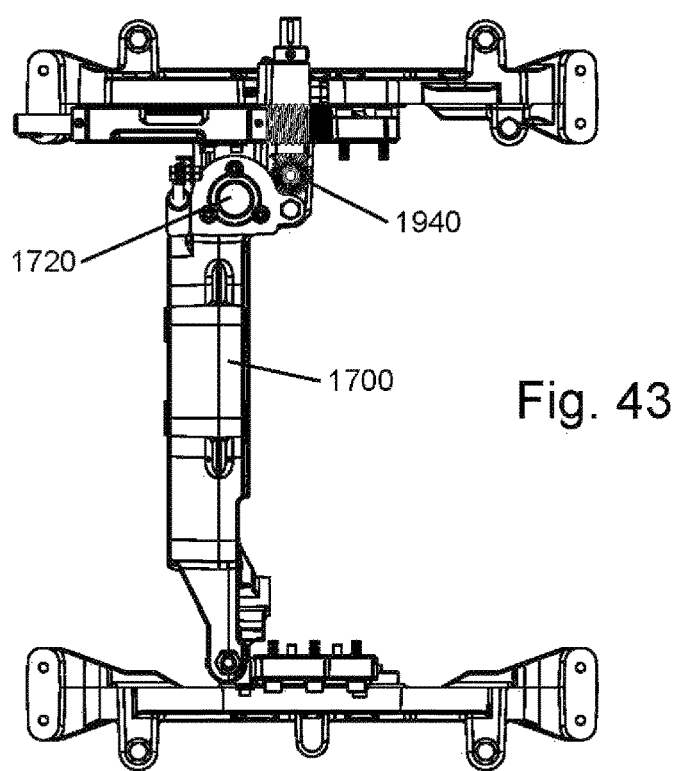
FIG. 43 shows a bottom view of an elevation plate and elevation system.

The distance elevation plate 1700 may slide up and down on shaft 1720 is ultimately defined by the spacing between notches 1740 on front trunnion 1260 and the spacing between bores 1800 and 1820 on the elevation plate. That distance, however, may be further defined by adjustable stops 1870 shown in FIG. 61. These stops are made of bolts threaded through holes in the elevation plate and lock nuts to hold the bolts in place, as shown. The bolts are positioned so they abut a shoulder 1880 extending out from the front trunnion bracket, as shown in FIG. 40. (Shoulder 1880 is also shown in FIGS. 58 and 60.) The distance the elevation plate may slide up or down on shaft 1720 is thus defined by how far the stops or bolts extend.

Elevation plate 1700 also includes a threaded bore 1900 configured to accept a threaded shaft 1920, shown best in FIGS. 40, 47 and 58. Shaft 1920 also extends through a bore 1930 in shoulder 1880 on the front trunnion bracket to further support the shaft (bore 1930 is labeled in FIGS. 34 and 60). The threaded shaft may be held in bore 1930 in any manner, such as by clips or collars. A bevel gear 1940 is mounted on the end of shaft 1920 below shoulder 1880. A second bevel gear 1960 is mounted on a shaft 1980 that extends perpendicularly relative to shaft 1920. Shaft 1980 extends through and is supported for rotation by the front trunnion. A collar 2000 holds shaft 1980 in place. Shafts 1920 and 1980 are positioned so that the two bevel gears mesh. Shaft 1980 also extends through a hole in cabinet 1040 and hand wheel 1100 is mounted on the shaft. When a person turns hand wheel 1100, bevel gear 1960 causes threaded shaft 1920 to turn. When threaded shaft 1920 turns, elevation plate 1700 moves up or down on the shaft because hole 1900 is threaded. Moving the elevation plate up and down causes the blade to move up and down relative to the tabletop. In this manner, a user may adjust the elevation of the blade.

The construction of elevation plate 1700 and shafts 1720 and 1920 may be referred to as a vertical slide because the elevation plate slides vertically on shaft 1720. Other constructions of vertical slides are also possible, such as using one or move dovetail slides instead of a shaft. Multiple vertical shafts may also be used instead of one shaft and multiple vertical shafts may be spaced apart to support the elevation plate. Shafts or dovetail slides may also be positioned at each end of the elevation plate instead of at one end only.

Additionally, a motor may be used instead of hand wheel 1100 to turn the bevel gears to raise or lower the elevation plate, or a motorized lift may be used instead of the bevel gears. The motor or lift may be actuated by a typical switch or by a switch configured to be similar to a hand wheel.

Elevation plate 1700, and any components attached to the elevation plate (such as a motor, as will be discussed below), may have significant weight and therefore it may be difficult to turn hand wheel 1100 to raise the blade. Accordingly, the depicted embodiment includes a gas spring 2020 mounted at one end to the elevation plate and at the other end to a bracket 2040 mounted to the front trunnion, as shown best in FIGS. 44 and 45. The gas spring is biased to push the elevation plate up with a predetermined amount of force to make it easy for a user to turn hand wheel 1100 to raise the blade. The force of the gas spring may be selected so that the elevation plate is biased up or down to take out any play or slack between threaded shaft 1920 and threaded bore 1900. Forces in the range of 50 to 250 pounds may be used, depending on how much weight must be lifted.

It is important that elevation plate 1700 be restricted from any side-to-side motion or rotation around the longitudinal axis of support shaft 1720 in order to hold the saw blade straight, and support shaft 1720 and threaded shaft 1920 limit how the elevation plate may move. However, in the depicted embodiment, because the elevation plate is relatively long and supported principally at one end, and also because of manufacturing tolerances in shafts 1720 and 1920 and their corresponding bores in the elevation plate, there is a risk that the elevation plate may move slightly in an undesired manner, especially if the elevation plate is tilted. Accordingly, elevation plate 1700 includes bores 2200 and 2220 in two projections at the distal end of the elevation plate, opposite bores 1800 and 1820, and a guide shaft 2240 is mounted in the bores. The guide shaft may be held in the bores by clips, bolts, or any other method.

A guide block 2260 is placed on the guide shaft between bores 2200 and 2220 so the shaft can move up and down in the guide block. The guide block, in turn, is mounted to the apex of a V-bracket 2280, and the opposite two ends of the V-bracket are bolted to the rear trunnion 1280, as shown in FIGS. 44 and 46. This arrangement allows the elevation plate to move up and down to change the elevation of the blade, but prevents the distal end of the elevation plate from moving to the side or rotating around shaft 1720 because the V-bracket is bolted to the rear trunnion and the guide block is mounted to the V-bracket.

This arrangement also accommodates variances or tolerances in manufacturing. Guide shaft 2240 should be substantially parallel with support shaft 1720 so that the elevation plate can move up and down on shaft 1720 without binding on shaft 2240. However, it may be difficult to make shaft 2240 substantially parallel with shaft 1720, especially given that the shafts are spaced a significant distance apart.

In the depicted embodiment, guide shaft 2240 may be mounted in an eccentric bushing 2300. Bushing 2300 is similar to bushing 1460 shown in FIG. 56, except it does not need shoulders 1520. Bushing 2300 has an off-center hole through which guide shaft 2240 passes. The bushing is placed over the shaft and in bore 2220 and held on the shaft by a clip. The bushing may then be turned to move the guide shaft and align the shaft as necessary. When the bushing is turned to its desired location, it is held in place by a set screw 2320 shown in FIG. 46.

Guide block 2260 is bolted onto the apex of V-bracket 2280, as explained. A single bolt mounts the guide block to the V-bracket so the bracket can be adjusted or rotated around the bolt to align with the guide shaft so the guide shaft can slide up and down in the guide block.

The two ends of V-bracket 2280 opposite the guide block are bolted to the rear trunnion by bolts 2340, as stated. The V-bracket itself is made of a material which has some flex, such as metal, and there is a distance between bolts 2340 and guide block 2260. That distance and the flex of the material allow the V-bracket to flex out toward the rear of the saw if necessary to accommodate the guide shaft. That flex may be necessary if the distance of shaft 2240 from shaft 1720, the position of shaft 1720 or shaft 2240 in the saw, or the dimension of other components in the saw varies due to manufacturing tolerances or other reasons. That flex also may be necessary to accommodate the expanding or contracting of the elevation plate due to temperature changes. Thus, the ability of the V-bracket to flex out helps prevent the guide shaft from binding in guide block 2260.

This mounting configuration may be thought of as constraining only one degree of freedom of the guide shaft; specifically, it constrains any side-to-side movement of the guide shaft. The mounting configuration allows the guide shaft and elevation plate to move up and down and front-to-back. This mounting configuration accommodates some misalignment of the guide shaft.

Figure 51:
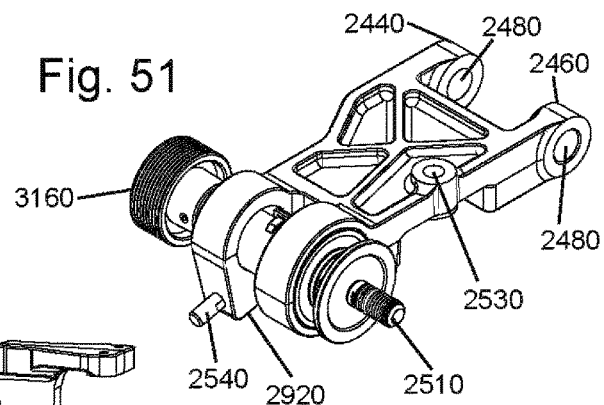
FIG. 51 shows an arbor block and arbor used in the saw shown in FIG. 22.
Figure 52:
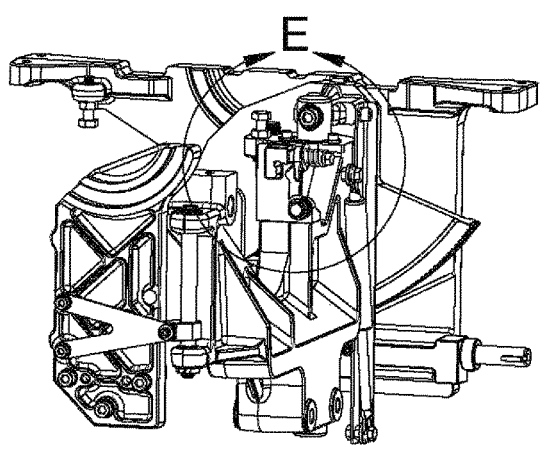
FIG. 52 shows a portion of the internal mechanism of the saw shown in FIG. 22, with a portion labeled "E" designated for a detail view.
Figure 53:
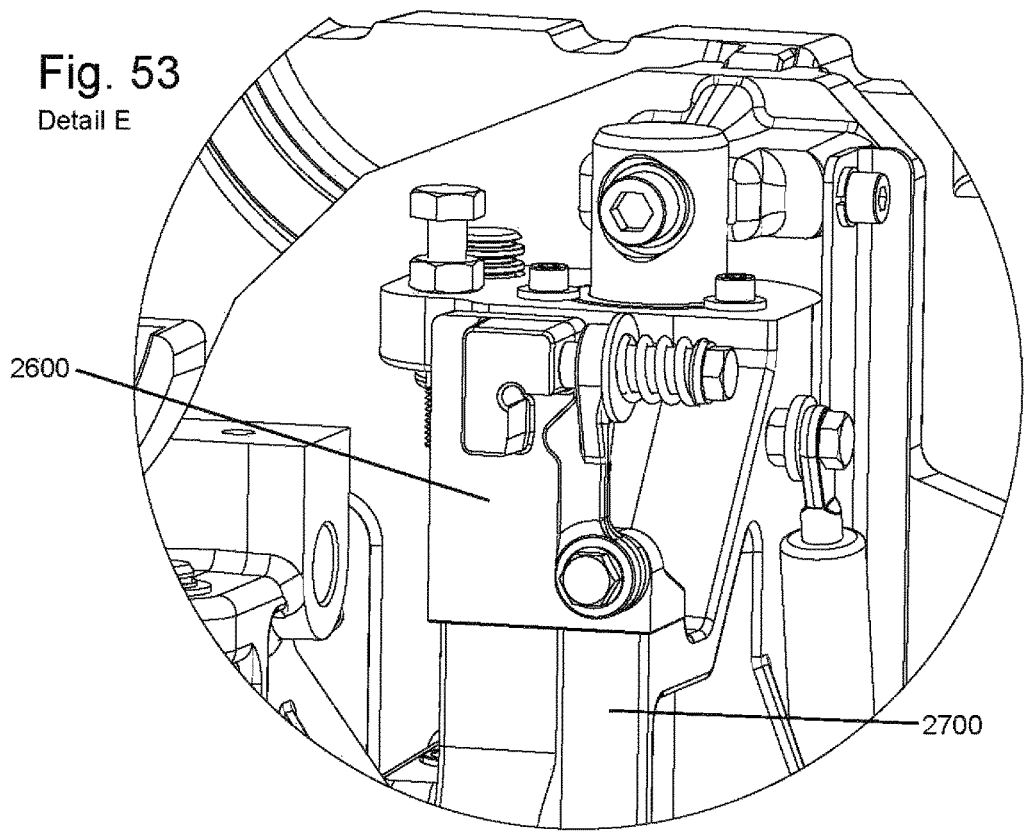
FIG. 53 is the detail view of the portion labeled "E" in FIG. 52, showing an arbor block support mechanism.
Figure 54:
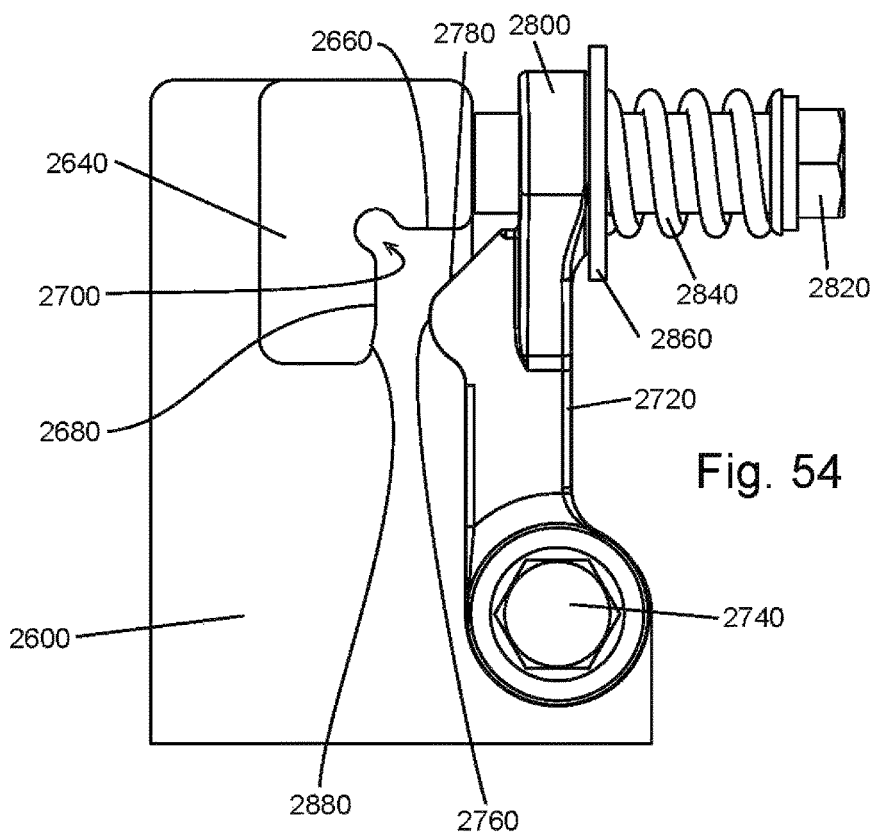
FIG. 54 shows an arbor block support mechanism.
Figure 55:
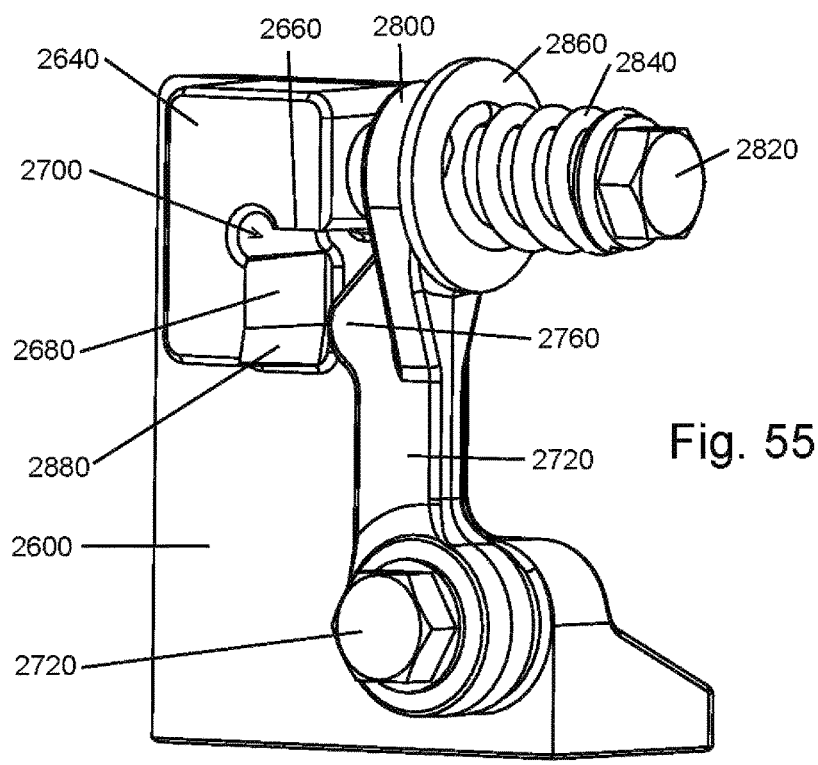
FIG. 55 also shows an arbor block support mechanism.
Figure 62:
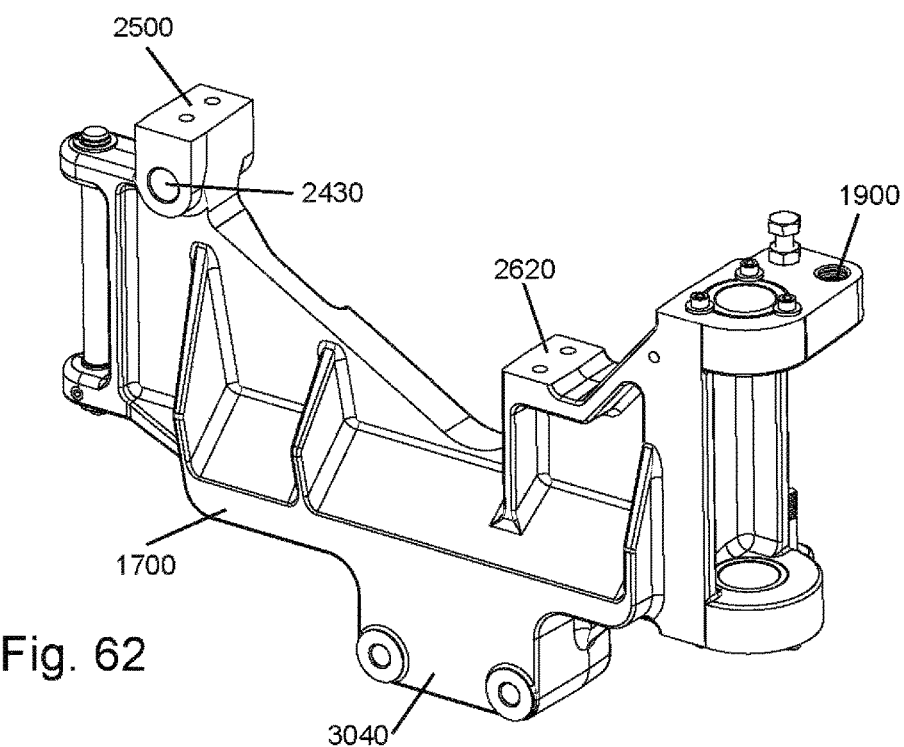
FIG. 62 is a perspective, left-side view of the elevation plate shown in FIG. 61.

An arbor block 2400 is pivotally mounted to the elevation plate as shown in FIGS. 47 and 48. The arbor block includes two projections 2440 and 2460, each projection having a bore 2480, as shown in FIG. 51. The elevation plate includes a raised portion 2500 and bore 2430 extends through that raised portion, as shown in FIG. 62. Projections 2440 and 2460 on the arbor block sandwich raised portion 2500, and a shaft 2420 then passes through bores 2480 in the arbor block and bore 2430 in the elevation plate to mount the arbor block to the elevation plate. Arbor block 2400 may then pivot up and down around shaft 2420.

An arbor 2510 is mounted for rotation in arbor block 2400, as shown in FIGS. 47 and 51, and the blade of the saw is mounted on the arbor so that it spins when the arbor rotates. The arbor is held in two bearings that are mounted in bearing seats in the arbor block. The bearings are isolated electrically from the arbor block by plastic overmolding on the arbor or by insulating bushings. Electrodes are positioned adjacent but not touching the arbor to impart the electrical signal to the blade used in the detection subsystem discussed above. The configuration of the arbor and electrodes are disclosed in detail in U.S. Provisional Patent Application Ser. No. 60/496,550, entitled "Table Saws with Safety Systems and Blade Retraction," filed Aug. 20, 2003, the disclosure of which is hereby incorporated by reference.

Figure 30:
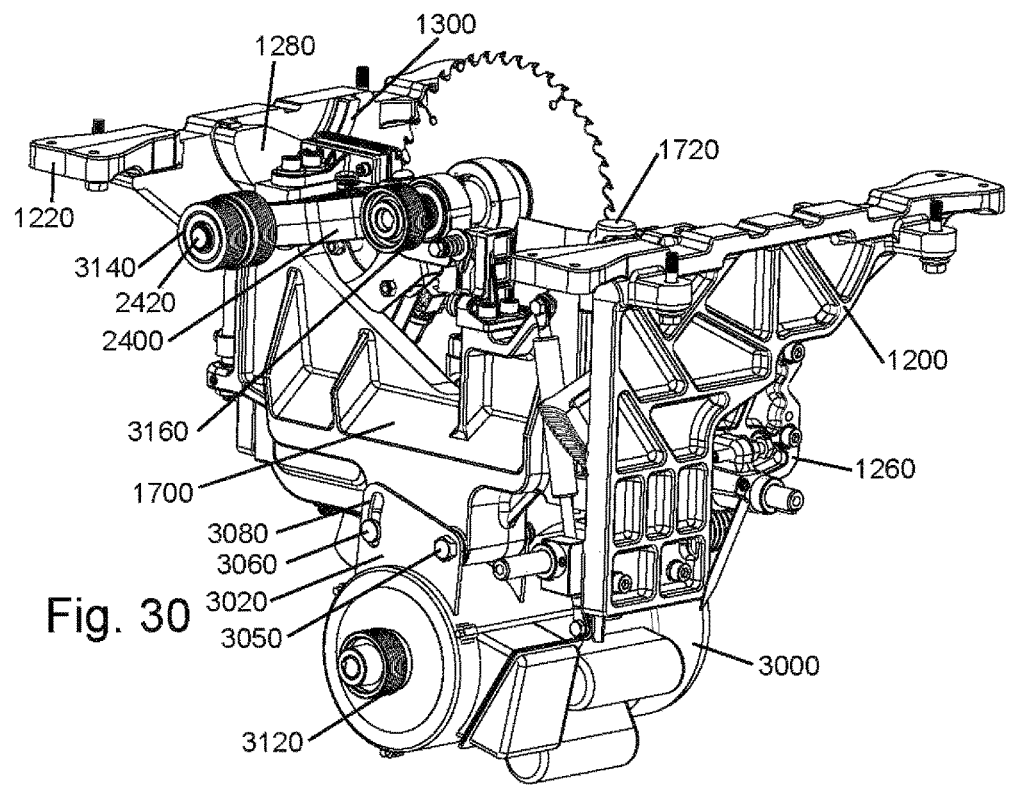
FIG. 30 shows a front-left perspective view of the internal mechanism of the saw with the table removed.
Figure 31:
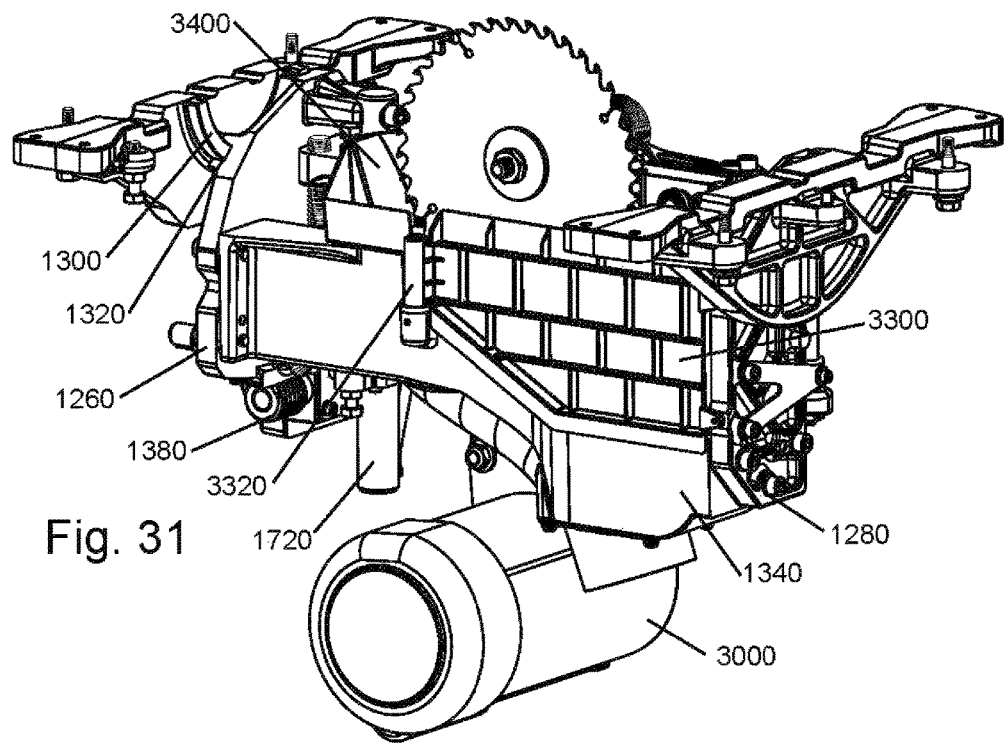
FIG. 31 shows a back-right perspective view of the internal mechanism of the saw.

Shaft 2420 extends outwardly from the right side of the arbor block a sufficient distance so that a brake cartridge 2520 may be pivotally mounted on the shaft, as shown in FIG. 30. The brake cartridge is sized and positioned so that it is adjacent the perimeter of a blade having a specified nominal diameter. The brake cartridge includes a pawl, and the pawl pivots toward the blade around shaft 2420 to stop the blade from spinning when the detection subsystem detects that a person has contacted the blade, as described above. The brake cartridge may be constructed and mounted in the saw in many ways. Examples of how the brake cartridge may be constructed and mounted in a saw are disclosed in U.S. Provisional Patent Application Ser. No. 60/496,574, entitled "Brake Cartridges for Power Equipment," filed Aug. 20, 2003, and U.S. Provisional Patent Application Ser. No. 60/533,575, entitled "Brake Cartridges and Mounting Systems for Brake Cartridges," the disclosures of which are hereby incorporated by reference. That provisional patent application also discloses how the position of the brake cartridge relative to the perimeter of the blade may be adjusted by a linkage between the arbor block and the mounting structure for the brake cartridge. Arbor block 2400 includes an aperture 253 through which a bolt may extend to adjust the spacing between the brake cartridge and the blade.

Brake cartridge 2520 also acts as a mechanism to prevent a user of the saw from installing a blade larger than recommended. The brake cartridge physically blocks a large blade from being mounted on the arbor because the blade bumps into the brake cartridge.

Arbor block 2400 includes a pin 2540 (labeled in FIG. 51) that engages an arbor block support mechanism 2560 to hold the arbor block up and prevent the arbor block from pivoting around shaft 2420 during normal operation of the saw. Pin 2540 and arbor block support mechanism 2560 also provide rigidity to the arbor block and minimize any vibration of the arbor block during normal operation of the saw. However, when a person accidentally contacts the blade the brake cartridge will engage and stop the blade. The angular momentum of the blade as it is stopped will create a significant downward force and that force will cause pin 2540 to disengage from the arbor block support mechanism. When the pin has disengaged, the arbor block will be free to pivot around shaft 2420, so the downward force resulting from stopping the blade will cause the arbor block to pivot down very quickly. The blade will also pivot down because the blade is supported by the arbor block. In this manner, the blade will retract below the tabletop of the saw when a person accidentally contacts the blade.

The arbor block support mechanism is shown in detail in FIGS. 47 and 52 through 55. An L-shaped bracket 2600 is bolted onto surface 2620 on the elevation plate (surface 2620 is labeled in FIG. 62). The L-shaped bracket includes a projection 2640 having a first surface 2660 and a second surface 2680. The first and second surfaces define a corner region 2700 into which pin 2540 would normally nest. Material from projection 2640 may be removed in the corner region to allow pin 2540 to contact first and second surfaces 2660 and 2680 at points that are somewhat distant from each other to better hold the pin. A small pivot arm 2720 is mounted on L-bracket 2600 so that the pivot arm may pivot around a bolt 2740. The pivot arm includes a tab 2760 having a support surface 2780. Support surface 2780 also abuts against pin 2540 to help hold the pin in place during normal operation of the saw. Pivot arm 2720 also includes a distal end 2800 shaped to include an aperture through which a shoulder bolt 2820 may pass. The shoulder bolt passes through distal end 2800 and threads into projection 2640 in the L-shaped bracket. A spring 2840 and washer 2860 are positioned between the head of bolt 2820 and distal end 2800 of the pivot arm. The spring is sized to bias the pivot arm toward projection 2640. Thus, pin 2540 is held in corner 2700 by spring 2840 pushing pivot arm 2720 against the pin. Threading bolt 2820 into or out of projection 2640 will adjust the force exerted by spring 2840 against pin 2540.

When brake cartridge 2520 stops the blade, the downward force caused by the angular momentum of the blade will overcome the force of spring 2840, and pin 2540 will then push pivot arm 2720 aside and move down. Projection 2640 includes a third surface 2880 that connects with but slopes away from second surface 2680. Third surface 2880 slopes away in order to provide clearance for pin 2540 to move down. As soon as pin 2540 moves down past the point where the third and second surfaces connect, the pin no longer contacts projection 2640 so it is free to move down. Similarly, tab 2760 on pivot arm 2720 is rounded to quickly release pin 2540 when the pin begins to move down. The intersection of second surface 2680 with third surfaces 2880 is positioned substantially opposite the tangent point of the rounded tab 2760 so that pin 2540 is released from both projection 2640 and tab 2760 substantially simultaneously.

Figure 33:
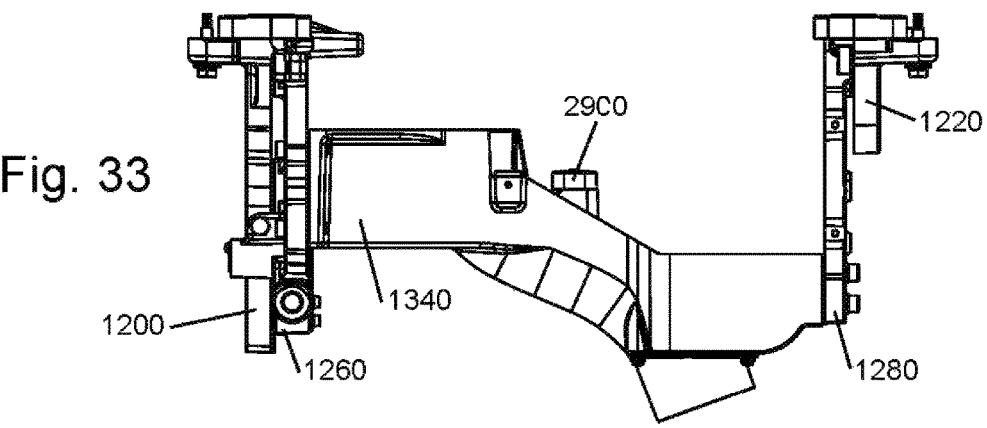
FIG. 33 shows a right-side view of a trunnion brace used in the saw shown in FIG. 22.
Figure 50:
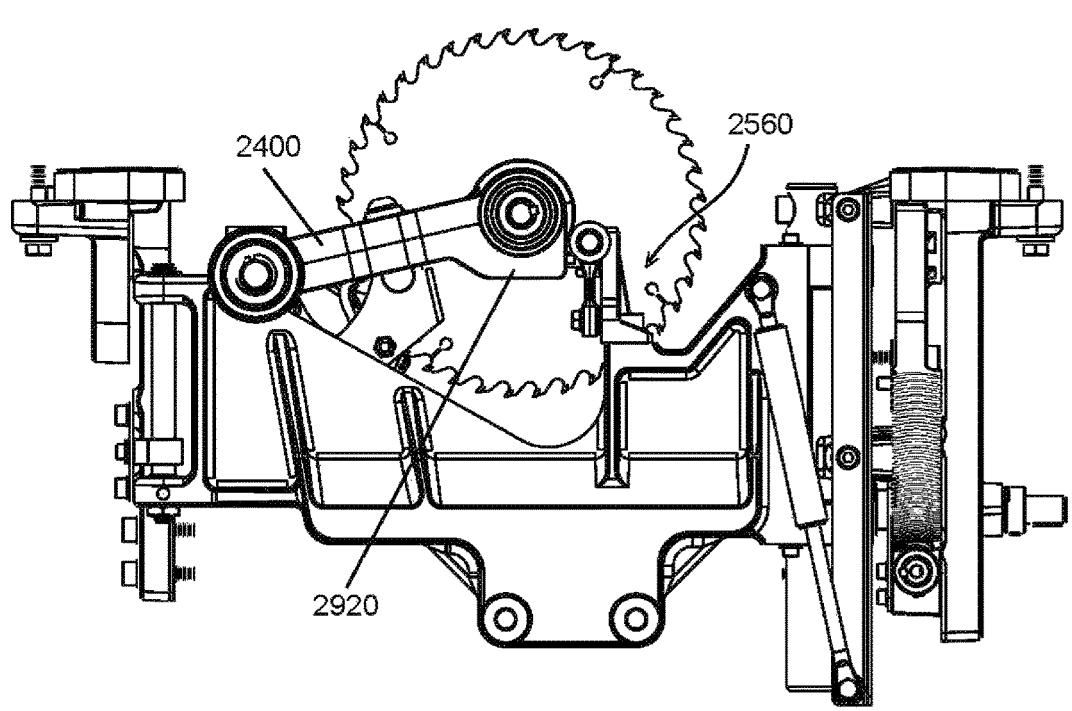
FIG. 50 is a left-side view of part of the internal mechanism of the saw shown in FIG. 22, including an elevation plate, arbor assembly, brake cartridge, blade and arbor block support mechanism.

A bumper or pad 2900 is mounted on trunnion brace 1340 below arbor block 2400, as shown in FIGS. 24 and 33. When the arbor block retracts, bumper 2900 stops the downward motion of the arbor block and helps absorb the energy of the retraction. The arbor block includes a surface 2920 configured to contact bumper 2900, as shown in FIGS. 50 and 51.

The energy of retraction may be significant. Accordingly, bumper 2900 may be selected from materials that have good dampening characteristics and arbor block 2400 may be made from a ductile iron so that the arbor block it is less likely to be damaged during retraction. Additionally, trunnion brace 1340 should be constructed so that it is sufficiently strong to support bumper 2900 and withstand the force of impact with the arbor block.

Figure 35:
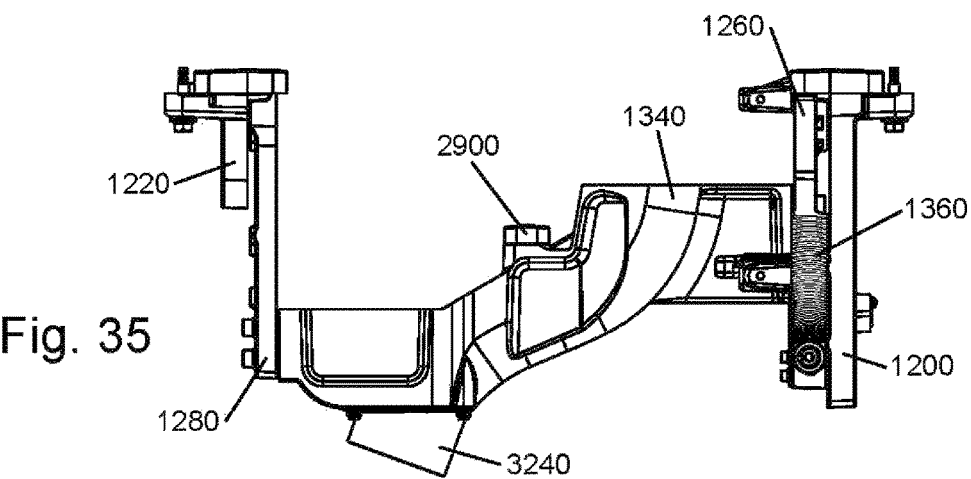
FIG. 35 shows a left-side view of a trunnion brace used in the saw shown in FIG. 22.
Figure 36:
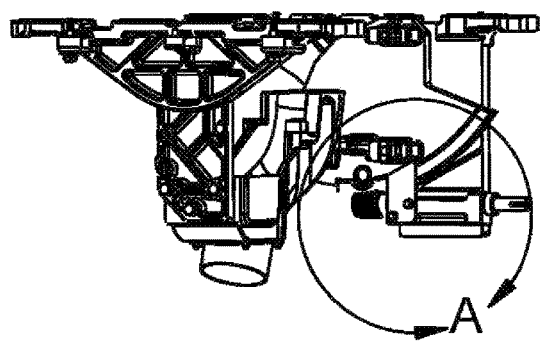
FIG. 36 shows part of the internal mechanism of the saw with a portion labeled "A" designated for a detailed view.

Trunnion brace 1340 and elevation plate 1700 are both construction to provide clearance for the arbor block and blade to retract in case of an accident. As shown in FIGS. 33 and 35, the trunnion brace sweeps down from front trunnion 1260 to rear trunnion 1280 so that the bottom of the blade will not contact the trunnion brace when the blade is fully retracted. Elevation plate 1700 also includes a recessed area 2940 (labeled in FIG. 41) that allows the arbor block to pivot down.

Figure 49:
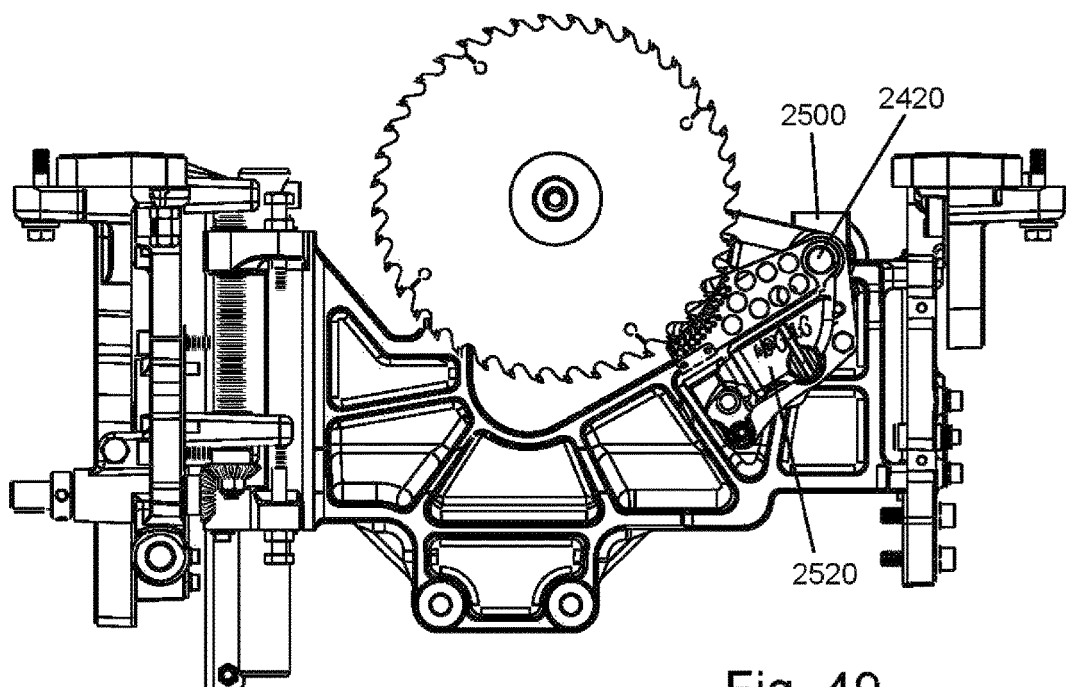
FIG. 49 is a right-side view of part of the internal mechanism of the saw shown in FIG. 22, including an elevation plate, arbor assembly, brake cartridge and blade.

Saw 1000 is powered by a motor 3000 mounted to the bottom of elevation plate 1700. The motor may be mounted to the elevation plate in many ways. In the depicted embodiment, tabs 3020 projects up from the motor and sandwich a projection 3040 on the bottom of the elevation plate (projection 3040 is labeled in FIGS. 61 and 62). Bolts 3050 and 3060 pass through holes in the tabs and projection to mount the motor to the elevation plate, as shown in FIGS. 48 and 49.

A drive shaft 3100 extends from the motor and a pulley 3120 is mounted on the drive shaft. A double pulley 3140 is mounted on the left end of shaft 2420 so that a first belt (not shown) may extend around the motor pulley and the outside of the double pulley. A third pulley 3160 is mounted on the left end of arbor 2510 and a second belt (not shown) extends around pulley 3160 and the inside of double pulley 3140. Motor 3000 turns pulley 3120, which then turns double pulley 3140 and arbor pulley 3160, causing the blade mounted on the arbor to spin. The depicted embodiment includes a double belt system as described so that arbor block 2400 may retract by pivoting down around shaft 2420 without disengaging from the drive belts.

Pulleys 3140 and 3160 are fixed-center pulleys, so a slightly stretchy Poly-V belt designed for fixed center pulleys is used. A slightly stretchy belt also has the advantage of being able to stretch and slip on pulley 3160 when the brake cartridge stops the blade. This is advantageous because pulley 3160 will stop very suddenly when the brake cartridge stops the blade, but the motor and belts will continue spinning for a short period of time. A stretchy belt will be able to stretch and slip on pulley 3160 when the pulley stops suddenly. Of course, other belt and pulley configurations and belt tensioning systems may be used.

The belt around pulley 3160 is preferably made of a static dissipative material so that static charge does not build up on the arbor or blade. This is advantageous because in some implementations a static charge may interfere with the detection subsystem. A standard belt or a slightly stretchy belt may extend around motor pulley 3120 and the outside of double pulley 3140. The pulleys may be sized so that the blade spins at a desired speed, such as 4000 rpm, while the motor spins at a different speed, such as 3450 rpm.

The belt extending around the motor pulley and the outside of double pulley 3140 may be tensioned by moving the motor out. In the depicted embodiment, motor 3000 is mounted to the elevation plate so that it may pivot around bolt 3050. Tabs 3020 include an oversized hole 3080 through which bolt 3060 passes so that the motor may pivot around bolt 3050. To put tension on the belt, bolt 3060 is loosened and the motor is pivoted around bolt 3050 away from the double pulley. When the desired tension is achieved, bolt 3060 is tightened to hold the motor in position.

Trunnion brace 1340 is shaped to partially shroud the blade under table 1020. Shrouding the blade prevents a person from contacting the blade under the table. This is useful because if a person contacts the blade under the table, the brake cartridge will fire and the blade will retract, possibly into the person's hand. Shrouding the blade also helps to collect sawdust created when the saw is running.

Figure 34:
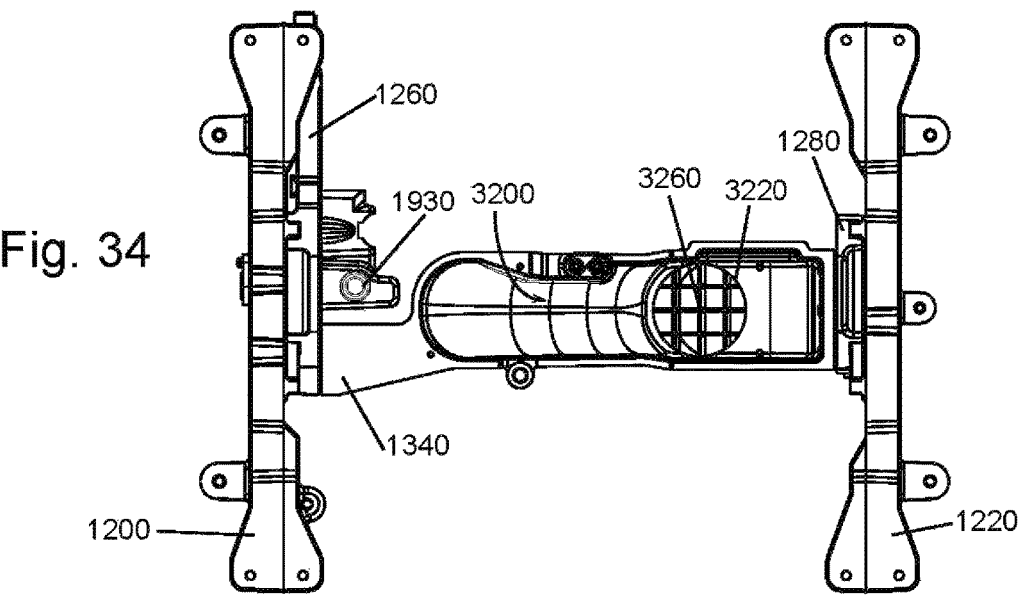
FIG. 34 shows a top view of a trunnion brace used in the saw shown in FIG. 22.

Trunnion brace 1340 is shaped to create a trough or channel 3200, shown in FIG. 34. The trough is wide enough to shroud the blade and to allow a person to reach into the saw through opening 1060 in the tabletop to change either the blade or brake cartridge. Trough 3200 is sloped down, as shown in FIGS. 33 and 35, to direct sawdust toward a port 3220 in the bottom of the trough. Preferably, the inside surface of the trough, including the bottom and side walls, is as smooth as possible to avoid trapping sawdust. A hose coupling 3240 is mounted to the bottom of the trunnion brace over port 3220. The coupling includes a mesh 3260 sized to prevent the bolt and washer with which the blade is secured to the arbor from falling through the mesh. It is possible when a user changes the blade that the blade nut or washer could fall into the saw and become difficult to retrieve. Mesh 3260 prevents the bolt or washer from falling where they would be difficult to retrieve. A flexible vacuum hose or other conduit (not shown) is connected to the bottom of the coupling and extends to a similar port on the back of the saw. Thus, sawdust is collected by the blade shroud and then directed out through port 3220 and through a conduit to the back of the saw. A user may connect a vacuum system to the port on the back of the saw to collect the sawdust and to create an airflow from the blade shroud to the back of the saw. The hose or conduit between coupling 3240 and the port on the back of the saw is flexible so it can move when the trunnion brace tilts.

A side blade shroud 3300, shown in FIGS. 23, 27, 29 and 31, is mounted on trunnion brace 1340 to the right of the blade. This shroud further encloses the blade to prevent inadvertent contact with the blade and to collect sawdust. Side shroud 3300 is mounted to the trunnion brace by a vertical hinge 3320. The vertical hinge allows the side shroud to pivot out, away from the blade, around the vertical axis of the hinge. Pivoting the side blade shroud out provides additional room to change the blade or brake cartridge. The additional room is especially necessary to slide brake cartridge off of shaft 2420. The side shroud includes magnets 3330 to engage the rear trunnion and hold the side shroud closed, although other mechanisms may be used to hold the side shroud closed. The top of the side shroud is shaped and positioned sufficiently away from the underside of the tabletop so that the blade can tilt to the left without the side shroud bumping into the underside of the table.

A front shroud 3400 is also mounted on the trunnion brace to the front of the blade. This shroud further helps enclose the blade and direct sawdust to the port in the bottom of the trunnion brace. The right side of this shroud is shorter than the left side in order to allow the blade and trunnion brace to tilt to the left. This shroud would typically be made of a lightweight material to reduce the weight of the saw. Alternatively, the trunnion brace itself may be designed to extend up and form the front blade shroud.

The underside of table 1020 may include recesses to allow the blade to raise to a predetermined height without the arbor block bumping into the underside of the table.

Figure 22:
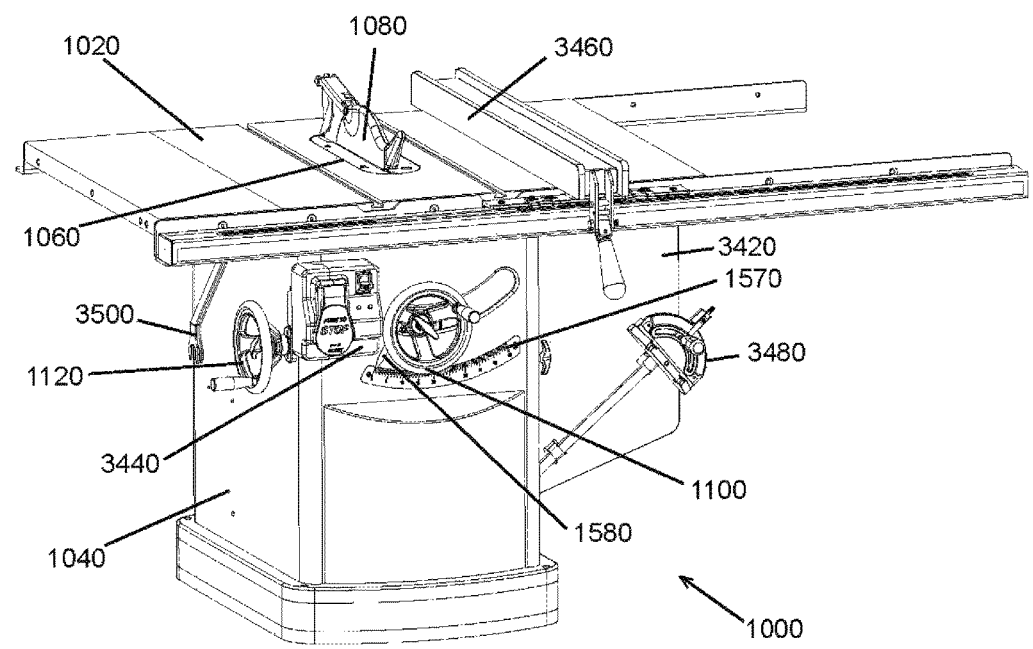
FIG. 22 shows a table saw.

The cabinet of the table saw may include in opening to allow access to the internal mechanism of the saw. FIG. 22 shows saw 1000 with a cover 3420 over such an opening. The cover is mounted to the cabinet with hinges so it can pivot open. A standard latch is used to keep the cover closed. The cover may include louvers to allow airflow into the cabinet.

Saw 1000 may also include a switch box 3440 with one or more switches to control the operation of the saw. A switch box designed for use with safety systems as described above is described in detail in U.S. Provisional Patent Application Ser. No. 60/533,598, entitled "Switch Box for Power Tools with Safety Systems," the disclosure of which is hereby incorporated by reference.

Saw 1000 may also come with a fence 3460 that rests on table 1020 and clamps to a front rail. The fence provides a face against which a user may slide a work piece when making a cut. The saw may also come with a miter gauge 3480 and a blade wrench 3500. One possible fence is disclosed in U.S. Provisional Patent Application Ser. No. 60/533,852, entitled "Improved Fence for Table Saws," the disclosure of which is hereby incorporated by reference.

Saw 1000 may also include a riving knife positioned adjacent the back edge of the blade. The riving knife may be mounted in the saw on raised portion 2500 of elevation plate 1700. Mounting the riving knife on that raised portion allows the riving knife to move up and down and tilt with the blade.

Guard 1080 also may mount on raised portion 2500, and may include a splitter and anti-kickback pawls. Guard 1080 can also be mounted in the saw in other ways.

Machines that include various components and features discussed above may be described as follows:

1) A cutting machine comprising a cutter; a brake adapted to stop the cutter, where the brake has an idle position and a braking position; and an actuation system adapted to selectively move the brake from the idle position to the braking position, where at least a portion of the actuation system must be replaced after moving the brake from the idle position to the braking position; wherein the actuation system includes an explosive device.

2) A cutting machine comprising a support structure; a cutting tool adapted to cut a workpiece, where the cutting tool is supported by the support structure; a detection system adapted to detect a dangerous condition between the cutting tool and a person; a reaction system adapted to perform a specified action upon detection of the dangerous condition; an explosive to trigger the reaction system to perform the specified action upon firing of the explosive; and a firing subsystem to fire the explosive upon detection of the dangerous condition.

Figure 63:
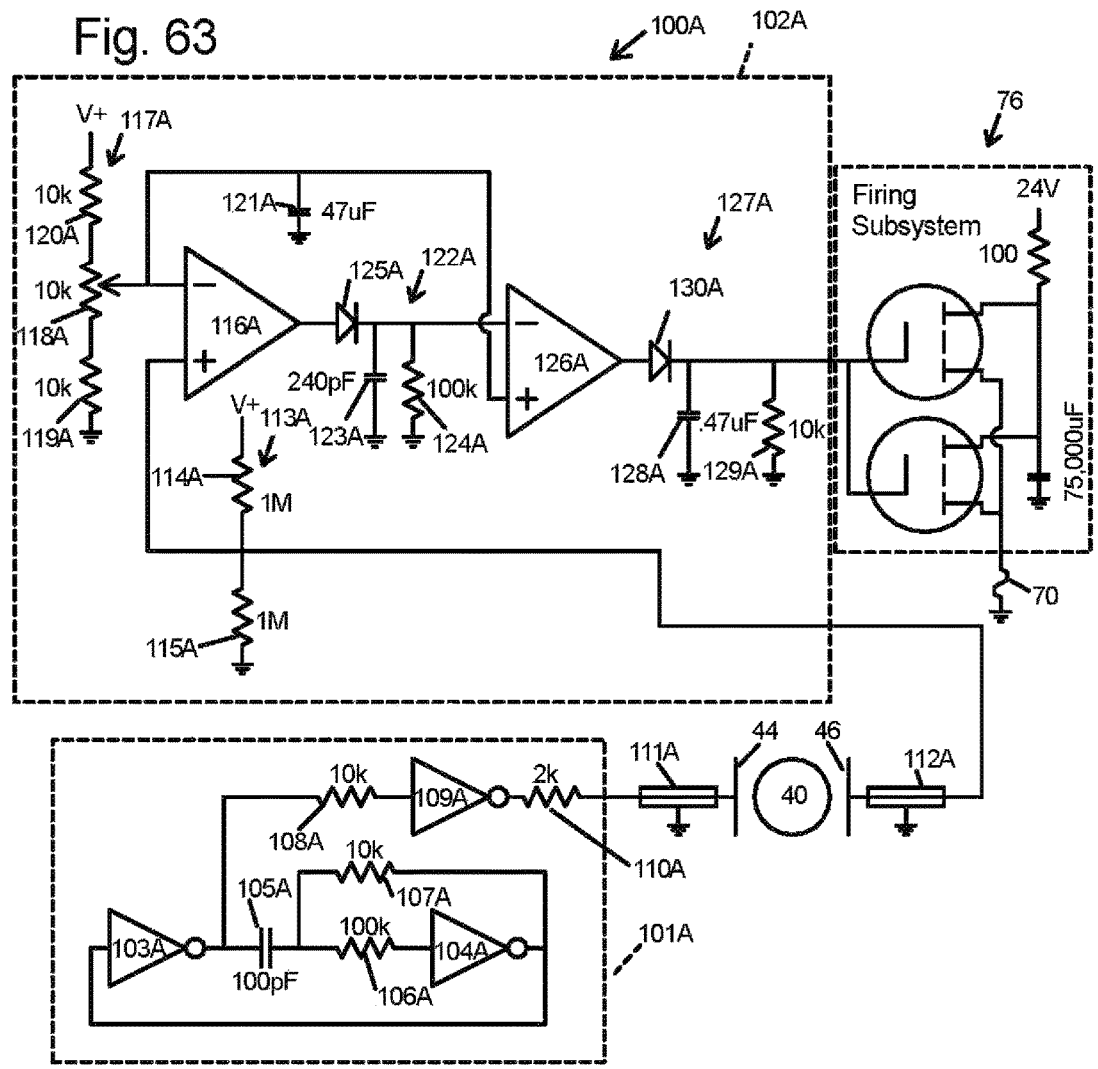
FIG. 63 is a schematic circuit diagram of an electronic subsystem for the safety system of FIG. 1, including an excitation system, a contact sense system and a firing system.

One example of an electronic subsystem 100A of contact detection subsystem 22 according to the present invention is illustrated in more detail in FIG. 63. Electronic subsystem 100A is adapted to work with the two-plate capacitive coupling system described in U.S. Provisional Patent Application Ser. No. 60/225,211, entitled "Apparatus and Method for Detecting Dangerous Conditions in Power Equipment," filed Aug. 14, 2000. Electronic subsystem 100A includes an excitation system 101A and a monitoring or contact sensing system 102A. However, it will be appreciated by those of skill in the electrical arts that the exemplary configuration of electronic subsystem 100A illustrated in FIG. 63 is just one of many configurations which may be used. Thus, it will be understood that any suitable embodiment or configuration could be used within the scope of the invention.

As shown in FIG. 63, excitation system 101A includes an oscillator circuit that generates a wave input signal, such as a square wave signal, at a frequency of approximately 200 khz and voltage amplitude of 12 volts. Alternatively, excitation system 101A may be configured to generate a signal of a different frequency and/or a different amplitude and/or different waveform. The oscillator is formed by a pair of inverters 103A, 104A from a CD4040 configured as a bistable oscillator. The output of inverter 103A is connected to a 100 pF capacitor 105A, which is connected through a 100 kΩ, resistor 106A to the input of inverter 104A. A 10 kΩ resistor 107A is connected between the output of inverter 104A to the junction between capacitor 105A and resistor 106A. The output of inverter 104A is connected to the input of inverter 103A. A 10 kΩ, resistor 108A connects the output of inverter 103A to the input of another inverter 109A, which serves as an output buffer to drive the input wave signal onto the blade. A 2 kΩ series resistor 110A functions to reduce any ringing in the input signal by damping the high frequency components of the signal.

It will be appreciated that the particular form of the oscillator signal may vary and there are many suitable waveforms and frequencies that may be utilized. The waveform may be chosen to maximize the signal-to-noise ratio, for example, by selecting a frequency at which the human body has the lowest resistance or highest capacitance relative to the workpiece being cut. As an additional variation, the signal can be made asymmetric to take advantage of potentially larger distinctions between the electrical properties human bodies and green wood at high frequency without substantially increasing the radio-frequency power radiated. For instance, utilizing a square wave with a 250 khz frequency, but a duty cycle of five percent, results in a signal with ten times higher frequency behavior than the base frequency, without increasing the radio-frequency energy radiation. In addition, there are many different oscillator circuits that are well known in the art and which would also be suitable for generating the excitation signal.

The input signal generated by the oscillator is fed through a shielded cable 111A onto charge plate 44. Shielded cable 111A functions to insulate the input signal from any electrical noise present in the operating environment, insuring that a "clean" input signal is transmitted onto charge plate 44. Also, the shielded cable reduces cross talk between the drive signal and the detected signal that might otherwise occur should the cables run close together. Alternatively, other methods may be used to prevent noise in the input signal. As a further alternative, monitoring system 102A may include a filter to remove any noise in the input signal or other electrical noise detected by charge plate 46. Shielded cable 111A also reduces radio-frequency emissions relative to an unshielded cable.

As described in more detail in U.S. Provisional Patent Application Ser. No. 60/225,211, entitled "Apparatus and Method for Detecting Dangerous Conditions in Power Equipment," filed Aug. 14, 2000, the input signal is coupled from charge plate 44 to charge plate 46 via blade 40. As shown in FIG. 63, the signal received on charge plate 46 is then fed via a shielded cable 112A to monitoring system 102A. The monitoring system is configured to detect a change in the signal due to contact between the user's body and the blade. It will be appreciated that monitoring system 102A may be implemented in any of a wide variety of designs and configurations. In the exemplary embodiment depicted in FIG. 63, monitoring system 102A compares the amplitude of the input signal received at charge plate 46 to a determined reference voltage. In the event that the input signal received at charge plate 46 falls below the reference voltage for a determined time, the monitoring system produces an output signal to reaction subsystem 24. The reaction subsystem is configured to receive the output signal and immediately act.

The particular components of monitoring system 102A may vary depending on a variety of factors including the application, the desired sensitivity, availability of components, type of electrical power available, etc. In the exemplary embodiment, a shielded cable 112A is connected between charge plate 46 and a voltage divider 113A. Voltage divider 113A is formed by two 1MΩ resistors 114A, 115A connected in series between the supply voltage (typically about 12 volts) and ground. The voltage divider functions to bias the output signal from charge plate 46 to an average level of half of the supply voltage. The biased signal is fed to the positive input of an op-amp 116A. Op-amp 116A may be any one of many suitable op-amps that are well known in the art. An example of such an op-amp is a TL082 op-amp. The negative input of the op-amp is fed by a reference voltage source 117A. In the exemplary embodiment, the reference voltage source is formed by a 10 kΩ potentiometer 118A coupled in series between two 10 kΩ resistors 119A, 120A, which are connected to ground and the supply voltage, respectively. A 0.47 µF capacitor 121A stabilizes the output of the reference voltage.

As will be understood by those of skill in the art, op-amp 116A functions as a comparator of the input signal and the reference voltage. Typically, the voltage reference is adjusted so that its value is slightly less than the maximum input signal voltage from charge plate 46. As a result, the output of the op-amp is low when the signal voltage from the charge plate is less than the reference voltage and high when the signal voltage from the charge plate is greater than the reference voltage. Where the input signal is a periodic signal such as the square wave generated by excitation system 101A, the output of op-amp 116A will be a similar periodic signal. However, when a user contacts the blade, the maximum input signal voltage decreases below the reference voltage and the op-amp output no longer goes high.

The output of op-amp 116A is coupled to a charging circuit 122A. Charging circuit 122A includes a 240 pF capacitor 123A that is connected between the output of op-amp 116A and ground. A 100 kΩ discharge resistor 124A is connected in parallel to capacitor 123A. When the output of op-amp 116A is high, capacitor 123A is charged. Conversely, when the output of op-amp 116A is low, the charge from capacitor 123A discharges through resistor 124A with a time constant of approximately 24 µs. Thus, the voltage on capacitor 123A will discharge to less than half the supply voltage in approximately 25-50 µs unless the capacitor is recharged by pulses from the op-amp. A diode 125A prevents the capacitor from discharging into op-amp 96. Diode 125A may be any one of many suitable diodes that are well known in the art, such as a 1N914 diode. It will be appreciated that the time required for capacitor 123A to discharge may be adjusted by selecting a different value capacitor or a different value resistor 124A.

As described above, charging circuit 122A will be recharged repeatedly and the voltage across capacitor 123A will remain high so long as the detected signal is received substantially unattenuated from its reference voltage at op-amp 116A. The voltage from capacitor 123A is applied to the negative input of an op-amp 126A. Op-amp 126A may be any one of many suitable op-amps, which are well known in the art, such as a TL082 op-amp. The positive input of op-amp 126A is tied to a reference voltage, which is approximately equal to one-half of the supply voltage. In the exemplary embodiment depicted in FIG. 63, the reference voltage is provided by reference voltage source 117A.

So long as charging circuit 122A is recharged, the output of op-amp 126A will be low. However, if the output of op-amp 116A does not go high for a period of 25-50 µs the voltage across capacitor 123A will decay to less than the reference voltage, and op-amp 126A will output a high signal indicating contact between the user's body and the blade. As described in U.S. Provisional Patent Application Ser. No. 60/225,056, entitled "Firing Subsystem for Use in a Fast-Acting Safety System," U.S. Provisional Patent Application Ser. No. 60/225,170, entitled "Spring-Biased Brake Mechanism," and U.S. Provisional Patent Application Ser. No. 60/225,169, entitled "Brake Mechanism for Power Equipment," all filed Aug. 14, 2000, the output signal from op-amp 126A is coupled to actuate reaction subsystem 24. The time between contact and activation of the reaction system can be adjusted by selecting the time constant of capacitor 123A and resistor 124A.

It should be noted that, depending on the size, configuration and number of teeth on the blade and the position of contact with the operator, the electrical contact between the operator and blade will often be intermittent. As a result, it is desirable that the system detect contact in a period less than or equal to the time a single tooth would be in contact with a user's finger or other body portion. For example, assuming a 10-inch circular blade rotating at 4000 rpm and a contact distance of about one-quarter of an inch (the approximate width of a fingertip), a point on the surface of the blade, such as the point of a tooth, will be in contact with the user for approximately 100 µs. After this period of contact, there will normally be an interval of no contact until the next tooth reaches the finger. The length of the contact and non-contact periods will depend on such factors as the number of teeth on the blade and the speed of rotation of the blade.

It is preferable, though not necessary, to detect the contact with the first tooth because the interval to the second tooth may be substantial with blades that have relatively few teeth. Furthermore, any delay in detection increases the depth of cut that the operator will suffer. Thus, in the exemplary embodiment, the charging circuit is configured to decay within approximately 25-50 µs to ensure that monitoring system 102A responds to even momentary contact between the user's body and the blade. Further, the oscillator is configured to create a 200 khz signal with pulses approximately every 5 µs. As a result, several pulses of the input signal occur during each period of contact, thereby increasing the reliability of contact detection. Alternatively, the oscillator and charging circuit may be configured to cause the detection system to respond more quickly or more slowly. Generally, it is desirable to maximize the reliability of the contact detection, while minimizing the likelihood of erroneous detections.

As described above, the contact between a user's body and the teeth of the blade might be intermittent depending on the size and arrangement of the teeth. Although monitoring system 102A typically is configured to detect contact periods as short as 25-50 µs, once the first tooth of the blade passes by the user's body, the contact signal received by the second electrical circuit may return to normal until the next tooth contacts the user's body. As a result, while the output signal at op-amp 126A will go high as a result of the first contact, the output signal may return low once the first contact ends. As a result, the output signal may not remain high long enough to activate the reaction system. For instance, if the output signal does not remain high long enough to actuate firing subsystem 76, fusible member 70, may not melt. Therefore, monitoring system 102A may include a pulse extender in the form of charging circuit 127A on the output of op-amp 126A, similar to charging circuit 122A. Once op-amp 126A produces a high output signal, charging circuit 127A functions to ensure that the output signal remains high long enough to sufficiently discharge the charge storage devices to melt the fusible member. In the exemplary embodiment, charging circuit 127A includes a 0.47 µF capacitor 128A connected between the output of op-amp 126A and ground. When the output of op-amp 126A goes high, capacitor 128A charges to the output signal level. If the output of op-amp 126A returns low, the voltage across capacitor 128A discharges through 10 k resistor 129A with a time constant of approximately 4.7 ms. A diode 130A, such as an 1N914 diode, prevents capacitor 128A from discharging through op-amp 126A. The pulse extender insures that even a short contact with a single tooth will result in activation of the reaction system.

The above-described system is capable of detecting contact within approximately 50 µs and activating the reaction system. As described in more detail in U.S. Provisional Patent Application Ser. No. 60/225,056, entitled "Firing Subsystem for Use in a Fast-Acting Safety System," U.S. Provisional Patent Application Ser. No. 60/225,170, entitled "Spring-Biased Brake Mechanism," and U.S. Provisional Patent Application Ser. No. 60/225,169, entitled "Brake Mechanism for Power Equipment," all filed Aug. 14, 2000, in the context of a reaction system for braking a saw blade, a brake can be released in approximately less than 100 µs and as little as 20 µs. The brake contacts the blade in approximately one to approximately three milliseconds. The blade will normally come to rest within not more than 2-10 ms of brake engagement. As a result, injury to the operator is minimized in the event of accidental contact with the cutting tool. With appropriate selection of components, it may be possible to stop the blade within 2 ms, or less.

While exemplary embodiments of excitation system 101A and monitoring system 102A have been described above with specific components having specific values and arranged in a specific configuration, it will be appreciated that these systems may be constructed with many different configurations, components, and values as necessary or desired for a particular application. The above configurations, components, and values are presented only to describe one particular embodiment that has proven effective, and should be viewed as illustrating, rather than limiting, the invention.

Figure 64:
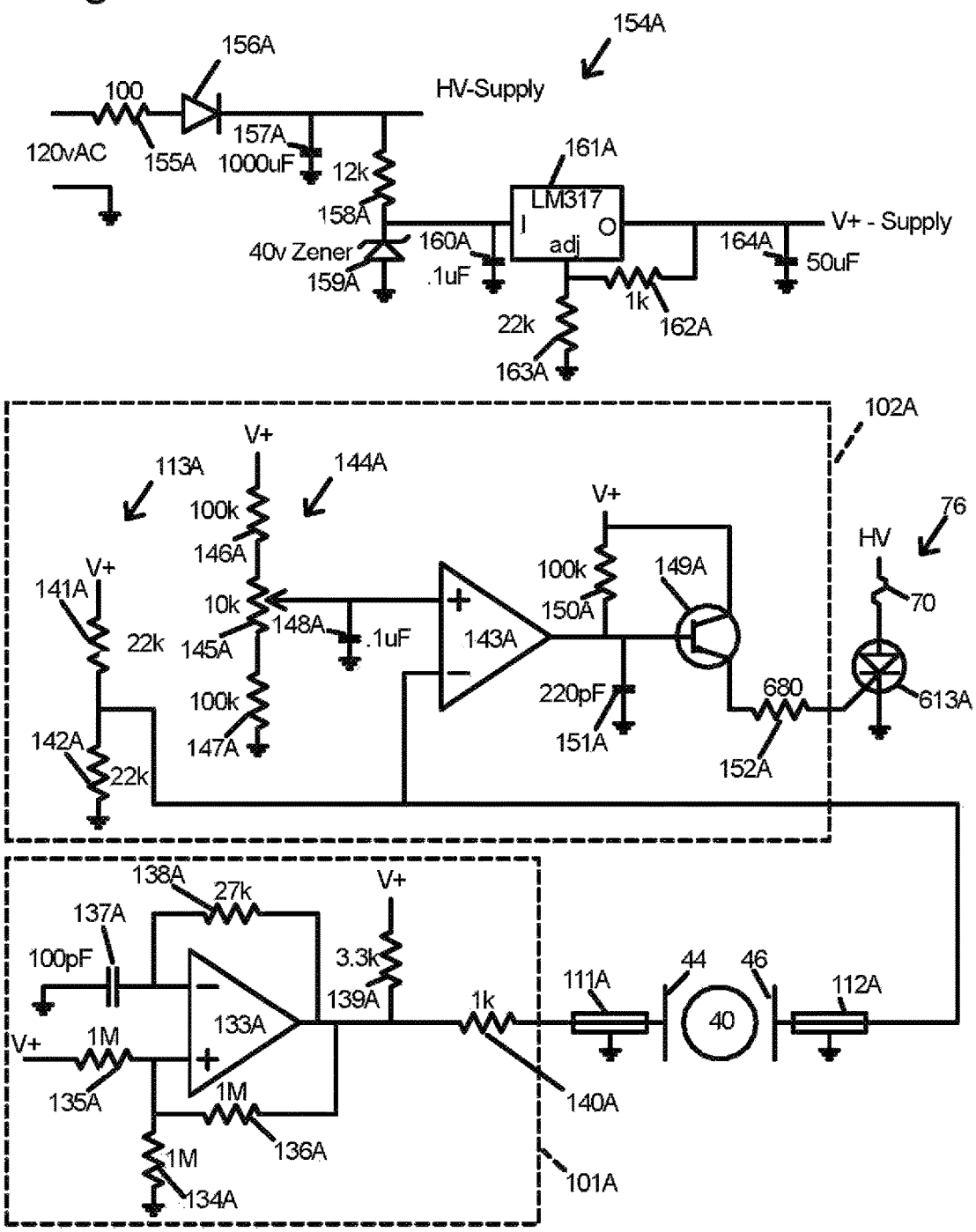
FIG. 64 is a schematic circuit diagram of a first alternative electronic subsystem for the safety system of FIG. 1, including an excitation system, a contact sense system and a firing system.

FIG. 64 shows alternative embodiments of excitation system 101A and monitoring system 102A, as well as firing system 76, which is described in more detail in U.S. Provisional Patent Application Ser. No. 60/225,056, titled "Firing Subsystem for Use in a Fast-Acting Safety System," filed Aug. 14, 2000. Alternative excitation system 101A is configured to generate a square wave signal using only a single comparator 133A such as an LM393 comparator. A 1M resistor 134A is connected between the high input terminal of comparator 133A and ground. Another 1M resistor 135A is connected between the high input terminal of comparator 133A and a low voltage supply V. A 1M resistor 136A is connected between the high input terminal of the comparator and the output of the comparator. A 100 pF capacitor 137A is connected between the low input terminal of the comparator and ground. A 27 k resistor 138A is connected between the low input terminal of the comparator and the output of the comparator. A 3.3 k resistor 139A is connected between the low voltage supply V and the output of the comparator. The alternative oscillator circuit illustrated in FIG. 66 produces a square wave having a frequency of approximately 3-500 kHz. A 1 k resistor 140A is connected between the output of the comparator and shielded cable 111A to reduce ringing. It will be appreciated that the values of one or more elements of alternative excitation system 101A may be varied to produce a signal having a different frequency, waveform, etc.

As in the exemplary embodiment described above, the signal generated by alternative excitation system 101A is fed through shielded cable 111A to charge plate 44. The signal is capacitively coupled to charge plate 46 via blade 40. Alternative monitoring system 102A receives the signal from charge plate 46 via shielded cable 112A and compares the signal to a reference voltage. If the signal falls below the reference voltage for approximately 25 µs, an output signal is generated indicating contact between the blade and the user's body.

Alternative monitoring system 102A includes a voltage divider 113A, which is formed of 22 k resistors 141A and 142A. The voltage divider biases the signal received via cable 112A to half the low voltage supply V. The lower resistance of resistors 141A, 142A relative to resistors 114A, 115A serves to reduce 60 hz noise because low-frequency signals are attenuated. The biased signal is fed to the negative input terminal of a second comparator 143A, such as an LM393 comparator. The positive terminal of comparator 143A is connected to reference voltage source 144A. In the depicted embodiment, the reference voltage source is formed by a 10 kΩ potentiometer 145A coupled in series between two 100 kΩ resistors 146A, 147A connected to the low voltage supply V and ground, respectively. A 0.1 µF capacitor 148A stabilizes the output of the reference voltage. As before, the reference voltage is used to adjust the trigger point.

The output of second comparator 143A is connected to the base terminal of an NPN bipolar junction transistor 149A, such as a 2N3904 transistor. The base terminal of transistor 149A is also connected to low voltage supply V through a 100 k resistor 150A, and to ground through a 220 pF capacitor 151A. Potentiometer 145A is adjusted so that the voltage at the positive terminal of comparator 143A is slightly lower than the high peak of the signal received at the negative terminal of the second comparator when there is no contact between the blade and the user's body. Thus, each high cycle of the signal causes the second comparator output to go low, discharging capacitor 151A. So long as there is no contact between the blade and the user's body, the output of the second comparator continues to go low, preventing capacitor 151A from charging up through resistor 150A and switching transistor 149A on. However, when the user's body contacts the blade or other isolated element, the signal received at the negative terminal of the second comparator remains below the reference voltage at the positive terminal and the output of the second comparator remains high. As a result, capacitor 151A is able to charge up through resistor 150A and switch transistor 149A on.

The collector terminal of transistor 149A is connected to low voltage supply V, while the emitter terminal is connected to 680Ω resistor 152A. When transistor 149A is switched on, it supplies an output signal through resistor 152A of approximately 40 mA, which is fed to alternative firing system 76. As described in more detail in U.S. Provisional Patent Application Ser. No. 60/225,056, titled "Firing Subsystem for Use in a Fast-Acting Safety System," filed Aug. 14, 2000, the alternative firing circuit includes fusible member 70 connected between a high voltage supply HV and an SCR 613A, such as an NTE 5552 SCR. The gate terminal of the SCR is connected to resistor 152A. Thus, when transistor 149A is switched on, the approximately 40 mA current through resistor 152A turns on SCR 613A, allowing the high voltage supply HV to discharge to ground through fusible member 70. Once the SCR is switched on, it will continue to conduct as long as the current through fusible member 70 remains above the holding current of approximately 40 mA, even if the current to the gate terminal is removed. Thus, the SCR will conduct current through the fusible member until the fusible member is melted or the high voltage source is exhausted or removed. The fact that the SCR stays on once triggered allows it to respond to even a short pulse through resistor 152A.

FIG. 64 also illustrates an exemplary electrical supply system 154A configured to provide both low voltage supply V and high voltage supply HV from standard 120 VAC line voltage. Electrical supply system 154A is connected to provide low voltage supply V and high voltage supply HV to alternative excitation system 101A, alternative monitoring system 102A, and alternative firing system 76. The line voltage is connected through a 100Ω resistor 155A and a diode 156A, such as a 1N4002 diode, to a 1000 µF charge storage capacitor 157A. The diode passes only the positive portion of the line voltage, thereby charging capacitor 157A to approximately 160V relative to ground. The positive terminal of capacitor 157A serves as the high voltage supply HV connected to fusible link 70. When SCR 613A is switched on upon detection of contact between the blade and the user's body, the charge stored in capacitor 157A is discharged through the fusible link until it melts. It will be appreciated that the size of capacitor 157A may be varied as required to supply the necessary current to melt fusible member 70. As described in U.S. Provisional Patent Application Ser. No. 60/225,056, titled "Firing Subsystem for Use in a Fast-Acting Safety System," filed Aug. 14, 2000, use of a HV capacitor leads to a much higher current surge, and therefore a faster melting of the fusible member than is the case with a low voltage system.

The positive terminal of capacitor 157A also provides a transformer-less source of voltage for low voltage supply V, which includes a 12 k resistor 158A connected between the positive terminal of capacitor 157A and a reverse 40V Zener diode 159A. Diode 159A functions to maintain a relatively constant 40V potential at the junction between the diode and resistor 158A. It can be seen that the current through the 12 k resistor will be about 10 mA. Most of this current is used by the low voltage circuit, which has a relatively constant current demand of about 8 mA. Note that while resistor 158A and diode 159A discharge some current from capacitor 157A, the line voltage supply continuously recharges the capacitor to maintain the HV supply. A 0.1 µF capacitor 160A is connected in parallel with diode 159A to buffer the 40V potential of the diode, which is then connected to the input terminal of an adjustable voltage regulator 161A, such as an LM317 voltage regulator. The ratio of a 1 k resistor 162A connected between the output terminal and adjustment terminal, and a 22 k resistor 163A connected between the adjustment terminal and ground, set the output voltage of regulator 161A to approximately 30 VDC. A 50 µF capacitor 164A is connected to the output terminal of regulator 161A to buffer sufficient charge to ensure that low voltage supply V can provide the brief 40 mA pulse necessary to switch on SCR 613A. The described low voltage source is advantageous because of its low cost and low complexity.

It should be noted that when high voltage supply HV is discharged through fusible member 70, the input voltage to voltage regulator 161A may temporarily drop below 30V, thereby causing a corresponding drop in the low voltage supply V. However, since the reaction system has already been triggered, it is no longer necessary for the detection system to continue to function as described and any drop in low voltage supply V will not impair the functioning of safety system 18.

It will be appreciated by those of skill in the electrical arts that the alternative embodiments of excitation system 101A, monitoring system 102A, firing system 76, and electrical supply system 154A may be implemented on a single substrate and/or in a single package. Additionally, the particular values for the various electrical circuit elements described above may be varied depending on the application.

One limitation of the monitoring systems of FIGS. 63 and 64 is that they actuate the reaction system whenever the incoming amplitude from charge plate 46 drops below a preset threshold. Under most circumstances this represents a reliable triggering mechanism. However, when cutting green wood, a substantial additional capacitive and resistive load is coupled to the blade. The moisture in green wood gives it a very high dielectric constant, and an increased conductivity relative to dry wood. In fact, when cutting very green wood, i.e. over 50% moisture content, the amplitude of the signal on charge plate 46 can drop to a level equivalent to what is seen when a user contacts the blade. Thus, the systems of FIGS. 63 and 64 are limited in their ability to offer protection while processing green wood.

Figure 65:
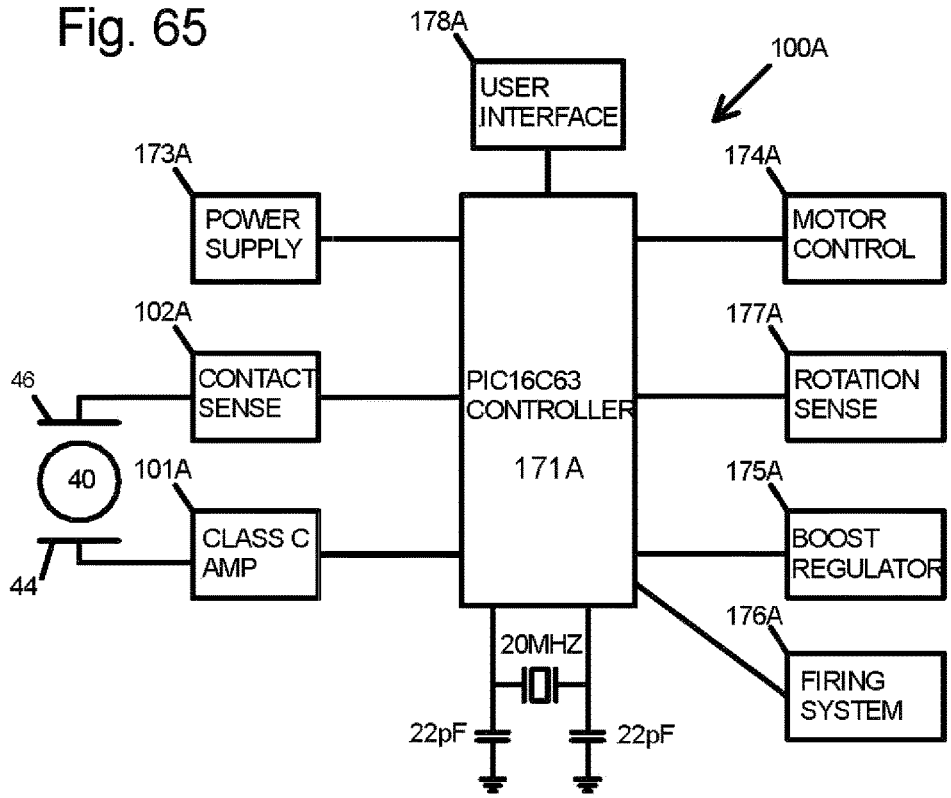
FIG. 65 is a block diagram illustrating the arrangement of a second alternative electronic subsystem.

Another embodiment of an electronic subsystem 100A adapted to accommodate green wood and offering certain other benefits is shown in FIGS. 65-73. As shown in FIG. 65, system 100A includes an excitation system 101A in the form of a class-C amplifier connected to a micro-controller 171A. System 100A also includes a monitoring system 102A in the form of a contact sense circuit connected to controller 171A. A power supply 173A supplies power to the various elements of system 100A. A motor controller 174A is adapted to turn a motor off and on based on signals from the controller. A boost regulator 175A operates to charge a firing system 176A. A rotation sense circuit 177A detects rotation of the cutting tool. Lastly, a user interface 178A is provided to allow a user to control operation of the saw and provide feedback on the status of the system.

A computer program listing for a controller as shown in FIG. 65 is submitted herewith as a Computer Program Listing Appendix.

Figure 66:
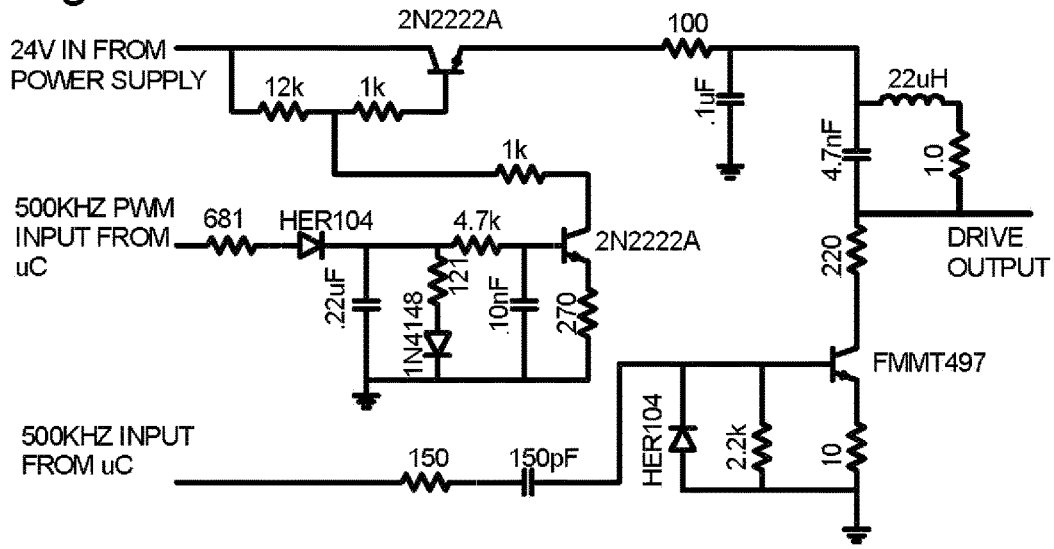
FIG. 66 is a schematic diagram of an excitation system of the subsystem of FIG. 65.

FIG. 66 illustrates the circuitry of the class-C amplifier in more detail. The amplifier includes a drive output that is coupled to plate 44 as shown in FIG. 65. The drive output is sinusoidal at about 500 khz and the amplitude is adjustable between about 3 volts and 25 volts. A 32-volt input supply line from the power supply provides power for the amplifier. The base frequency is provided by a 500 khz square wave input from the controller. The amplitude is controlled by pulse width modulation from the controller.

The controller is programmed to adjust the drive voltage output from the amplifier to maintain a predetermined amplitude at plate 46 under varying capacitive loads. Thus, when cutting green wood, the controller ramps up the drive voltage to maintain the desired voltage on plate 46. The controller is preferably capable of skewing the drive voltage between about 1 and 50% per millisecond, and more preferably between 1 and 10%. This allows the system to maintain a constant output level under the varying load created while sawing green wood, or such as might be created by placing a conductive member such a fence near the blade. The controller should preferably not skew the drive voltage by much more than 50% per millisecond, or it may counteract the drop in signal created by a user contact event.

Figure 67:
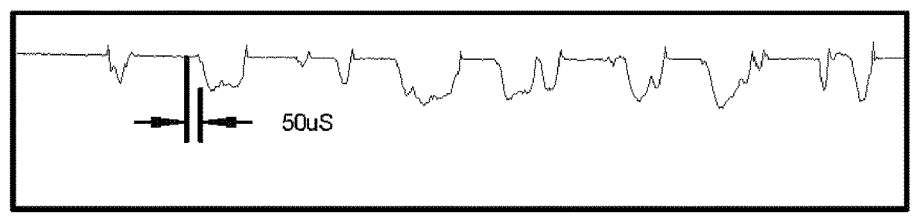
FIG. 67 shows an exemplary attenuation in signal that occurs when the finger of a user contacts a blade.

FIG. 67 illustrates the change in signal amplitude seen at plate 46 as the teeth of a 10-inch, 36-tooth saw blade spinning at 4000 rpm contacts a user's finger. Each of the drops in the signal amplitude is from a single tooth moving through the skin of the finger. It can be seen, for instance, that the signal amplitude drops by about 30% over about 50 µS as the second tooth strikes the finger. When cutting very green wood, the signal attenuation upon contact will be more like 15%, but will occur over the same 50 µS. Therefore, as long as the system can detect a contact event of a 5-25% or greater drop in less than 100 µS, providing a skew rate of around 10% per millisecond should not override an actual event. It will be understood that the skew rate and trigger thresholds can be adjusted as desired. The primary limiting factor is that the trigger threshold should not be so small that noise creates false triggers, unless false triggers are acceptable.

Figure 68:
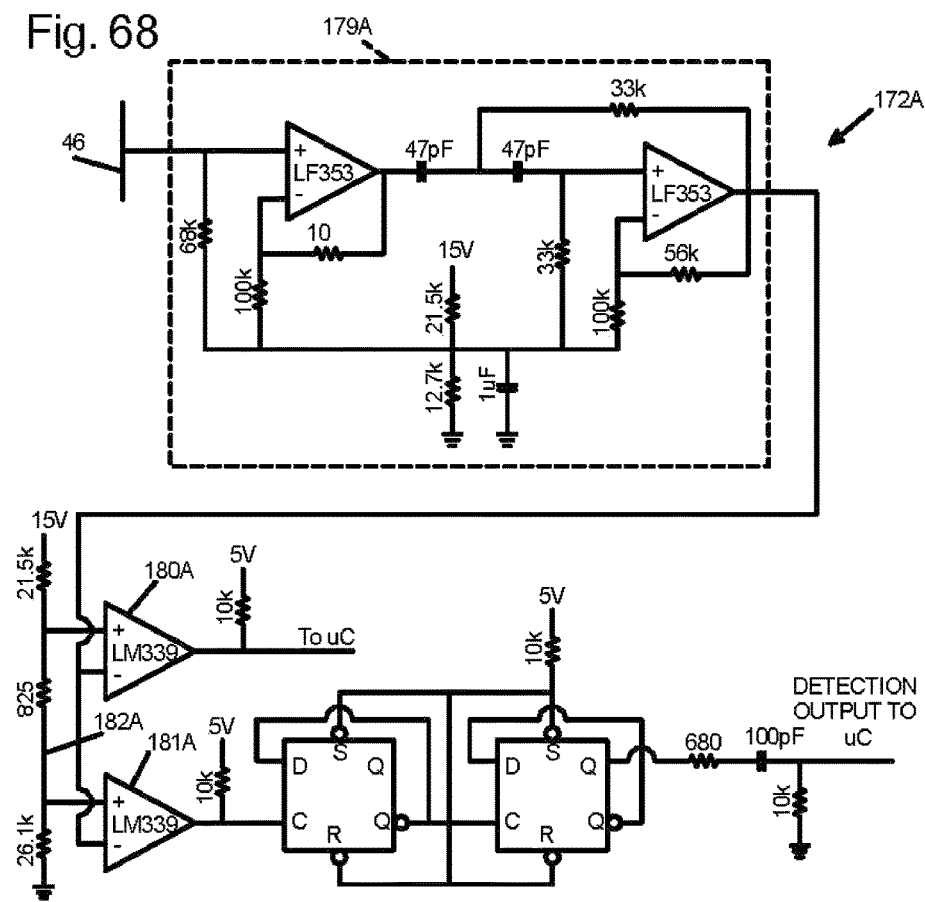
FIG. 68 is a schematic of a contact sense portion of the subsystem of FIG. 65.

FIG. 68 shows the details of the contact sense circuit. The contact sense circuit receives input from plate 46. In this embodiment, the preferred capacitive coupling between the blade and the plates is about 30 pF for the drive plate and about 10 pF for plate 46. The larger drive plate size improved signal transfer for a given total capacitance of both plates. The actual values are not critical, and equal values could be used as well. Generally speaking, the capacitance of the drive plate should be comparable to the human body capacitance to be detected, i.e. 10-200 pF.

The input from plate 46 is fed through a high-pass filter 179A to attenuate any low frequency noise, such as 60 hz noise, picked up by plate 46. Filter 179A can also provide amplification of the signal to a desired level as necessary.

The output of the filter is fed into a set of comparators 180A, 181A. Comparator 180A pulses high briefly if the maximum signal amplitude from the filter exceeds the value at its positive input set by voltage divider 182A. The output pulses from the comparator are fed to the controller. The controller samples over a 200 µS window and modulates the drive amplitude to attempt to maintain the sensed voltage at a level so that 50% of the waveform cycles generate a pulse through comparator 180A. If less than 50% generate pulses, then the controller raises the drive voltage by a set amount. Likewise, if more than 50% generate pulses, the drive voltage is lowered. The system can be configured to step by larger or smaller amounts depending on the deviation from 50% observed during a particular window. For instance, if 45 pulses are observed, the system may step up the drive amplitude by 1%. However, if only 35 pulses are observed, the system may step by 5%. The system will continually "hunt" to maintain the proper drive level. By selecting the window duration and adjustment amount, it is possible to control the skew rate to the desired level as described above.

Comparator 181A pulses every cycle of the waveform so long as the sensed voltage exceeds a lower trigger threshold set by voltage divider 182A. Therefore, under normal circumstances, this is a 500 khz pulse. The pulse output from comparator 181A is fed through a divide-by-four circuit formed by two D-flip flops to reduce the frequency to 125 khz—or an 8 µS period. The output of the divider is fed to the controller. The controller monitors this line to insure that a pulse occurs at least every 18 µS. Therefore, if more than about half of the pulse are missing in over an 18 µS period, the controller will trigger the reaction system. Of course, the particular period can be selected as desired to maximize reliability of contact detection and minimize false triggers. A benefit of the described arrangement is that a single pulse or even two may be missing, such as due to noise, without triggering the system. However, if more pulses are missing, the system will still be triggered reliably. The particular trigger level for missing pulses is set by the voltage divider. This level will typically be between 5 and 40% for the described system.

FIG. 69 illustrates the circuit of power supply 173A. The power supply includes an unregulated 32-volt output and regulated 5, 15 and 24-volt outputs. The 24-volt output is used to power the excitation signal, which has a relatively large voltage, and the 32-volt output powers a capacitor charging circuit described below. The 5-volt output powers the controller and other logic circuitry, while the 15-volt output operates most of the analog electronics. A low-voltage output is monitored by the controller to insure that adequate voltage is present to operate the system.

Boost regulator 175A and firing system 176A are shown in FIG. 70. Boost regulator 175A includes a buck-boost charger 183A that steps up the 32-volt supply input to 180 volts for charging the firing circuit. The controller provides a 125 khz input to modulate the buck-boost cycle of the charger. A regulator circuit 184A monitors the voltage from the firing circuit and turns the charger on or off as necessary to maintain the charge near 180 volts. The regulator circuit is constructed with a predetermined amount of hysteresis so that the charger will turn on when the firing circuit voltage falls below 177 volts and turn off when the voltage reaches 180 volts, as set by the voltage divider inputs and feedback to comparator 185A. The output of comparator 185A is fed to the controller. By monitoring the charge and discharge time based on the state of the output of comparator 185A, the controller can verify that the capacitor in the firing circuit is operating properly and storing adequate charge. An over-voltage circuit uses a 220V transient suppressor to signal the controller if the voltage on the capacitor exceeds about 220V. This testing is described in more detail in U.S. Provisional Patent Application Ser. No. 60/225,059, titled "Logic Control for Fast-Acting Safety System," filed Aug. 14, 2000. The firing circuit is described in more detail in U.S. Provisional Patent Application Ser. No. 60/225,056, titled "Firing Subsystem for Use in a Fast-Acting Safety System," filed Aug. 14, 2000.

Figure 71:
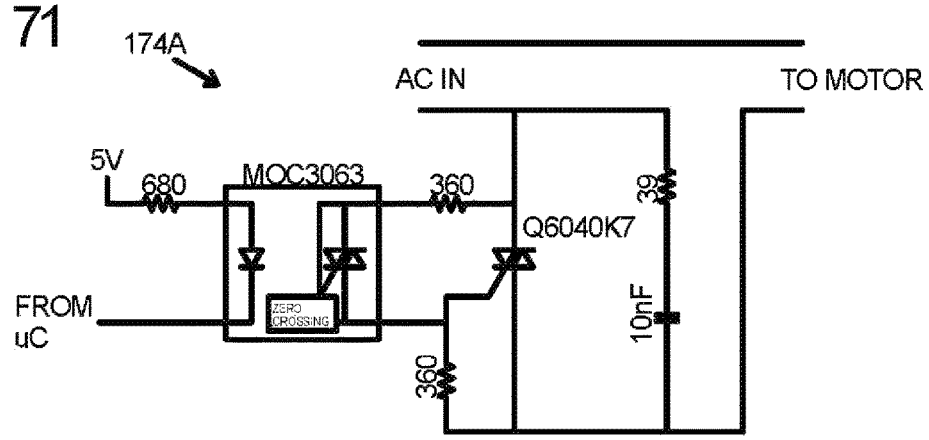
FIG. 71 is a schematic of a motor control portion of the subsystem of FIG. 65.

FIG. 71 illustrates the circuitry of motor control 174A. The motor control receives a logic level control signal from the controller to turn the motor on and off based on input from the user interface, described in more detail below. The motor control also turns off the motor when a trigger event occurs. The logic signal is electrically isolated from the motor voltage by an optoisolated triac driver. This isolates the ground of the detection system from the ground of the motor power. A mechanical relay or similar device can also be used and will provide the same isolation. When the optoisolated triac drive receives a signal from the controller, it turns on Q6040K7 triac to provide power to the machine.

Figure 72:
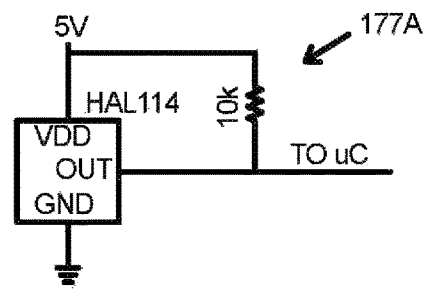
FIG. 72 is a schematic of a rotation sensor portion of the subsystem of FIG. 65.

The rotation sense circuit is shown in FIG. 72. The purpose of the rotation sense circuit is to insure that the contact detection system is not turned off until the cutter or blade as stopped. The rotation sense circuit utilizes a hall-effect sensor that is located adjacent a rotating portion of the machine. A small magnet is inserted in the rotating portion to signal the hall-effect sensor. Output of the hall-effect sensor is fed to the controller. As described in more detail in U.S. Provisional Patent Application Ser. No. 60/225,059, titled "Logic Control for Fast-Acting Safety System," filed Aug. 14, 2000, the controller monitors the output of the hall-effect sensor to determine when the cutter has coasted to a stop. Once the cutter stops, any sensed contact will no longer trigger the reaction system. It should be noted that rotation of the cutter could be detected by other arrangements as well. Various suitable mechanisms are described in U.S. Provisional Patent Application Ser. No. 60/225,094, titled "Motion Detecting System for Use in Safety System for Power Equipment," filed Aug. 14, 2000.

For instance, a small eccentricity can be placed on the cutter or some other isolated structure that rotates with the cutter, such as the arbor. This eccentricity can be placed to pass by sense plate 46 or by a separate sensing plate. The eccentricity will modulate the detected signal amplitude so long as the cutter is rotating. This modulation can be monitored to detect rotation. If the eccentricity is sensed by sense plate 46, it should be small enough that the signal modulation generated will not register as a contact event. As another alternative, rotation can be sensed by electromagnetic feedback from the motor.

Controller 171A may also be designed to monitor line voltage to insure that adequate voltage is present to operate the system. For instance, during motor start up, the AC voltage available to the safety system may drop nearly in half depending on the cabling to the saw. If the voltage drops below a safe level, the controller can shut off the saw motor. Alternatively, the controller may include a capacitor of sufficient capacity to operate the system for several seconds without power input while the saw is starting.

Figure 73:
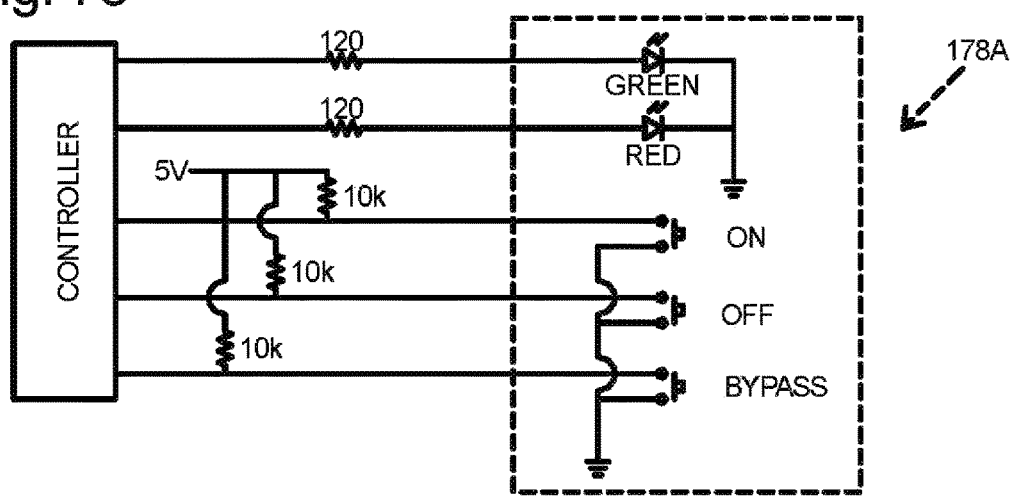
FIG. 73 is a schematic of a user interface portion of the subsystem of FIG. 65.
Figure 74:
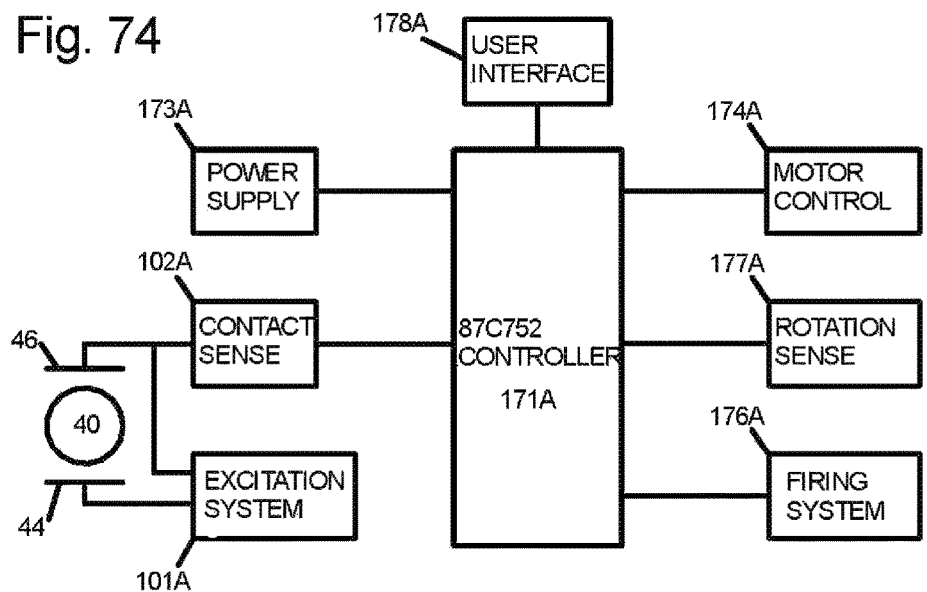
FIG. 74 is a block diagram of second and third alternative electronic subsystems.

User interface 178A is shown in FIG. 73. The user interface includes start, stop and bypass buttons that are used to control the operation of the saw. The bypass button allows the user to disable the contact detection system for a single on/off cycle of the saw so as to be able to saw metal or other materials that would otherwise trigger the reaction system. The user interface also includes red and green LED's that are used to report the status of the system to a user. More details on the operation of suitable user interfaces are described in U.S. Provisional Patent Application Ser. No. 60/225,059, titled "Logic Control for Fast-Acting Safety System," filed Aug. 14, 2000.

Figure 75:
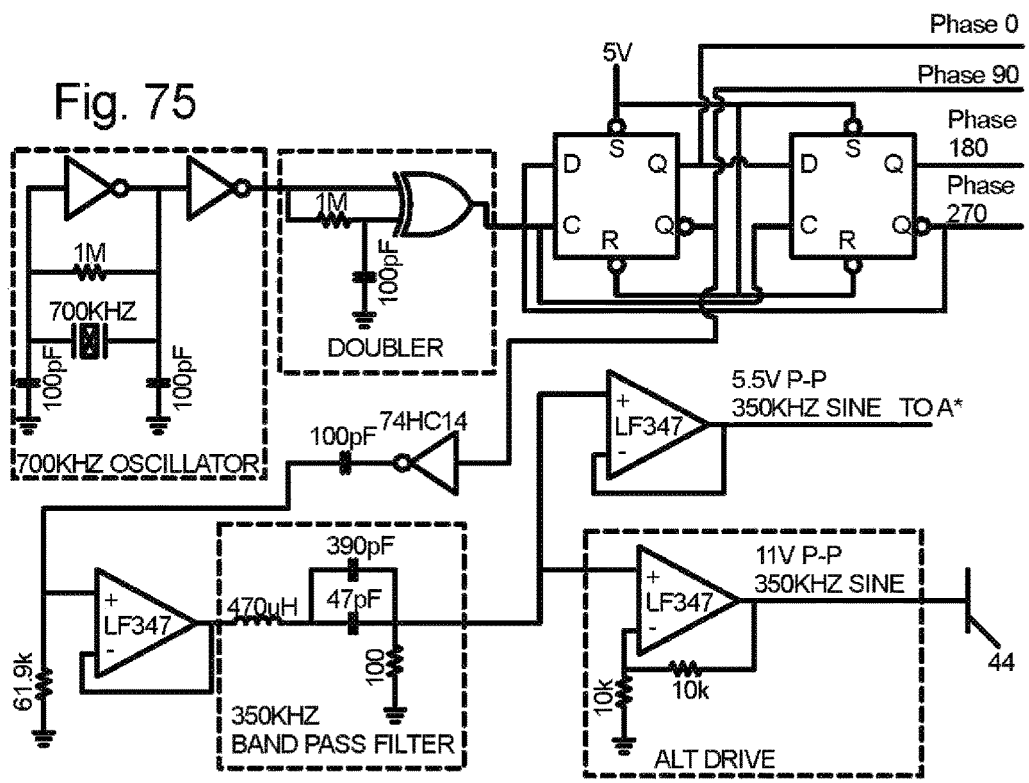
FIG. 75 is a schematic of an excitation system portion of the subsystems of FIG. 74.

Two additional electronic configurations for detection subsystem 22 are shown in FIGS. 74-78. As illustrated in FIG. 75, the alternative detection systems utilize a microcontroller 171A to manage and monitor various functions. An excitation system delivers a 350 khz sine wave drive signal through plate 44 to the blade. The circuit for generating the drive signal is illustrated in FIG. 75. The excitation circuit uses a 700 khz oscillator with an output fed into a double to generate a 1.4 Mhz signal. The output of the double is fed into a set of S-R flip-flops to extract phase signals at 90-degree intervals. The phase signals are used to drive a synchronous detection system that forms on of the two embodiments of FIGS. 74-78 and is shown in more detail in FIG. 77. The 350 khz square wave 180-degree phase signal is fed through an inverter and a buffer amplifier into a Q=10, 350 khz band pass filter.

Figure 76:
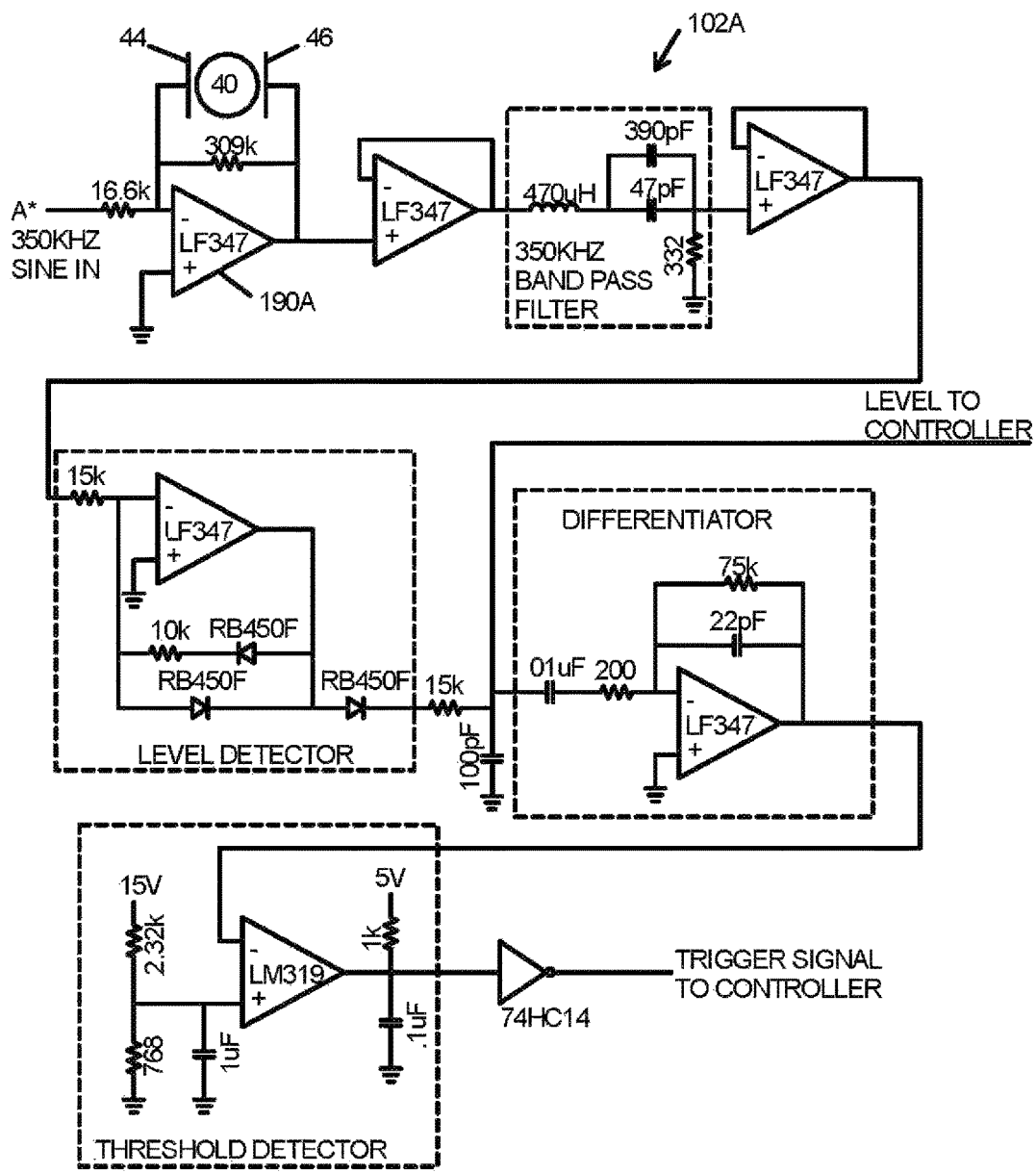
FIG. 76 is a schematic of a contact sense portion of the second alternative subsystem of FIG. 74.

The output of the band pass filter is a 350 khz sine wave that is fed through another buffer amplifier to a sense amplifier 190A shown in FIG. 76. The output of the sense amplifier is fed to plate 44 and the input from plate 46 is fed back to the negative input. When a user touches cutter 40, the feedback on the sense amplifier is reduced, thereby causing the output amplitude to go up. The result of this arrangement is that the drive amplitude on the blade is small during normal use and rises only when a user touches the blade or green wood is cut. In this embodiment, the preferred capacitive coupling of the plates to the blade is about 90 pF each, although other values could be used.

The output of the sense amplifier is fed through a buffer and into a 350 khz band pass filter to filter out any noise that may have been picked up from the blade or plates. The output of the band pass filter is fed through a buffer and into a level detector. The level detector generates a DC output proportional to the amplitude of the sense amplifier. The output of the level detector is smoothed by an RC circuit to reduce ripple and fed into a differentiator. The differentiator generates an output proportional to the rate of change of the sense amplifier output amplitude.

As mentioned above, the sense amplifier output only changes when a user touches the blade or green wood is cut. The change when cutting green wood is slow relative to what happens when a user touches the blade. Therefore, the differentiator is tuned to respond to a user contact, while generating minimal response to green wood. The output of the differentiator is then fed to a comparator that acts as threshold detector to determine if the output of the differentiator has reached a predetermined level set by the a voltage divider network. The output of the threshold detector is fed through a Schmitt-trigger that signals the controller that a contact event has occurred. An RC network acts as a pulse stretcher to insure that the signal lasts long enough to be detected by the controller.

The output from the level detector is also fed to and analog to digital input on the controller. It may be that the under some circumstances, such as while cutting extremely green wood, the response of the sense amplifier will be near saturation. If this happens, the amplifier may no longer be capable of responding to a contact event. In order to provide a warning of this situation, the controller monitors this line to make sure that the detected level is stays low enough to allow a subsequent contact to be detected. If an excess impedance load is detected, the controller can shut down the saw without triggering the reaction system to provide the user with a warning. If the user wants to continue, they can initiate the bypass mode as described above.

Figure 77:
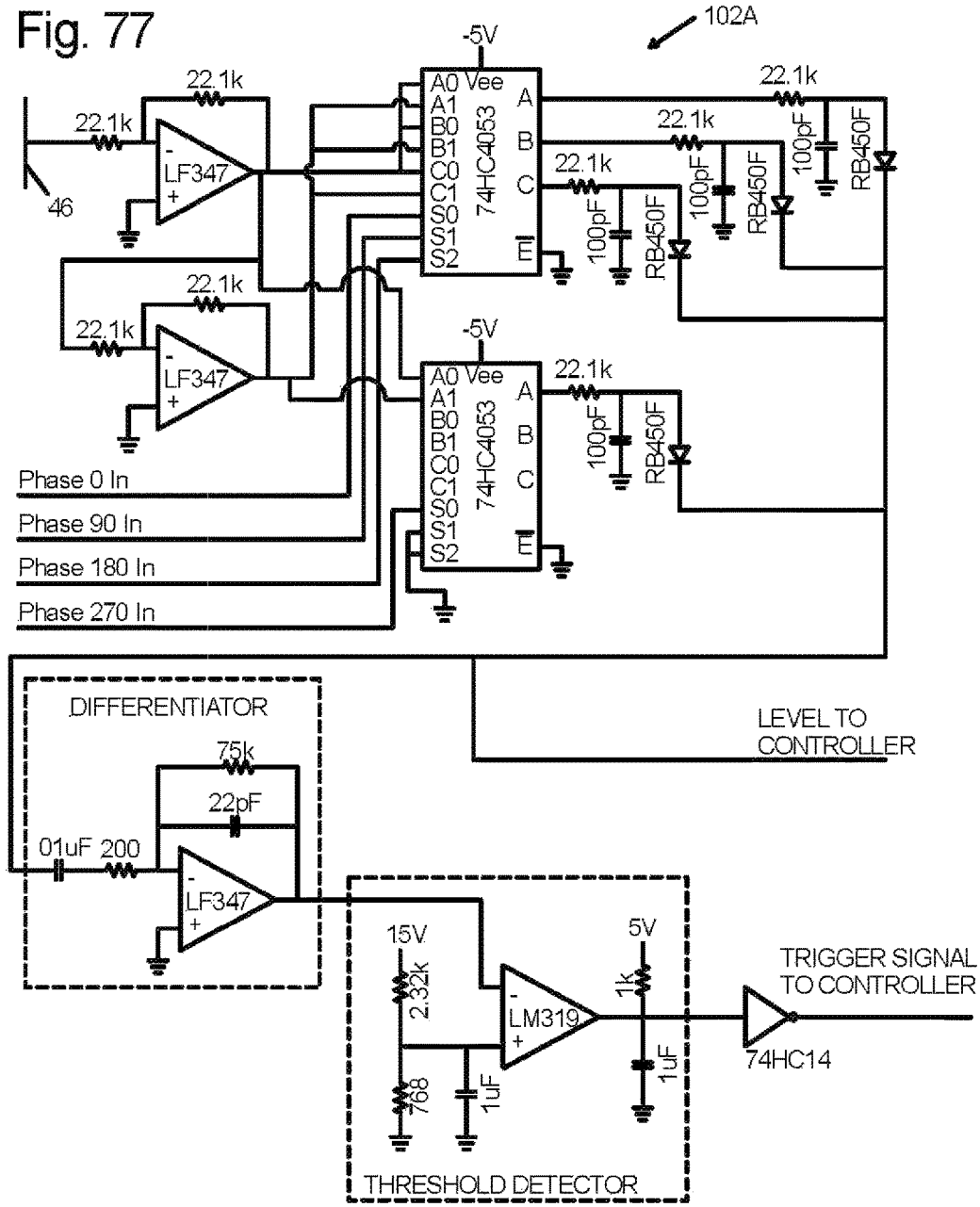
FIG. 77 is a schematic of a contact sense portion of the third alternative subsystem of FIG. 74.

The second of the two alternative detection systems of FIGS. 74-78 is a synchronous detector that uses the phase information generated by the flip-flops in FIG. 75. This system drives plate 44 through the ALT DRIVE circuit shown in FIG. 75. This ALT DRIVE circuit and the detection circuit of FIG. 77 are substituted for the circuit of FIG. 76. As shown in FIG. 77, the signal from plate 46 is fed through a pair of buffer/amplifiers into a set of analog switches. The switches are controlled by the phase information from the flip-flops. This arrangement generates an output signal that is proportional to the amplitude of the signal detected from plate 46 with improved noise immunity because of the synchronous detection. The output signal is fed into a differentiator and threshold detector circuit as previously described. These circuits send a trigger signal to the controller when the detected signal amplitude drops at a rate sufficient for the differentiator to have an output exceeding the threshold level.

Figure 78:
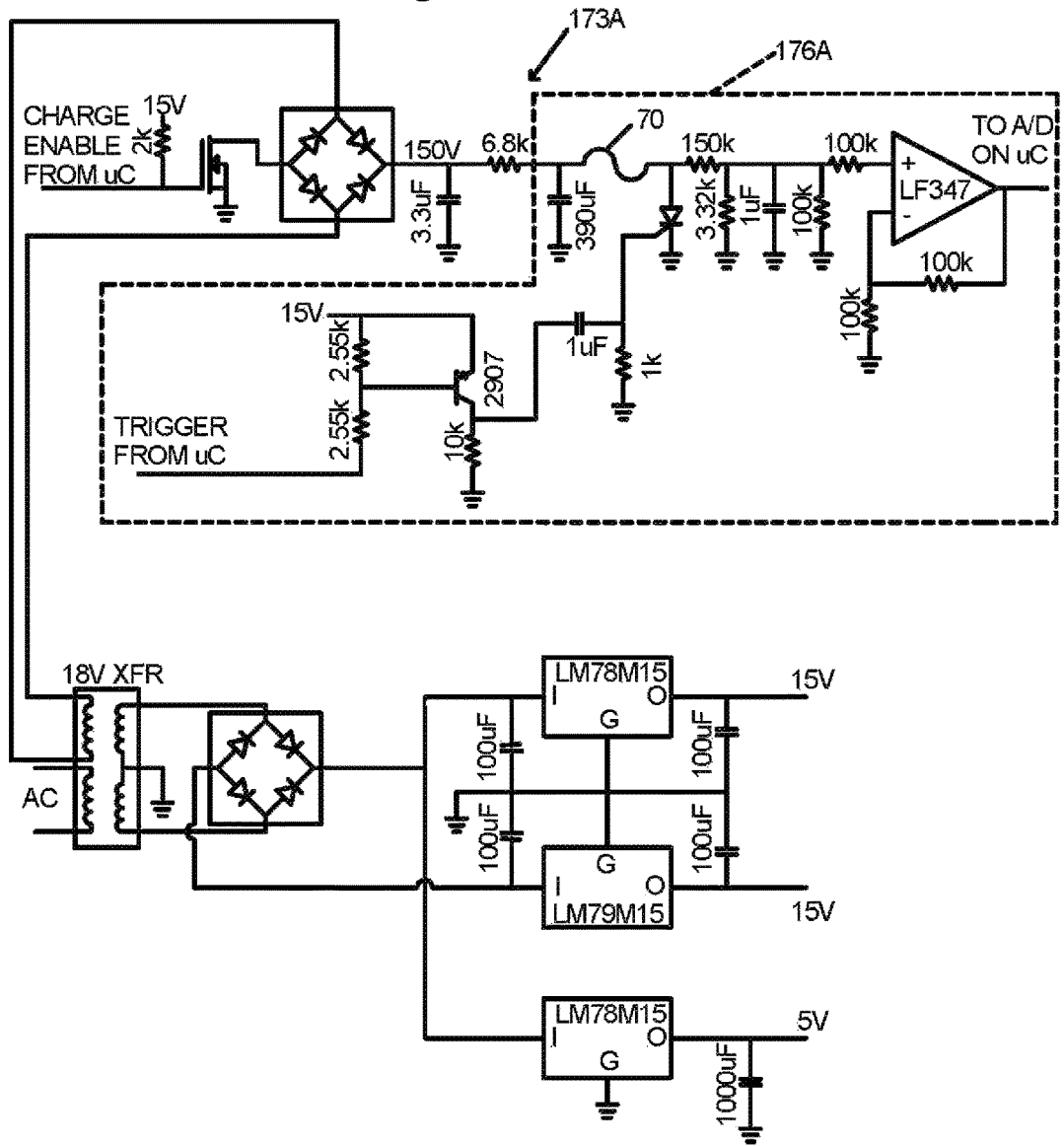
FIG. 78 is a schematic of a power supply and firing system portion of the subsystems of FIG. 74.

FIG. 78 illustrates a power supply and firing system suited for use in these two alternative arrangements. The power supply generates plus and minus 15-volt levels, as well as a 5-volts level. The capacitor in the firing circuit is charged by a secondary input winding on the power transformer. This arrangement provides for isolation of the system ground from the machine ground and avoids the need to step up power supply voltage to the capacitor voltage as accomplished by boost regulator 175A. However, the capacitor charge voltage becomes dependent on the line voltage, which is somewhat less predictable.

The charging circuit for the capacitor is regulated by an enable line from the controller. By deactivating the charging circuit, the controller can monitor the capacitor voltage through an output to an A/D line on the controller. When the capacitor is not being charged, it should discharge at a relatively know rate through the various paths to ground. By monitoring the discharge rate, the controller can insure that the capacitance of the capacitor is sufficient to burn the fusible member. The trigger control from the controller is used to fire the SCR to burn the fusible member.

With any of the above electronic subsystems, it is possible to avoid triggering in the event metal or metal-foiled materials are cut by looking for the amplitude of the signal, or the rate of change, depending on the system, to fall within a window or band rather than simply exceeding or falling below a certain threshold. More particularly, when metal is cut, the detected signal will drop to almost zero, and will drop within a single cycle. Thus, the controller or threshold detection circuitry can be configured to look for amplitude change of somewhat less than 100%, but more than 10% as a trigger event, to eliminate triggering on metal or other conductive work pieces which would normally substantially completely ground the signal.

It should be noted that, although not essential, all of the described embodiments operate at a relatively high frequency—above 100 kHz. This high frequency is believed to be advantageous for two reasons. First, with a high frequency, it is possible to detect contact more quickly and sample many cycles of the waveform within a short period of time. This allows the detection system to look for multiple missed pulses rather than just one missed pulse, such as might occur due to noise, to trigger the reaction system. In addition, the higher frequency is believed to provide a better signal to noise ratio when cutting green wood, which has a lower impedance at lower frequencies.

INDUSTRIAL APPLICABILITY

The present invention is applicable to power equipment, and specifically to woodworking equipment such as table saws, miter saws, band saws, circular saws, jointers, etc. The present invention provides a safety system or reaction system wherein a cutting tool or other dangerous item is retracted upon the occurrence of a specified event, such as when accidental contact between a user and a blade is detected. Retraction of a cutting tool, for example, can minimize any injury from accidental contact with the cutting tool by reducing the amount of time the cutting tool is in contact with a user or by moving the cutting tool to a position where the user cannot contact it. A retraction system may be used in combination with other safety features to maximize the performance of an overall safety system. For example, a retraction system may be used with a system that quickly stops a cutting tool so that the cutting tool simultaneously stops and moves away from a user. A fusible member or explosive may be used to trigger the reaction system to perform the specified action. A firing subsystem may be used to fuse the fusible member or fire the explosive upon detection of the dangerous condition.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:
   a circular blade configured to cut a workpiece;
   a detection circuit connected to the blade, where the detection circuit includes an oscillator that generates an oscillating signal, where the oscillating signal is imparted on the blade, where the detection circuit includes a controller that detects a change in the oscillating signal on the blade indicative of contact between a person and the blade, and where the detection circuit generates a detection signal when the change in the oscillating signal on the blade is detected;
   a firing circuit connected to the detection circuit to receive the detection signal, where the firing circuit includes a capacitor, and where the firing circuit discharges current from the capacitor upon receiving the detection signal; and an explosive or fusible member connected to the firing circuit to receive the current discharged from the capacitor and cause a specified action to mitigate possible injury from the contact.

\* \* \* \* \*